US012676126B2

(12) United States Patent
 Kubota

(10) Patent No.: US 12,676,126 B2
(45) Date of Patent: Jul. 7, 2026

(54) NON-TRANSITORY COMPUTER-READABLE STORAGE MEDIUM STORING PROGRAM, POINT SELECTION METHOD, AND INFORMATION PROCESSING APPARATUS

(71) Applicant: SEIKO EPSON CORPORATION, Tokyo (JP)

(72) Inventor: Shinji Kubota, Ina (JP)

(73) Assignee: SEIKO EPSON CORPORATION, Tokyo (JP)

( * ) Notice: Subject to any disclaimer, the term of this patent is extended or adjusted under 35 U.S.C. 154(b) by 80 days.

(21) Appl. No.: 18/411,089

(22) Filed: Jan. 12, 2024

(65) Prior Publication Data

US 2024/0257787 A1 Aug. 1, 2024

(30) Foreign Application Priority Data

Jan. 13, 2023 (JP) ................................. 2023-003592

(51) Int. Cl.
| | |
|---|---|
| *G09G 5/00* | (2006.01) |
| *G06T 5/50* | (2006.01) |
| *G06V 10/44* | (2022.01) |
| *G09G 5/373* | (2006.01) |
| *G09G 5/377* | (2006.01) |
| *H04N 5/74* | (2006.01) |

(52) U.S. Cl.
CPC .............. *G09G 5/377* (2013.01); *G06T 5/50* (2013.01); *G06V 10/44* (2022.01); *G09G 5/373* (2013.01); *H04N 5/74* (2013.01); *G06T 2207/20221* (2013.01)

(58) Field of Classification Search
None
See application file for complete search history.

(56) References Cited

U.S. PATENT DOCUMENTS

| | | | | |
|---|---|---|---|---|
| 2004/0061838 A1* | 4/2004 | Mochizuki | ............... | H04N 5/74 |
| | | | | 353/69 |
| 2011/0032492 A1* | 2/2011 | Nara | ...................... | H04N 9/317 |
| | | | | 353/121 |
| 2012/0007986 A1 | 1/2012 | Tsuida | | |

(Continued)

FOREIGN PATENT DOCUMENTS

| | | |
|---|---|---|
| JP | 2018-207373 A | 12/2018 |
| JP | 2022-092169 A | 6/2022 |
| WO | WO2010/116836 A | 10/2010 |

*Primary Examiner* — Martin Mushambo
(74) *Attorney, Agent, or Firm* — Dority & Manning, P.A.

(57) ABSTRACT

A program includes causing a processing apparatus to acquire a first captured image representing a result of imaging a range including a first display area that has a corner, the first display area being located on a projection surface on which a first projection image is displayed by a first projection apparatus, detect, by performing image processing on the first captured image, a plurality of first feature points corresponding to a corner of a first image indicating the first display area in the first captured image, and display, by controlling a display apparatus, a first superimposed image obtained by superimposing at least a part of a plurality of first display images selected by a user on the first captured image, the plurality of first display images corresponding one-to-one to the plurality of first feature points.

9 Claims, 22 Drawing Sheets

(56)                    References Cited

U.S. PATENT DOCUMENTS

| | | | |
|---|---|---|---|
| 2013/0335451 A1* | 12/2013 | Tsuji .................... | H04N 9/3194 |
| | | | 345/647 |
| 2014/0168376 A1* | 6/2014 | Hasegawa ............ | H04N 9/3194 |
| | | | 348/46 |
| 2014/0267427 A1* | 9/2014 | Hasegawa ............ | H04N 9/3185 |
| | | | 345/647 |
| 2018/0359466 A1 | 12/2018 | Sugiura | |
| 2022/0191392 A1* | 6/2022 | Kurota ................... | H04N 5/272 |

* cited by examiner

FIG. 8

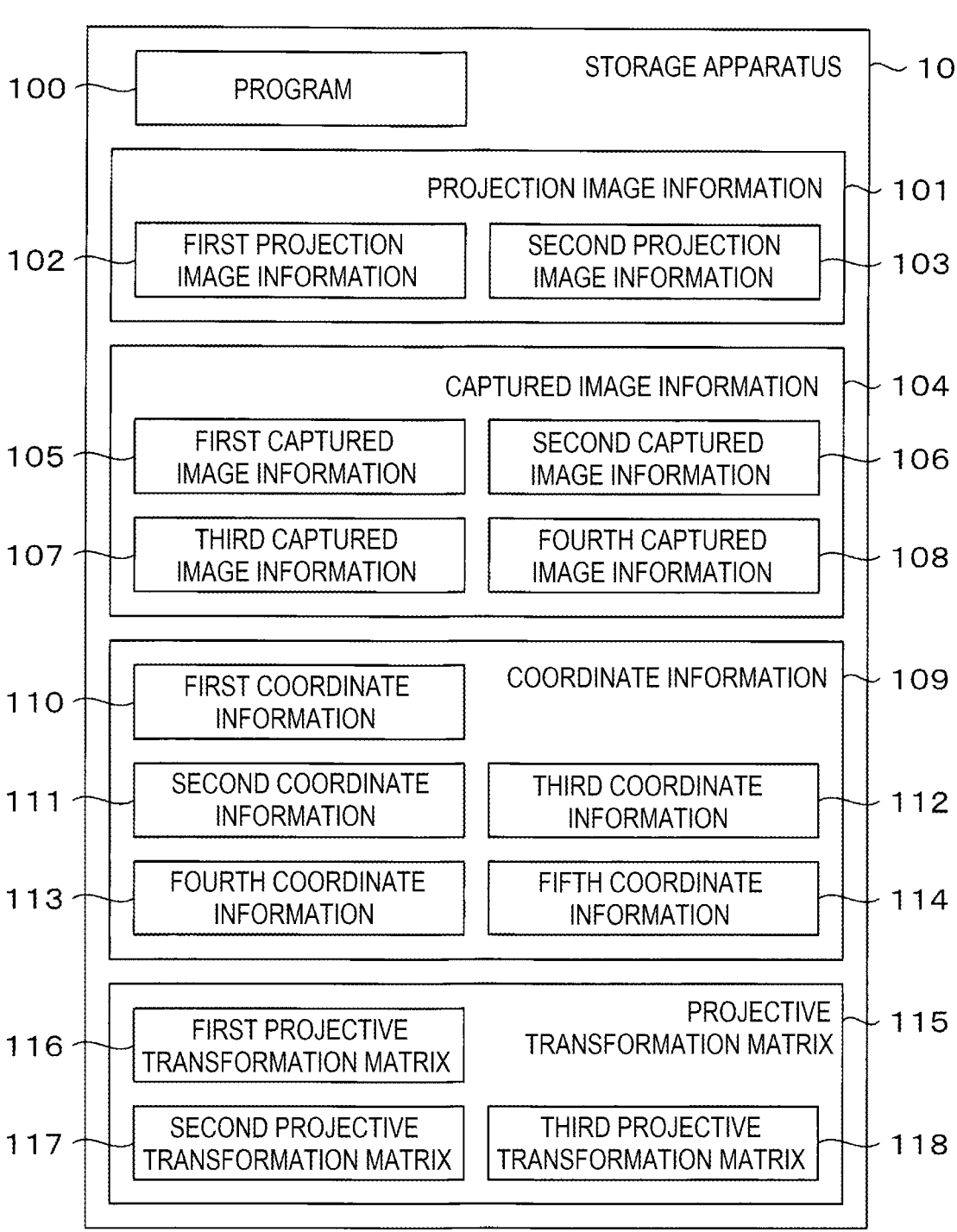

STORAGE APPARATUS ~ 10

100 — PROGRAM

PROJECTION IMAGE INFORMATION ~ 101

102 — FIRST PROJECTION IMAGE INFORMATION

SECOND PROJECTION IMAGE INFORMATION ~ 103

CAPTURED IMAGE INFORMATION ~ 104

105 — FIRST CAPTURED IMAGE INFORMATION

SECOND CAPTURED IMAGE INFORMATION ~ 106

107 — THIRD CAPTURED IMAGE INFORMATION

FOURTH CAPTURED IMAGE INFORMATION ~ 108

COORDINATE INFORMATION ~ 109

110 — FIRST COORDINATE INFORMATION

111 — SECOND COORDINATE INFORMATION

THIRD COORDINATE INFORMATION ~ 112

113 — FOURTH COORDINATE INFORMATION

FIFTH COORDINATE INFORMATION ~ 114

PROJECTIVE TRANSFORMATION MATRIX ~ 115

116 — FIRST PROJECTIVE TRANSFORMATION MATRIX

117 — SECOND PROJECTIVE TRANSFORMATION MATRIX

THIRD PROJECTIVE TRANSFORMATION MATRIX ~ 118

START

S201 — DISPLAY PROJECTION IMAGE

S202 — ACQUIRE CAPTURED IMAGE

S203 — DETECT POINT FROM CAPTURED IMAGE

S204 — GENERATE PROJECTIVE TRANSFORMATION MATRIX

S205 — DISPLAY PROJECTION IMAGE

S206 — ACQUIRE CAPTURED IMAGE

S207 — DETECT POINT FROM CAPTURED IMAGE

S208 — GENERATE PROJECTIVE TRANSFORMATION MATRIX

S209 — CORRECT SHAPE OF PROJECTION IMAGE

END

Figure 27:
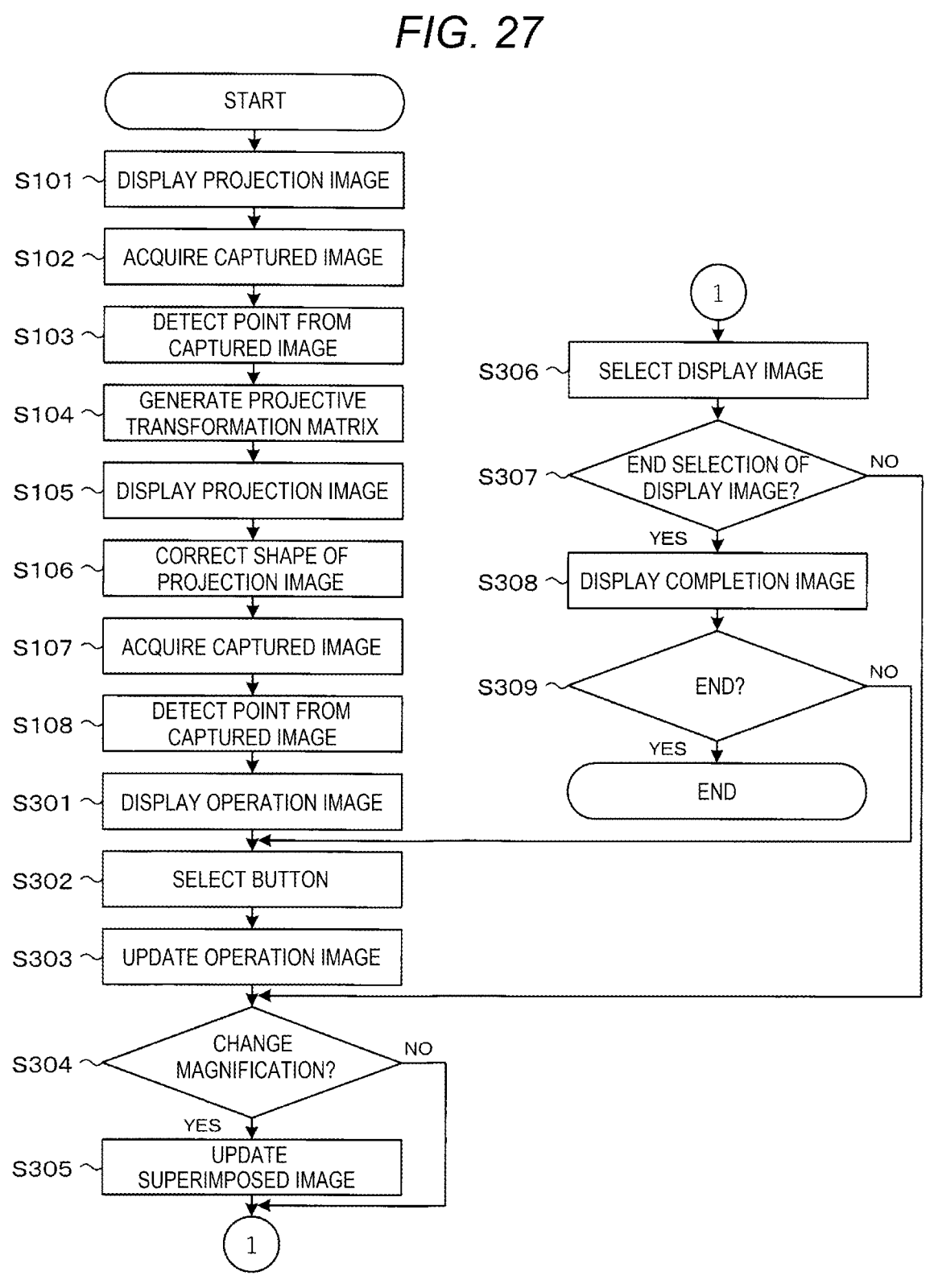

START

S101 — DISPLAY PROJECTION IMAGE

S102 — ACQUIRE CAPTURED IMAGE

S103 — DETECT POINT FROM CAPTURED IMAGE

S104 — GENERATE PROJECTIVE TRANSFORMATION MATRIX

S105 — DISPLAY PROJECTION IMAGE

S106 — CORRECT SHAPE OF PROJECTION IMAGE

S107 — ACQUIRE CAPTURED IMAGE

S108 — DETECT POINT FROM CAPTURED IMAGE

S301 — DISPLAY OPERATION IMAGE

S302 — SELECT BUTTON

S303 — UPDATE OPERATION IMAGE

S304 — CHANGE MAGNIFICATION?  NO

YES

S305 — UPDATE SUPERIMPOSED IMAGE

1

1

S306 — SELECT DISPLAY IMAGE

S307 — END SELECTION OF DISPLAY IMAGE?  NO

YES

S308 — DISPLAY COMPLETION IMAGE

S309 — END?  NO

YES

END

NON-TRANSITORY COMPUTER-READABLE STORAGE MEDIUM STORING PROGRAM, POINT SELECTION METHOD, AND INFORMATION PROCESSING APPARATUS

The present application is based on, and claims priority from JP Application Serial Number 2023-003592, filed Jan. 13, 2023, the disclosure of which is hereby incorporated by reference herein in its entirety.

BACKGROUND

1. Technical Field

The present disclosure relates to a non-transitory computer-readable storage medium storing a program, a point selection method, and an information processing apparatus.

2. Related Art

There has been developed a technique for correcting a position of an image displayed on a projection surface by an apparatus such as a projector and a shape of the image. For example, JP-A-2022-092169 discloses a projector that corrects an image displayed on a projection surface and thus displays the image at the same position as a position where the image is displayed in a specific period.

JP-A-2022-092169 is an example of the related art.

SUMMARY

To correct an image displayed on a projection surface, a projective transformation matrix is used, which is based on coordinates of a plurality of points detected from a plurality of captured images obtained by imaging a range including the image. When the points are detected by image processing from the captured images obtained by imaging the range including the image displayed on the projection surface, the number of points detected may be larger than the number required to generate the projective transformation matrix. Since more points than necessary may cause a decrease in accuracy of the generation of the projective transformation matrix, it is preferable to discard points and select points necessary for generating the projective transformation matrix from the plurality of detected points. However, the related art does not disclose any appropriate method for a user to select the points necessary for generating the projective transformation matrix from the plurality of detected points, and as a result, the image may not be appropriately corrected.

An aspect of a program according to the disclosure includes causing a processing apparatus to acquire a first captured image representing a result of imaging a range including a first display area that has a corner, the first display area being located on a projection surface on which a first projection image is displayed by a first projection apparatus, detect, by performing image processing on the first captured image, a plurality of first feature points corresponding to a corner of a first image indicating the first display area in the first captured image, and display, by controlling a display apparatus, a first superimposed image obtained by superimposing at least a part of a plurality of first display images selected by a user on the first captured image, the plurality of first display images corresponding one-to-one to the plurality of first feature points.

An aspect of a point selection method according to the disclosure includes: acquiring a first captured image representing a result of imaging a range including a first display area that has a corner, the first display area being located on a projection surface on which a first projection image is displayed by a first projection apparatus, detecting, by performing image processing on the first captured image, a plurality of first feature points corresponding to a corner of a first image indicating the first display area in the first captured image, and displaying, by controlling a display apparatus, a first superimposed image obtained by superimposing at least a part of a plurality of first display images selected by a user on the first captured image, the plurality of first display images corresponding one-to-one to the plurality of first feature points.

An aspect of an information processing apparatus according to the disclosure includes a processing apparatus, in which the processing apparatus is configured to acquire a first captured image representing a result of imaging a range including a first display area that has a corner, the first display area being located on a projection surface on which a first projection image is displayed by a first projection apparatus, detect, by performing image processing on the first captured image, a plurality of first feature points corresponding to a corner of a first image indicating the first display area in the first captured image, and display, by controlling a display apparatus, a first superimposed image obtained by superimposing at least a part of a plurality of first display images selected by a user on the first captured image, the plurality of first display images corresponding one-to-one to the plurality of first feature points.

BRIEF DESCRIPTION OF THE DRAWINGS

FIG. 8 is a block diagram showing a configuration of a storage apparatus 10 according to the first embodiment.

FIG. 17 is a schematic diagram showing an outline of a projection system SysA according to a second embodiment.

FIG. 26 is a schematic diagram showing a captured image GS5$n$ obtained by changing a size of a captured image GS5 based on a magnification change operation from a user.

FIG. 27 is a flowchart showing an operation of the projection system SysA.

DESCRIPTION OF EMBODIMENTS

Figure 1:
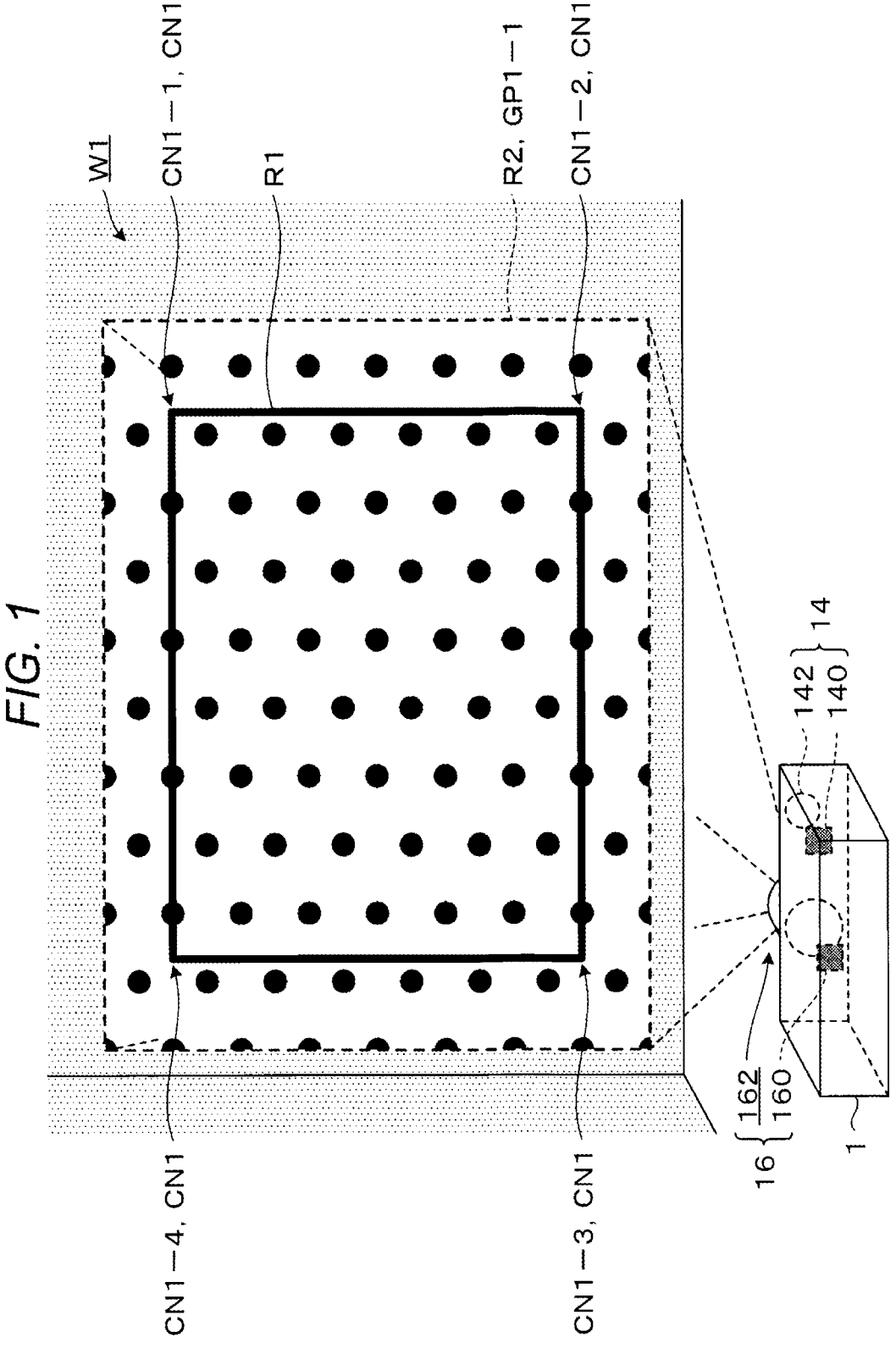
FIG. 1 is a schematic diagram showing a state in which a projection image GP1 is displayed in a first period.

Hereinafter, preferred embodiments according to the disclosure will be described with reference to the accompanying drawings. In the drawings, dimensions and scale of each part may be different from actual dimensions and scale, and some parts are schematically shown for easy understanding. In addition, the scope of the disclosure is not limited to the following embodiments unless otherwise specified in the following description.

1. First Embodiment

In a first embodiment, a program, a point selection method, and an information processing apparatus according to the disclosure will be described by showing a projector that performs a first correction of correcting, based on an operation from a user, a shape of an image displayed on a projection surface, and a second correction that is a correction for displaying the image corrected by the first correction at a predetermined position on the projection surface. In the second correction, a projective transformation matrix is used, which is generated based on coordinates of a plurality of points detected from a captured image obtained by imaging a range including the image displayed on the projection surface. The projector according to the embodiment displays, on the projection surface, a plurality of instruction images that are a plurality of images for the user to select a point necessary for generating the projective transformation matrix from the plurality of points detected from the captured image and that correspond one-to-one to the plurality of points detected from the captured image.

1.1. Outline of Projector

Hereinafter, an outline of a projector 1 according to the first embodiment will be described with reference to FIGS. 1 to 6.

FIG. 1 is a schematic diagram showing a state in which a projection image GP1 is displayed in a first period. The projector 1 displays the projection image GP1 by projecting projection light onto an area R2 on a wall surface W1 that is a projection surface. The projection image GP1 includes a plurality of points. The projection image GP1 in the first period may be referred to as a "projection image GP1-1".

The projector 1 includes an imaging apparatus 14 that images a range including a predetermined area on the projection surface, and a projection apparatus 16 that projects projection light onto the projection surface. The imaging apparatus 14 includes an imaging lens 142 for collecting light, and an imaging element 140 that generates a captured image by converting the light collected by the imaging lens 142 into an electric signal. The imaging element 140 includes a plurality of pixels. The projection apparatus 16 includes a light source (not shown), an optical modulator 160 that modulates light emitted from the light source into the projection light for displaying the projection image on the projection surface, and a projection lens 162 that projects the projection light modulated by the optical modulator 160 onto the projection surface. The optical modulator 160 includes a plurality of pixels. The projector 1 controls the projection apparatus 16 to display the projection image on the projection surface. In the present embodiment, the projector 1 controls the projection apparatus 16 to display the projection image on the wall surface W1.

In the first period, the projector 1 controls the imaging apparatus 14 to image a range including the area R2 where the projection image GP1-1 is displayed. The area R2 includes an area R1. That is, the projector 1 images a range including the area R1. The area R1 has a plurality of corners CN1. The plurality of corners CN1 include a corner CN1-1, a corner CN1-2, a corner CN1-3, and a corner CN1-4. The area R1 may be, for example, an area located on a screen provided on the wall surface W1 and surrounded by a frame of the screen, or an area on the wall surface W1 surrounded by a frame line drawn on a part of a surface of the wall surface W1. The projector 1 generates information indicating a correspondence relationship between the plurality of pixels of the optical modulator 160 and the plurality of pixels of the imaging element 140 based on a captured image representing a result of imaging the range including the area R2 where the projection image GP1-1 is displayed and the image projected from the projector 1 when the projection image GP1-1 is displayed.

A position of the area R1, specifically, positions of four corners of the area R1 are explicitly shown on the wall surface W1. In FIG. 1, the position of the area R1 is shown by a thick straight line, but is not limited thereto. For example, the position of the area R1 may be indicated by attaching a marker indicating a position of the corner of the area R1 to each of the four corners of the area R1. In FIG. 1, the thick straight line indicating the position of the area R1 corresponds to the frame of the screen or the frame line drawn on a part of the surface of the wall surface W1.

Figure 2:
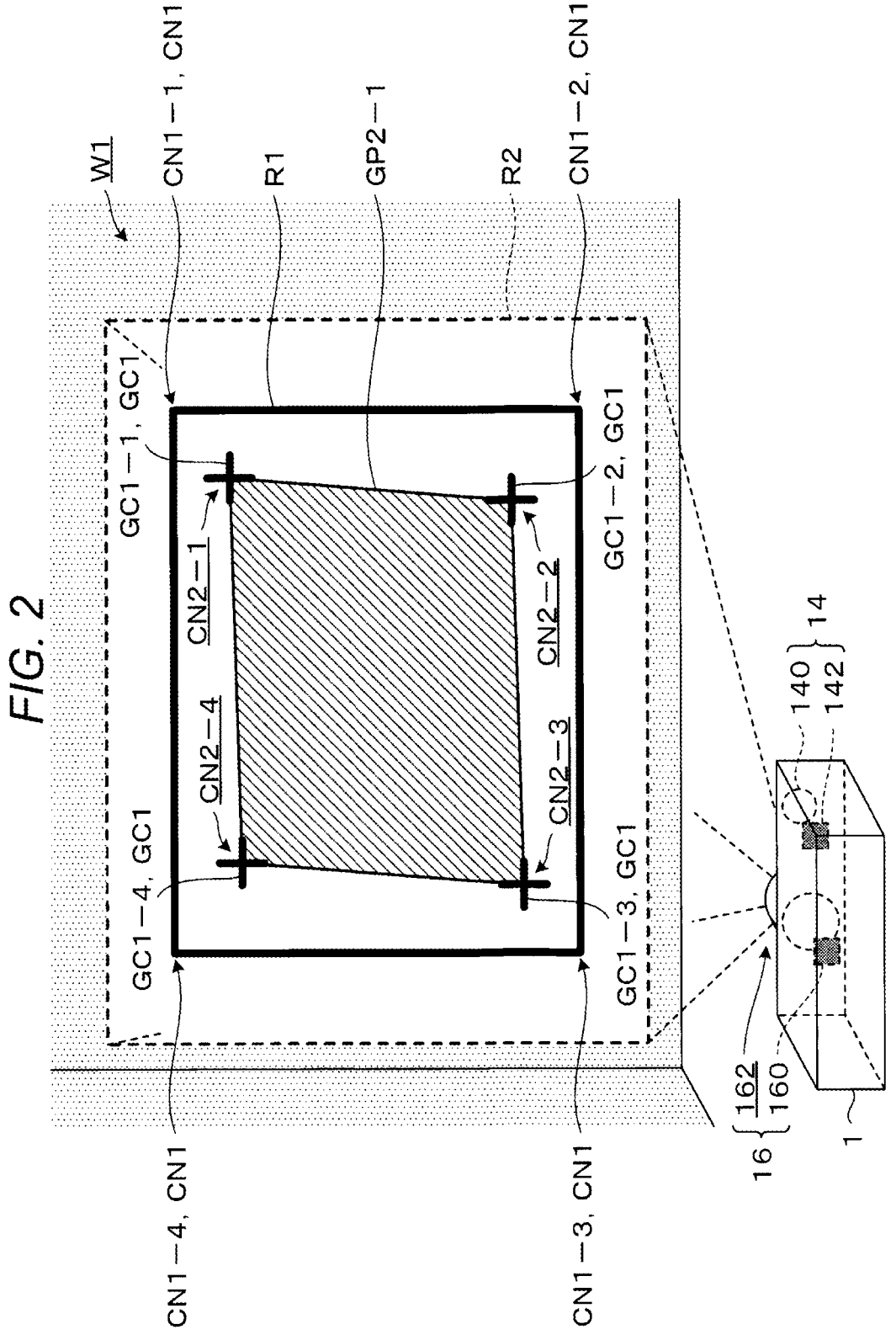
FIG. 2 is a schematic diagram showing a state in which a projection image GP2 is displayed in a second period.

FIG. 2 is a schematic diagram showing a state in which a projection image GP2 is displayed in a second period. The second period is a period after the first period. The projector 1 controls the projection apparatus 16 to display the projection image GP2 in the area R1 on the wall surface W1. The projection image GP2 has a corner CN2-1, a corner CN2-2, a corner CN2-3, and a corner CN2-4. The projection image GP2 in the second period may be referred to as a "projection image GP2-1".

The projector 1 controls the projection apparatus 16 to display a pointer image GC1-1 indicating a position of the corner CN2-1, a pointer image GC1-2 indicating a position of the corner CN2-2, a pointer image GC1-3 indicating a position of the corner CN2-3, and a pointer image GC1-4 indicating a position of the corner CN2-4. The pointer images GC1-1 to GC1-4 each have, for example, a cross shape in which two straight lines intersect each other. When the pointer images GC1-1 to GC1-4 are not distinguished, the pointer images GC1-1 to GC1-4 may each be referred to as a "pointer image GC1".

By performing an operation of moving the pointer image GC1, the user changes the position of the corner of the projection image GP2 indicated by the pointer image GC1. For example, the user changes the position of the corner CN2-1 indicated by the pointer image GC1-1 by performing an operation of moving the pointer image GC1-1. The projector 1 corrects a shape of the projection image GP2 by changing the position of the corner of the projection image GP2 based on the operation from the user for moving the pointer image GC1. The user corrects the shape of the projection image GP2 into a desired shape by changing the position of the corner of the projection image GP2. For example, the shape of the projection image GP2 is corrected by the user to be substantially similar to the screen frame. That is, when the screen frame is rectangular, the shape of the projection image GP2 is adjusted based on the operation from the user such that the shape of the projection image GP2 is also rectangular. The correction of the shape of the projection image based on the operation from the user may be referred to as a "first correction".

Figure 3:
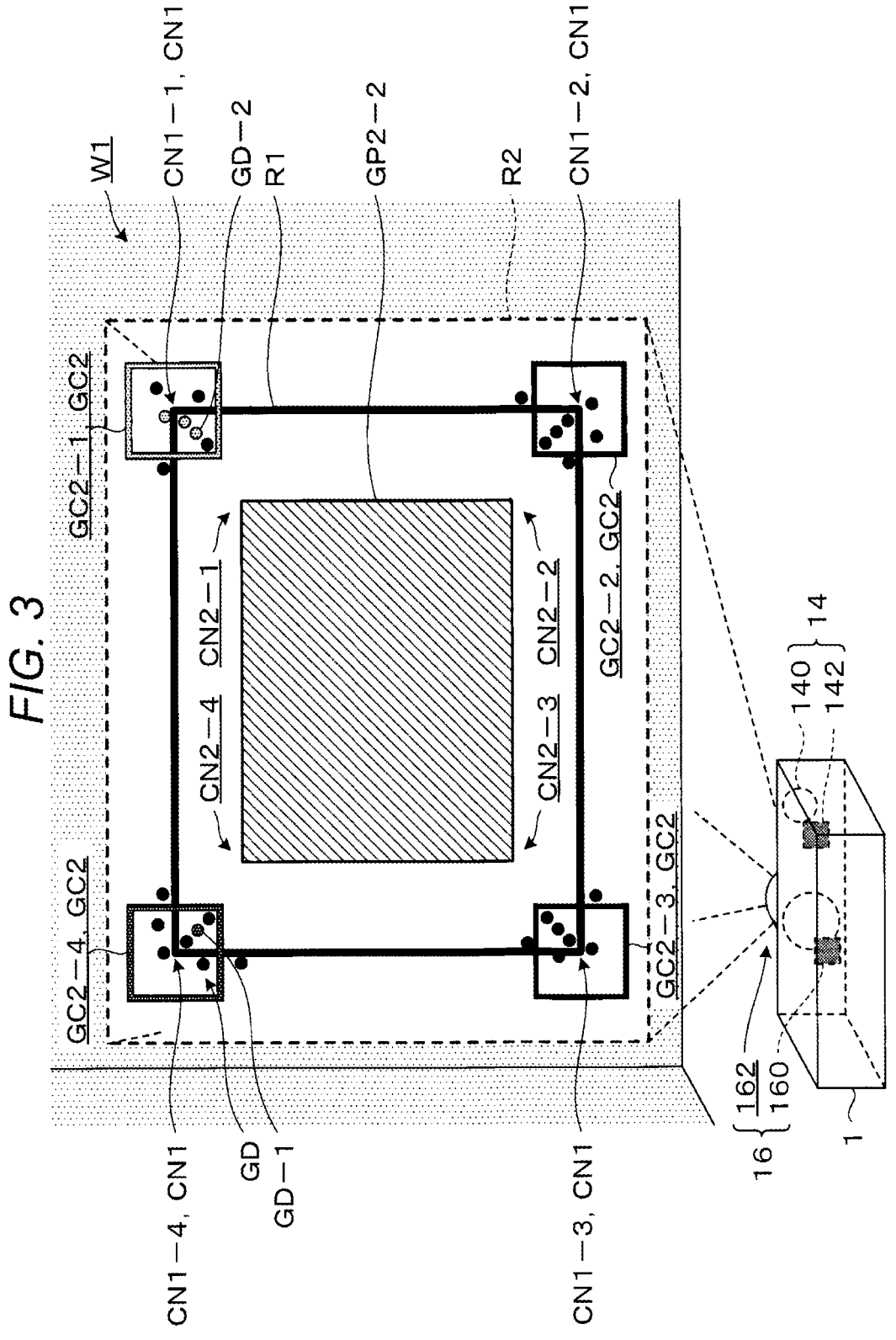
FIG. 3 is a schematic diagram showing a state in which the projection image GP2 is displayed in a third period.

FIG. 3 is a schematic diagram showing a state in which the projection image GP2 is displayed in a third period. The third period is a period after the second period. The projection image GP2 in the third period may be referred to as a "projection image GP2-2". The projection image GP2-2 is the projection image GP2 on which the first correction is performed. The projection image GP2-2 is displayed in the area R1.

In the third period, the projector 1 controls the imaging apparatus 14 to image a range including the area R1 where the projection image GP2-2 is displayed. The projector 1 performs image processing on a captured image representing a result of imaging the range including the area R1 where the projection image GP2-2 is displayed, and thus detects a plurality of points corresponding to four corners of an image indicating the area R1 in the captured image. In order to detect the plurality of points, it is preferable that the range including the area R1 is imaged in a state in which the projection light reaches not only inside of the area R1 but also the thick straight line (for example, the screen frame) indicating the area R1. Accordingly, brightness of the thick straight line, such as the screen frame, is increased, and a plurality of points related to the screen frame are easily detected.

The projector 1 controls the projection apparatus 16 to display, on the wall surface W1, a corner image GC2-1 indicating a position of the corner CN1-1, a corner image GC2-2 indicating a position of the corner CN1-2, a corner image GC2-3 indicating a position of the corner CN1-3, and a corner image GC2-4 indicating a position of the corner CN1-4. When the corner images GC2-1 to GC2-4 are not distinguished, the corner images GC2-1 to GC2-4 may each be referred to as a "corner image GC2".

The projector 1 controls the projection apparatus 16 to display, on the wall surface W1, a plurality of instruction images GD corresponding one-to-one to the plurality of points detected from the captured image representing the result of imaging the range including the area R1 where the projection image GP2-2 is displayed. The plurality of instruction images GD are images for indicating, to the user, a relative positional relationship between the plurality of points detected from the captured image and the image indicating the area R1 in the captured image. The plurality of instruction images GD include one or more instruction images GD corresponding to the corner CN1-1, one or more instruction images GD corresponding to the corner CN1-2, one or more instruction images GD corresponding to the corner CN1-3, and one or more instruction images GD corresponding to the corner CN1-4. The one or more instruction images GD corresponding to the corner CN1-1 include an instruction image GD-2. The one or more instruction images GD corresponding to the corner CN1-4 include an instruction image GD-1. A display mode of the instruction image GD is different from a display mode of the pointer image GC1.

The user performs an operation of selecting one corner image GC2 from the corner images GC2-1 to GC2-4. In other words, the user performs an operation of selecting the corner of the area R1 indicated by one corner image GC2 among the corner images GC2-1 to GC2-4. The projector 1 selects one corner image GC2 among the corner images GC2-1 to GC2-4 based on the operation from the user. For example, the user performs an operation of selecting the corner image GC2-4 from the corner images GC2-1 to GC2-4. In other words, the user performs an operation of selecting the corner CN1-4 indicated by the corner image GC2-4 among the corner images GC2-1 to GC2-4. The projector 1 selects the corner image GC2-4 among the corner images GC2-1 to GC2-4 based on the operation from the user. The projector 1 may change a display mode of the one corner image GC2 selected by the user. For example, when the corner image GC2-4 is selected by the user, the projector 1 may control the projection apparatus 16 to make a display mode of the corner image GC2-4 different from display modes of the other corner images GC2-1 to GC2-3. Accordingly, the user can easily check the currently selected corner image GC2.

When one corner image GC2 is selected from the corner images GC2-1 to GC2-4, the user performs an operation of determining one instruction image GD serving as a selection candidate from the one or more instruction images GD corresponding to the corner of the area R1 indicated by the one corner image GC2. The projector 1 determines one instruction image GD serving as the selection candidate based on the operation from the user. The projector 1 controls the projection apparatus 16 to display the one instruction image GD in a manner distinguishable from the other instruction images GD. For example, when the corner image GC2-4 is selected from the corner images GC2-1 to GC2-4 whereas the instruction image GD-1 is determined as one instruction image GD serving as the selection candidate from the one or more instruction images GD corresponding to the corner CN1-4 indicated by the corner image GC2-4, the projector 1 controls the projection apparatus 16 to display the instruction image GD-1 in a manner distinguishable from the other instruction images GD. Specifically, the projector 1 controls the projection apparatus 16 to change a display mode of the instruction image GD-1 along with a lapse of time. More specifically, the projector 1 repeatedly blinks the instruction image GD-1 to display the instruction image GD-1 in a manner distinguishable from the other instruction images GD.

When one instruction image GD among the plurality of instruction images GD is displayed in a manner distinguishable from the other instruction images GD, the user performs an operation of selecting the one instruction image GD. The projector 1 selects, based on the operation from the user, a point corresponding to the one instruction image GD, which is a point detected from the captured image representing the result of imaging the range including the area R1 where the projection image GP2-2 is displayed. The projector 1 controls the projection apparatus 16 to change the display mode of the one instruction image GD. For example, when the instruction image GD-2 among the plurality of instruction images GD is displayed in a manner distinguishable from the other instruction images GD, the user performs an operation of selecting the instruction image GD-2. The projector 1 selects a point corresponding to the instruction image GD-2, which is a point detected from the captured image representing the result of imaging the range including the area R1 where the projection image GP2-2 is displayed. The projector 1 controls the projection apparatus 16 to change a display mode of the instruction image GD-2. Specifically, the projector 1 controls the projection apparatus 16 to change a color of the instruction image GD-2. Accordingly, the user can easily check selection of the point corresponding to the instruction image GD whose display mode is changed.

When the point corresponding to the one instruction image GD displayed in a manner distinguishable from the other instruction images GD is selected based on an operation from the user for selecting the one instruction image GD, the user may perform an operation of determining another instruction image GD different from the one instruction image GD as the selection candidate. The projector 1 determines the different instruction image GD as the selection candidate based on the operation from the user. That is, the projector 1 controls the projection apparatus 16 to display the different instruction image GD in a manner distinguishable from the other instruction images GD. The user may perform an operation of selecting the different instruction image GD displayed in a manner distinguishable from the other instruction images GD. The projector 1 selects a point corresponding to the different instruction image GD, which is a point detected from the captured image representing the result of imaging the range including the area R1 where the projection image GP2-2 is displayed. The projector 1 controls the projection apparatus 16 to change a display mode of the different instruction image GD. That is, the user selects one or more instruction images GD from the one or more instruction images GD corresponding to the corner of the area R1 indicated by the one corner image GC2 selected from the corner images GC2-1 to GC2-4. The projector 1 selects one or more points corresponding one-to-one to the one or more instruction images GD selected by the user, which are one or more points detected from the captured image representing the result of imaging the range including the area R1 where the projection image GP2-2 is displayed.

When the selection of the one or more points from the one or more points corresponding one-to-one to the one or more instruction images GD corresponding to the corner of the area R1 indicated by the one corner image GC2 selected from the corner images GC2-1 to GC2-4 is completed, the projector 1 controls the projection apparatus 16 to change the display mode of the one corner image GC2. For example, in a case where the corner image GC2-1 is selected from the corner images GC2-1 to GC2-4, when selection of one or more points from one or more points corresponding one-to-one to the one or more instruction images GD corresponding to the corner CN1-1 indicated by the corner image GC2-1 is completed, the projector 1 controls the projection apparatus 16 to change the display mode of the corner image GC2-1. Specifically, the projector 1 controls the projection apparatus 16 to change a color of the corner image GC2-1. Accordingly, the user can easily check the selection of the one or more points from the one or more points corresponding one-to-one to the one or more instruction images GD corresponding to the corner of the area R1 indicated by the corner image GC2 whose display mode is changed.

The user selects one or more instruction images GD at each of the four corners of the area R1. That is, the user selects one or more instruction images GD from the one or more instruction images GD corresponding to the corner CN1-1 indicated by the corner image GC2-1. The user selects one or more instruction images GD from the one or more instruction images GD corresponding to the corner CN1-2 indicated by the corner image GC2-2. The user selects one or more instruction images GD from the one or more instruction images GD corresponding to the corner CN1-3 indicated by the corner image GC2-3. The user selects one or more instruction images GD from the one or more instruction images GD corresponding to the corner CN1-4 indicated by the corner image GC2-4. Accordingly, the projector 1 selects four or more points corresponding one-to-one to four or more instruction images GD selected by the user, which are four or more points detected from the captured image representing the result of imaging the range including the area R1 where the projection image GP2-2 is displayed.

Figure 4:
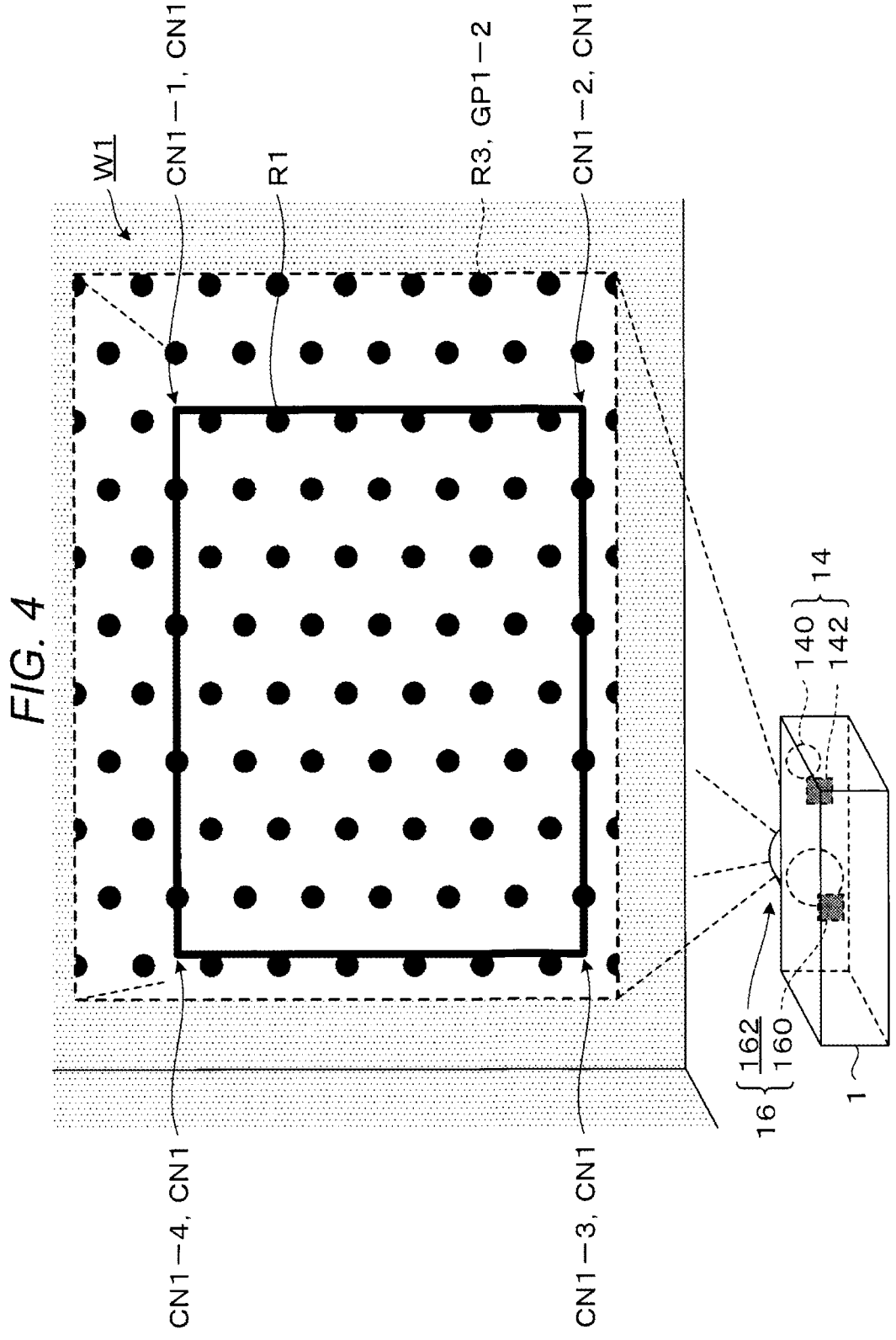
FIG. 4 is a schematic diagram showing a state in which the projection image GP1 is displayed in a fourth period.

FIG. 4 is a schematic diagram showing a state in which the projection image GP1 is displayed in a fourth period. The fourth period is a period after the third period. Specifically, the fourth period is a period after the user selects one or more instruction images GD at each of the four corners of the area R1.

In the fourth period, it is assumed that a position, an orientation, an angle, and the like of the projector 1 are different from a position, an orientation, an angle, and the like of the projector 1 in each of the first period, the second period, and the third period. Such a change in the position, the orientation, the angle, and the like of the projector 1 may be caused by, for example, unintended contact of the user with the projector 1. That is, the projector 1 displays the projection image GP1 by projecting the projection light onto an area R3 different from the area R2 on the wall surface W1 onto which the projection light is projected in the first period, the second period, and the third period. The area R3 includes the area R1. The projection image GP1 in the fourth period may be referred to as a "projection image GP1-2".

In the fourth period, the projector 1 controls the imaging apparatus 14 to image a range including the area R3 where the projection image GP1-2 is displayed. That is, the projector 1 images a range including the area R1. The projector 1 generates the information indicating the correspondence relationship between the plurality of pixels of the optical modulator 160 and the plurality of pixels of the imaging element 140 based on a captured image representing a result of imaging the range including the area R3 where the projection image GP1-2 is displayed and the image projected from the projector 1 when the projection image GP1-2 is displayed.

Figure 5:
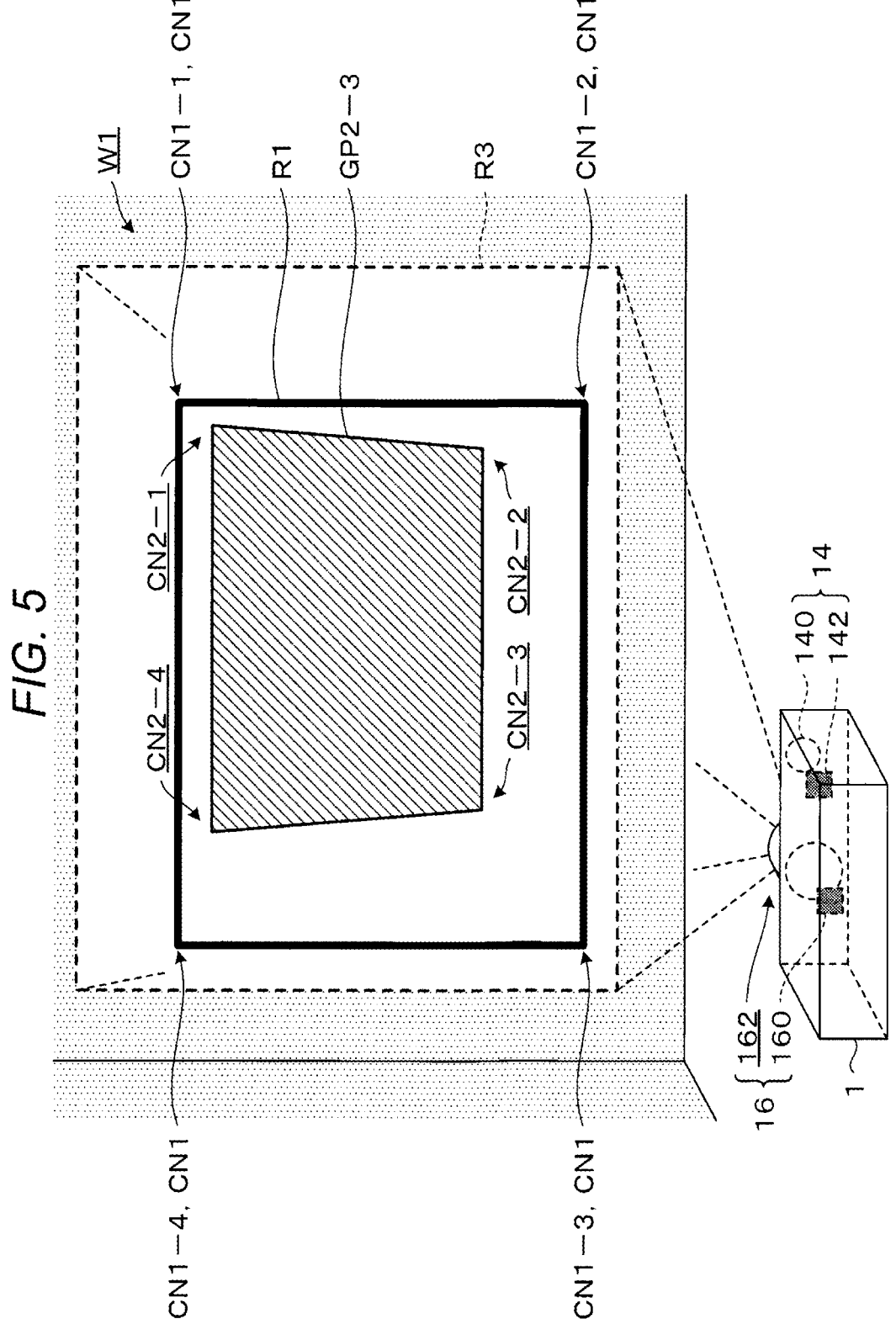
FIG. 5 is a schematic diagram showing a state in which the projection image GP2 is displayed in a fifth period.

FIG. 5 is a schematic diagram showing a state in which the projection image GP2 is displayed in a fifth period. The fifth period is a period after the fourth period. The projector 1 controls the projection apparatus 16 to display the projection image GP2 on the wall surface W1. Along with the change in the position, the orientation, the angle, and the like of the projector 1, a position where the projection image GP2 is displayed in the fifth period is different from a position where the projection image GP2 is displayed in the third period. A shape of the projection image GP2 in the fifth period is different from the shape of the projection image GP2 in the third period. The projection image GP2 in the fifth period may be referred to as a "projection image GP2-3". That is, a position where the projection image GP2-3 is displayed is different from a position where the projection image GP2-2 is displayed. A shape of the projection image GP2-3 is different from a shape of the projection image GP2-2. The projection image GP2-3 is displayed in the area R1. That is, the projection image GP2-3 is a projection image whose position and shape are deviated from the projection image GP2-2 desired by the user.

In the fifth period, the projector 1 controls the imaging apparatus 14 to image a range including the area R1 where the projection image GP2-3 is displayed. The projector 1 performs image processing on a captured image representing a result of imaging the range including the area R1 where the projection image GP2-3 is displayed, and thus detects a plurality of points corresponding to four corners of an image indicating the area R1 in the captured image.

The projector 1 generates a projective transformation matrix for correcting the position where the projection image GP2 is displayed and the shape of the projection image GP2 based on the information indicating the correspondence relationship between the plurality of pixels of the optical modulator 160 and the plurality of pixels of the imaging element 140, which is generated based on the captured image acquired in the first period, coordinates of the four or more points selected based on the operation from the user among the plurality of points detected from the captured image acquired in the third period, the information indicating the correspondence relationship between the plurality of pixels of the optical modulator 160 and the plurality of pixels of the imaging element 140, which is generated based on the captured image acquired in the fourth period, and coordinates of four or more points corresponding one-to-one to the four or more points selected based on the operation from the user among the plurality of points detected from the captured image acquired in the fifth period. Here, among the plurality of points detected from the captured image in the fifth period, the four or more points selected by the user in the third period are searched for. The projector 1 corrects the projection image GP2 based on the projective transformation matrix. The correction of the projection image using the projective transformation matrix generated based on the coordinates of the plurality of points detected from the captured image may be referred to as a "second correction".

Figure 6:
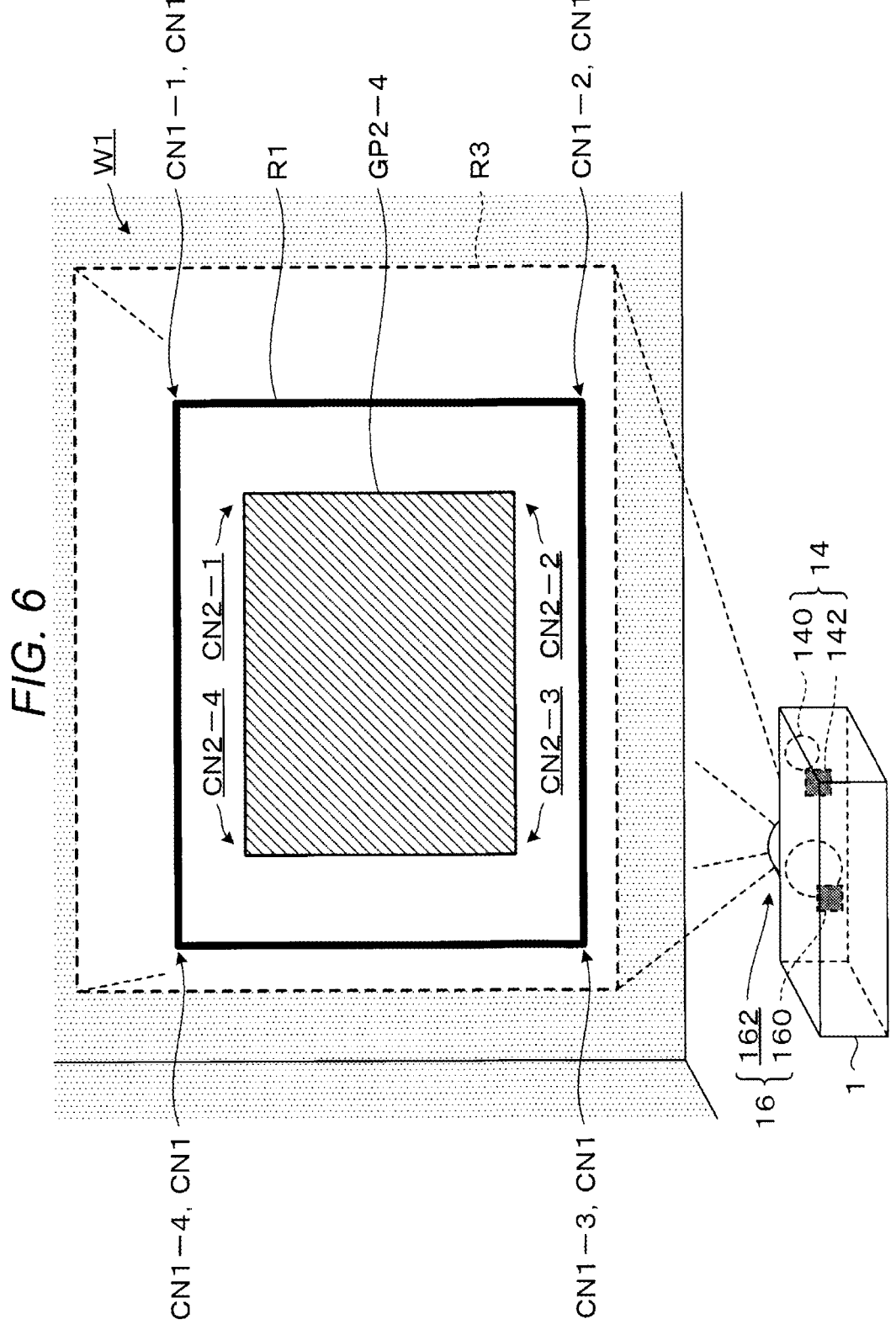
FIG. 6 is a schematic diagram showing a state in which the projection image GP2 is displayed in a sixth period.

FIG. 6 is a schematic diagram showing a state in which the projection image GP2 is displayed in a sixth period. The sixth period is a period after the fifth period. Specifically, the sixth period is a period after the second correction is performed. The projection image GP2 in the sixth period may be referred to as a "projection image GP2-4". The projection image GP2-4 is the projection image GP2 on which the second correction is performed. The projection image GP2-4 is displayed in the area R1.

A position where the projection image GP2-4 is displayed is the same as the position where the projection image GP2-2 is displayed. A shape of the projection image GP2-4 is the same as the shape of the projection image GP2-2. That is, even when the position, the orientation, the angle, and the like of the projector 1 change, by performing the second correction on the projection image GP2-3, the projector 1 can make the position where the projection image GP2-3 is displayed and the shape of the projection image GP2-3 similar to those of the projection image GP2-2, that is, the projection image GP2-3 can be substantially returned to the state of the projection image GP2-2. In other words, by performing the second correction on the projection image GP2, the projector 1 can maintain the same positional relationship between each of the four corners of the area R1 and a respective one of the four corners of the projection image GP2 as in the third period. Specifically, by performing the second correction on the projection image GP2 at a certain cycle, the position of the corner CN2-1 with respect to the corner CN1-1, the position of the corner CN2-2 with respect to the corner CN1-2, the position of the corner CN2-3 with respect to the corner CN1-3, and the position of the corner CN2-4 with respect to the corner CN1-4 can be maintained substantially constant. Therefore, by performing the second correction on the projection image GP2 of this time (in the fifth period), the state of the projection image GP2 of this time can be substantially returned to the state of the projection image GP2 of a previous time (in the third period). In addition, by performing the first correction based on the operation from the user, the projector 1 adjusts the shape of the projection image GP2-2 serving as a reference of the projection image GP2 displayed when the second correction is performed to a shape desired by the user. That is, by performing the second correction on the projection image GP2 on which the first correction is performed at a certain cycle, the user can easily adjust the shape of the projection image GP2-2 without accurately adjusting the position, the orientation, the angle, and the like of the projector 1.

The projector 1 displays, on the wall surface W1, the plurality of instruction images GD corresponding one-to-one to the plurality of points detected from the captured image acquired in the third period. In addition, the projector 1 selects four or more points based on an operation from the user for selecting the instruction image GD and performs the second correction based on coordinates of the selected four or more points. That is, the user can appropriately select a point necessary for the projective transformation matrix used for the second correction. In addition, the projector 1 can accurately generate the projective transformation matrix used for the second correction and can more accurately maintain the shape of the projection image GP2 in the shape desired by the user.

1.2. Configuration and Functions of Projector

Hereinafter, a configuration and functions of the projector 1 according to the first embodiment will be described with reference to FIGS. 7 to 14.

Figure 7:
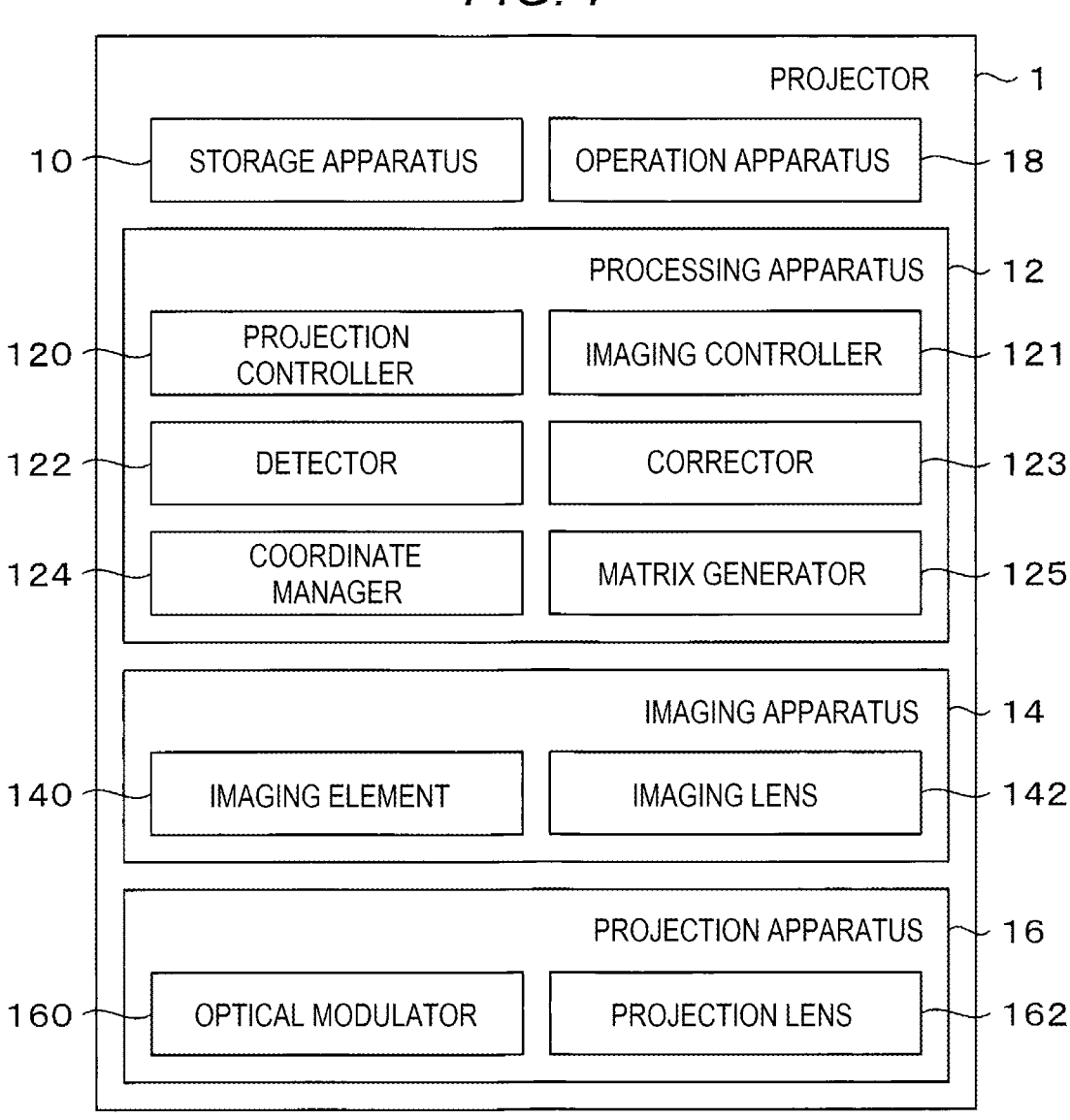
FIG. 7 is a block diagram showing a configuration of a projector 1 according to a first embodiment.

FIG. 7 is a block diagram showing the configuration of the projector 1 according to the first embodiment. The projector 1 includes a storage apparatus 10 that stores various types of information, a processing apparatus 12 that controls an operation of the projector 1, the imaging apparatus 14 that images a range including a predetermined area on the projection surface, the projection apparatus 16 that projects the projection light onto the projection surface, and an operation apparatus 18 that receives an input operation from the user. The processing apparatus 12 has functions as a projection controller 120, an imaging controller 121, a detector 122, a corrector 123, a coordinate manager 124, and a matrix generator 125. As described above, the imaging apparatus 14 includes the imaging element 140 and the imaging lens 142. As described above, the projection apparatus 16 includes the light source (not shown), the optical modulator 160, and the projection lens 162.

The storage apparatus 10 includes a volatile memory such as a RAM and a nonvolatile memory such as a ROM. Here, the RAM is an abbreviation for a random access memory. The ROM is an abbreviation for a read only memory.

FIG. 8 is a block diagram showing a configuration of the storage apparatus 10 according to the first embodiment. The nonvolatile memory provided in the storage apparatus 10 stores a program 100 for defining the operation of the projector 1, projection image information 101 representing an image projected onto the projection surface, captured image information 104 representing a result of imaging a range including an area on the projection surface on which the projection image is displayed, coordinate information 109 representing coordinates of points in various images, and a projective transformation matrix 115 used for two-dimensional coordinate transformation, image correction, and the like. The nonvolatile memory provided in the storage apparatus 10 is one example of the non-transitory computer-readable storage medium. As another example of the non-transitory computer-readable storage medium, CD-ROM (Compact Disc Read only Memory) or memory card may be used.

The projection image information 101 includes first projection image information 102 representing an image projected when the projection image GP1 is displayed and second projection image information 103 representing an image projected when the projection image GP2 is displayed.

The captured image information 104 includes first captured image information 105 representing the captured image acquired in the first period, second captured image information 106 representing the captured image acquired in the third period, third captured image information 107 representing the captured image acquired in the fourth period, and fourth captured image information 108 representing the captured image acquired in the fifth period.

The coordinate information 109 includes first coordinate information 110 representing coordinates of a plurality of points in the image indicated by the first projection image information 102, second coordinate information 111 representing coordinates of a plurality of points detected from the image indicated by the first captured image information 105, third coordinate information 112 representing coordinates of a plurality of points detected from the image indicated by the second captured image information 106, fourth coordinate information 113 representing coordinates of a plurality of points detected from the image indicated by the third captured image information 107, and fifth coordinate information 114 representing coordinates of a plurality of points detected from the image indicated by the fourth captured image information 108.

The projective transformation matrix 115 includes a first projective transformation matrix 116 representing the correspondence relationship between the plurality of pixels of the optical modulator 160 in the first period and the plurality of pixels of the imaging element 140 in the first period, a second projective transformation matrix 117 representing the correspondence relationship between the plurality of pixels of the optical modulator 160 in the fourth period and the plurality of pixels of the imaging element 140 in the fourth period, and a third projective transformation matrix 118 used for the second correction.

The volatile memory of the storage apparatus 10 is used as a work area for executing the program 100 in the processing apparatus 12.

A part or all of the storage apparatus 10 may be provided in an external storage apparatus, an external server, or the like. A part or all of the various types of information stored in the storage apparatus 10 may be stored in the storage apparatus 10 in advance, or may be acquired from the external storage apparatus, the external server, or the like.

Referring back to FIG. 7, the processing apparatus 12 includes one or more CPUs. The processing apparatus 12 may include a programmable logic device such as an FPGA instead of or in addition to a CPU. Here, the CPU is an abbreviation for a central processing unit, and the FPGA is an abbreviation for a field-programmable gate array.

By executing the program 100 by the CPU or the like of the processing apparatus 12, the processing apparatus 12 functions as the projection controller 120, the imaging controller 121, the detector 122, the corrector 123, the coordinate manager 124, and the matrix generator 125 shown in FIG. 7.

The projection controller 120 controls the projection apparatus to project projection light for displaying an image onto the projection surface. Specifically, the projection controller 120 displays the projection image on the projection surface by causing the projection apparatus to project the projection light based on the projection image information 101. In other words, the projection controller 120 displays the projection image on the projection surface by projecting the image indicated by the projection image information 101 from the projection apparatus. In addition, the projection controller 120 controls the projection apparatus to display, on the projection surface, an image for assisting the operation of the user.

In the embodiment, the projection controller 120 controls the projection apparatus 16 to project the projection light for displaying an image onto the wall surface W1.

Specifically, the projection controller 120 displays the projection image on the wall surface W1 by causing the projection apparatus 16 to project the projection light based on the projection image information 101. More specifically, the projection controller 120 displays the projection image GP1 on the wall surface W1 by causing the projection apparatus 16 to project the projection light based on the first projection image information 102. The projection controller 120 displays the projection image GP2 on the wall surface W1 by causing the projection apparatus 16 to project the projection light based on the second projection image information 103.

The projection controller 120 controls the projection apparatus 16 to display, on the wall surface W1, the pointer image GC1 located at the corner of the projection image GP2.

The projection controller 120 controls the projection apparatus 16 to display, on the wall surface W1, the corner image GC2 located at the corner of the area R1 on the wall surface W1. In addition, the projection controller 120 changes the display mode of the corner image GC2 based on the operation from the user.

The projection controller 120 controls the projection apparatus 16 to display, on the wall surface W1, the plurality of instruction images GD corresponding one-to-one to the plurality of points detected from the image indicated by the second captured image information 106. In addition, the projection controller 120 changes the display mode of the instruction image GD based on the operation from the user.

Figure 9:
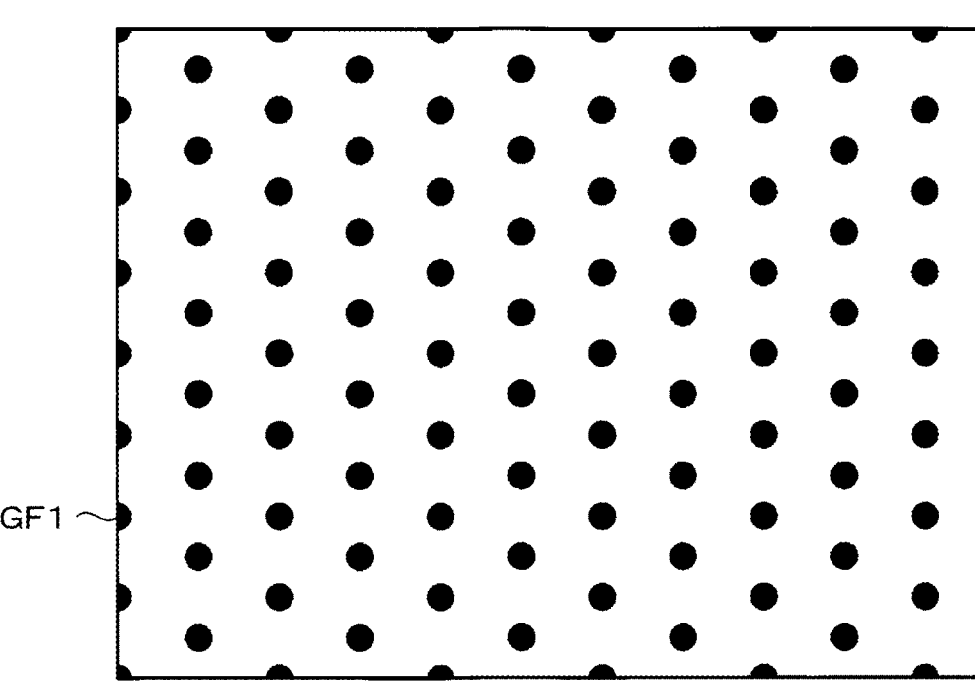
FIG. 9 is a schematic diagram showing an example of an image indicated by first projection image information 102.

FIG. 9 is a schematic diagram showing an example of the image indicated by the first projection image information 102. In the embodiment, the first projection image information 102 represents an image GF1. The projection controller 120 displays the projection image GP1 on the wall surface W1 by causing the projection apparatus 16 to project the projection light based on the first projection image information 102. In other words, the projection controller 120 displays the projection image GP1 on the wall surface W1 by projecting the image GF1 indicated by the first projection image information 102 from the projection apparatus 16.

The image GF1 includes a plurality of points. The plurality of points in the image GF1 correspond one-to-one to the plurality of points in the projection image GP1.

Referring back to FIG. 7, the imaging controller 121 controls the imaging apparatus to image a range including an area on the projection surface on which the projection image is displayed. The imaging controller 121 acquires a captured image representing a result of the imaging from the imaging apparatus. The imaging controller 121 stores, in the storage apparatus 10, the captured image information 104 representing the acquired captured image.

In the embodiment, the imaging controller 121 controls the imaging apparatus 14 to image a range including the area R2 on the wall surface W1 on which the projection image GP1-1 is displayed. The imaging controller 121 acquires a captured image representing a result of the imaging from the imaging apparatus 14. In addition, the imaging controller 121 stores, in the storage apparatus 10, the first captured image information 105 representing the acquired captured image.

The imaging controller 121 controls the imaging apparatus 14 to image a range including the area R3 on the wall surface W1 on which the projection image GP1-2 is displayed. The imaging controller 121 acquires a captured image representing a result of the imaging from the imaging apparatus 14. In addition, the imaging controller 121 stores, in the storage apparatus 10, the third captured image information 107 representing the acquired captured image.

The imaging controller 121 controls the imaging apparatus 14 to image a range including the area R1 on the wall surface W1 on which the projection image GP2-2 is displayed. The imaging controller 121 acquires a captured image representing a result of the imaging from the imaging apparatus 14. In addition, the imaging controller 121 stores, in the storage apparatus 10, the second captured image information 106 representing the acquired captured image.

The imaging controller 121 controls the imaging apparatus 14 to image a range including the area R1 on the wall surface W1 on which the projection image GP2-3 is displayed. The imaging controller 121 acquires a captured image representing a result of the imaging from the imaging apparatus 14. In addition, the imaging controller 121 stores, in the storage apparatus 10, the fourth captured image information 108 representing the acquired captured image.

The detector 122 detects a point in an image indicated by the various types of image information by performing image processing on the image. That is, the detector 122 acquires the coordinate information 109 representing coordinates of the detected point. The detector 122 stores the acquired coordinate information 109 in the storage apparatus 10.

In the embodiment, the detector 122 detects a plurality of points in the image indicated by the captured image information 104 by performing image processing on the image indicated by the captured image information 104. That is, the detector 122 acquires the coordinate information 109 representing coordinates of the plurality of points in the image indicated by the captured image information 104. The detector 122 stores the acquired coordinate information 109 in the storage apparatus 10.

Specifically, the detector 122 detects a plurality of points in the image indicated by the first captured image information 105 by performing image processing on the image indicated by the first captured image information 105. That is, the detector 122 acquires the second coordinate information 111 representing coordinates of the plurality of points in the image indicated by the first captured image information 105. The detector 122 stores the acquired second coordinate information 111 in the storage apparatus 10.

The detector 122 detects a plurality of points in the image indicated by the second captured image information 106 by performing image processing on the image indicated by the second captured image information 106. That is, the detector 122 acquires the third coordinate information 112 representing coordinates of the plurality of points in the image indicated by the second captured image information 106. The detector 122 stores the acquired third coordinate information 112 in the storage apparatus 10.

The detector 122 detects a plurality of points in the image indicated by the third captured image information 107 by performing image processing on the image indicated by the third captured image information 107. That is, the detector 122 acquires the fourth coordinate information 113 representing coordinates of the plurality of points in the image indicated by the third captured image information 107. The detector 122 stores the acquired fourth coordinate information 113 in the storage apparatus 10.

The detector 122 detects a plurality of points in the image indicated by the fourth captured image information 108 by performing image processing on the image indicated by the fourth captured image information 108. That is, the detector 122 acquires the fifth coordinate information 114 representing coordinates of the plurality of points in the image indicated by the fourth captured image information 108. The detector 122 stores the acquired fifth coordinate information 114 in the storage apparatus 10.

The detector 122 may detect a plurality of points in the image GF1 by performing image processing on the image GF1 indicated by the first projection image information 102. When the plurality of points in the image GF1 are detected, the detector 122 acquires the first coordinate information 110 representing coordinates of the plurality of points in the image GF1 indicated by the first projection image information 102. The detector 122 stores the acquired first coordinate information 110 in the storage apparatus 10. In the embodiment, it is assumed that the first coordinate information 110 is stored in the storage apparatus 10 in advance.

A known image processing technique may be used in the function related to the point detection. Examples of the known image processing technique related to point detection include template matching, center-of-gravity detection, and an algorithm called "AKAZE". In this specification, a detailed technical description related to point detection is omitted.

The coordinate manager 124 manages the coordinates of the point detected from the captured image based on the operation from the user. In addition, the coordinate manager 124 performs various types of processing related to the management of the coordinates of the point detected from the captured image.

In the embodiment, the coordinate manager 124 selects one corner image GC2 among the corner images GC2-1 to GC2-4 based on the operation from the user. In addition, the coordinate manager 124 determines whether an operation related to the management of the coordinates of the point detected from the captured image is received from the user.

Based on an operation from the user for selecting one instruction image GD displayed in a manner distinguishable from the other instruction images GD on the wall surface W1, the coordinate manager 124 selects a point that corresponds to the one instruction image GD, which is a point detected from the image indicated by the second captured image information 106. The coordinate manager 124 updates the third coordinate information 112 based on the operation from the user.

The matrix generator 125 generates the projective transformation matrix 115 based on coordinates of a plurality of points in the correspondence relationship. That is, the matrix generator 125 generates the projective transformation matrix 115 based on the coordinate information 109.

In the embodiment, the matrix generator 125 generates the first projective transformation matrix 116 based on the first coordinate information 110 and the second coordinate information 111. The matrix generator 125 stores the generated first projective transformation matrix 116 in the storage apparatus 10.

The first projective transformation matrix 116 is information indicating the correspondence relationship between the plurality of pixels of the optical modulator 160 in the first period and the plurality of pixels of the imaging element 140 in the first period. Specifically, the first projective transformation matrix 116 is a projective transformation matrix for transforming coordinates of each pixel of the imaging element 140 in the first period into coordinates of each pixel of the optical modulator 160 in the first period. In other words, the first projective transformation matrix 116 is a projective transformation matrix for transforming the coordinates of the pixel of the imaging element 140 before the position, the orientation, the angle, and the like of the projector 1 are changed into the coordinates of the pixel of the optical modulator 160 before the position, the orientation, the angle, and the like of the projector 1 are changed.

The matrix generator 125 generates the second projective transformation matrix 117 based on the first coordinate information 110 and the fourth coordinate information 113. The matrix generator 125 stores the generated second projective transformation matrix 117 in the storage apparatus 10.

The second projective transformation matrix 117 is information indicating the correspondence relationship between the plurality of pixels of the optical modulator 160 in the fourth period and the plurality of pixels of the imaging element 140 in the fourth period. Specifically, the second projective transformation matrix 117 is a projective transformation matrix for transforming the coordinates of each pixel of the imaging element 140 in the fourth period into the coordinates of each pixel of the optical modulator 160 in the fourth period. In other words, the second projective transformation matrix 117 is a projective transformation matrix for transforming the coordinates of the pixel of the imaging element 140 after the position, the orientation, the angle, and the like of the projector 1 are changed into the coordinates of the pixel of the optical modulator 160 after the position, the orientation, the angle, and the like of the projector 1 are changed.

The matrix generator 125 generates the third projective transformation matrix 118 based on the third coordinate information 112, the first projective transformation matrix 116, the fifth coordinate information 114, and the second projective transformation matrix 117. The matrix generator 125 stores the generated third projective transformation matrix 118 in the storage apparatus 10.

The third projective transformation matrix 118 is information indicating a correspondence relationship between the plurality of pixels of the optical modulator 160 in the third period and the plurality of pixels of the optical modulator 160 in the fifth period. Specifically, the third projective transformation matrix 118 is a projective transformation matrix for transforming the coordinates of each pixel of the optical modulator 160 in the third period into the coordinates of each pixel of the optical modulator 160 in the fifth period. In other words, the third projective transformation matrix 118 is a projective transformation matrix for transforming the coordinates of the pixel of the optical modulator 160 before the position, the orientation, the angle, and the like of the projector 1 are changed into the coordinates of the pixel of the optical modulator 160 after the position, the orientation, the angle, and the like of the projector 1 are changed.

The corrector 123 corrects a position and a shape of the projection image displayed on the projection surface. Specifically, the corrector 123 performs the first correction based on the operation from the user. The corrector 123 performs the second correction based on the projective transformation matrix 115 generated by the matrix generator 125.

In the embodiment, the corrector 123 performs the first correction of correcting the projection image GP2 by changing the position of the corner of the projection image GP2 based on the operation from the user for moving the pointer image GC1. In other words, the corrector 123 updates, based on the operation from the user for moving the pointer image GC1, the second projection image information 103 representing the image projected when the projection image GP2 is displayed.

The corrector 123 performs the second correction of correcting the projection image GP2 based on the third projective transformation matrix 118. In other words, the corrector 123 updates, based on the third projective transformation matrix 118, the second projection image information 103 representing the image projected when the projection image GP2 is displayed.

Figure 10:
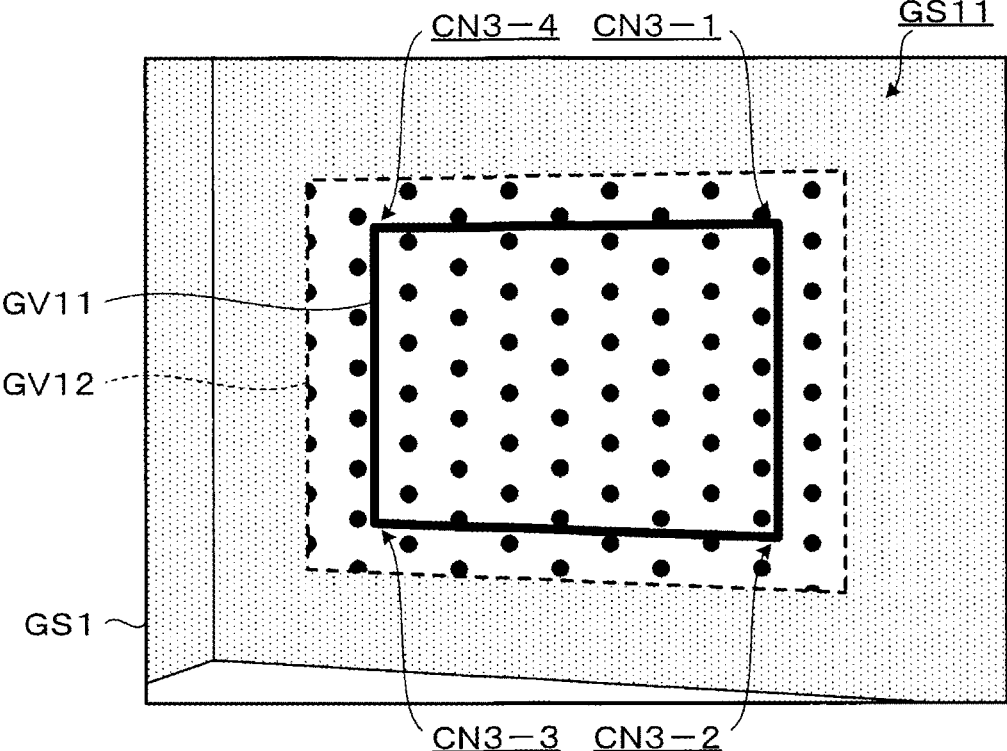
FIG. 10 is a schematic diagram showing an example of an image indicated by first captured image information 105.

FIG. 10 is a schematic diagram showing an example of the image indicated by the first captured image information 105. In the embodiment, the first captured image information 105 represents a captured image GS1.

The captured image GS1 includes an image GS11. The image GS11 is an image representing the wall surface W1. The image GS11 includes an image GV11 and an image GV12.

The image GV11 is an image representing the area R1. The image GV11 has a corner CN3-1, a corner CN3-2, a corner CN3-3, and a corner CN3-4. The corner CN3-1 corresponds to the corner CN1-1. The corner CN3-2 corresponds to the corner CN1-2. The corner CN3-3 corresponds to the corner CN1-3. The corner CN3-4 corresponds to the corner CN1-4.

The image GV12 is an image representing the projection image GP1-1. The image GV12 includes a plurality of points. The second coordinate information 111 represents coordinates of the plurality of points in the image GV12. The plurality of points in the image GV12 correspond one-to-one to the plurality of points in the projection image GP1-1. In addition, the plurality of points in the image GV12 correspond one-to-one to the plurality of points in the image GF1.

Figure 11:
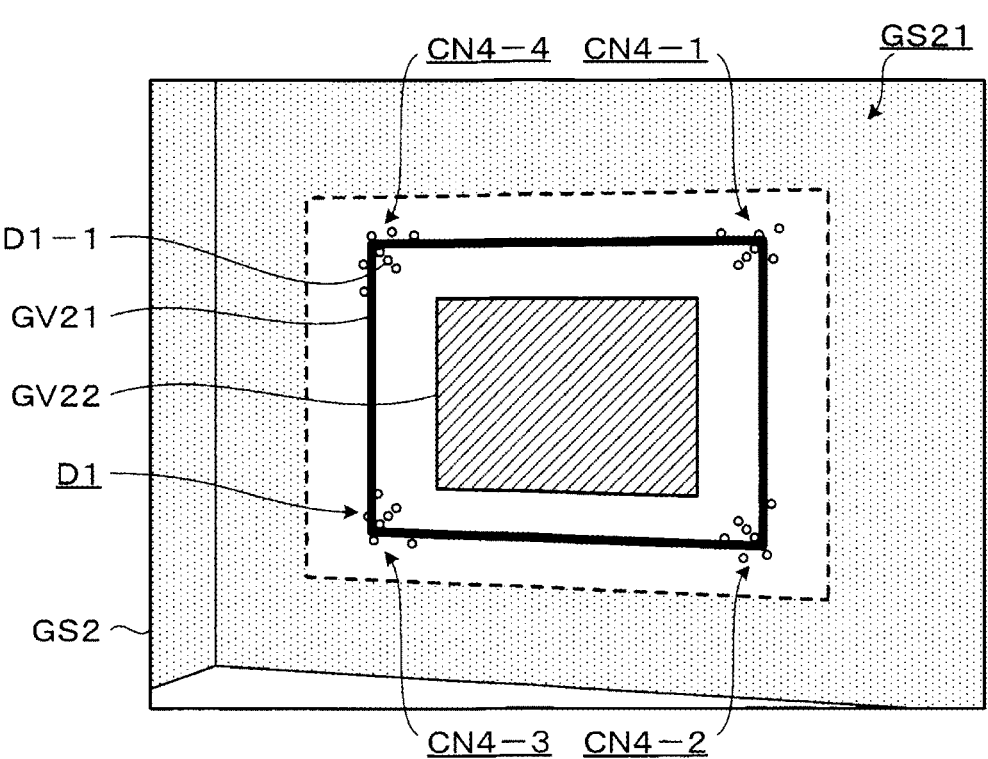
FIG. 11 is a schematic diagram showing an example of an image indicated by second captured image information 106.

FIG. 11 is a schematic diagram showing an example of the image indicated by the second captured image information 106. In the embodiment, the second captured image information 106 represents a captured image GS2.

The captured image GS2 includes an image GS21. The image GS21 is an image representing the wall surface W1. The image GS21 includes an image GV21 and an image GV22.

The image GV21 is an image representing the area R1. The image GV21 has a corner CN4-1, a corner CN4-2, a corner CN4-3, and a corner CN4-4. The corner CN4-1 corresponds to the corner CN1-1. That is, the corner CN4-1 corresponds to the corner image GC2-1. The corner CN4-2 corresponds to the corner CN1-2. That is, the corner CN4-2 corresponds to the corner image GC2-2. The corner CN4-3 corresponds to the corner CN1-3. That is, the corner CN4-3 corresponds to the corner image GC2-3. The corner CN4-4 corresponds to the corner CN1-4. That is, the corner CN4-4 corresponds to the corner image GC2-4. The image GV21 is an image representing the projection image GP2-2.

The captured image GS2 includes a plurality of points D1. The plurality of points D1 correspond one-to-one to the plurality of instruction images GD. The plurality of points D1 include one or more points D1 corresponding to the corner CN4-1, one or more points D1 corresponding to the corner CN4-2, one or more points D1 corresponding to the corner CN4-3, and one or more points D1 corresponding to the corner CN4-4. The plurality of points D1 include a point D1-1. The point D1-1 corresponds to the instruction image GD-1. For example, when the user performs an operation of selecting the instruction image GD-1, the coordinate manager 124 selects the point D1-1 corresponding to the instruction image GD-1. The coordinate manager 124 updates the third coordinate information 112 based on the operation from the user. The third coordinate information 112 updated based on the operation from the user represents coordinates of the point D1 selected based on the operation from the user.

Figure 12:
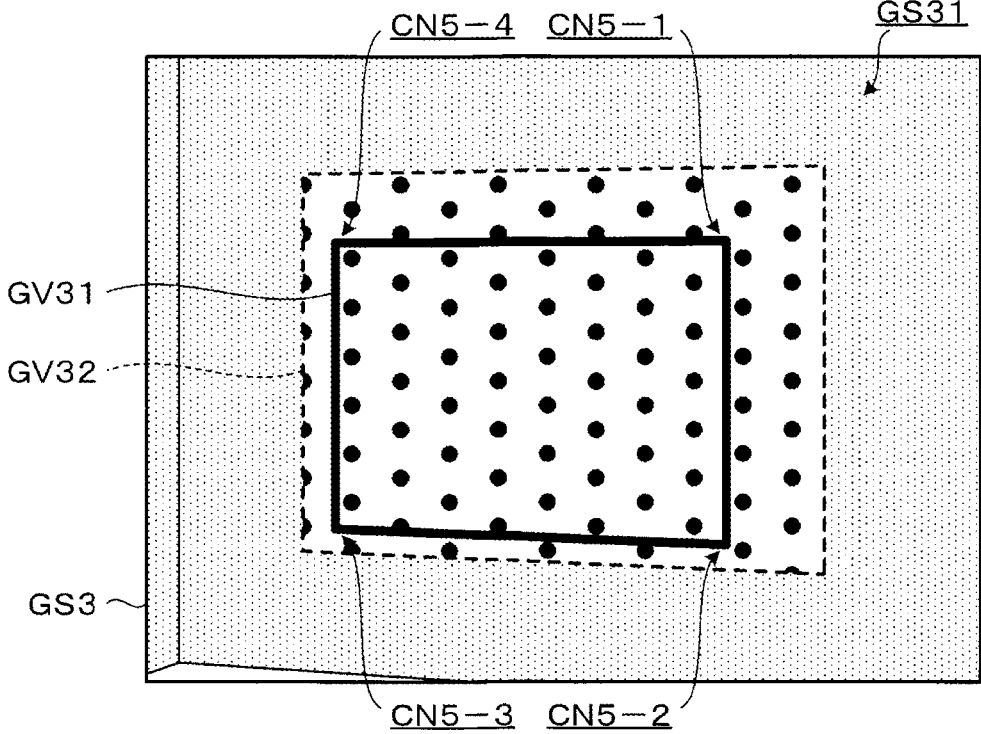
FIG. 12 is a schematic diagram showing an example of an image indicated by third captured image information 107.

FIG. 12 is a schematic diagram showing an example of the image indicated by the third captured image information 107. In the embodiment, the third captured image information 107 represents a captured image GS3.

The captured image GS3 includes an image GS31. The image GS31 is an image representing the wall surface W1. The image GS31 includes an image GV31 and an image GV32.

The image GV31 is an image representing the area R1. The image GV31 has a corner CN5-1, a corner CN5-2, a corner CN5-3, and a corner CN5-4. The corner CN5-1 corresponds to the corner CN1-1. The corner CN5-2 corresponds to the corner CN1-2. The corner CN5-3 corresponds to the corner CN1-3. The corner CN5-4 corresponds to the corner CN1-4.

The image GV32 is an image representing the projection image GP1-2. The image GV32 includes a plurality of points. The fourth coordinate information 113 represents coordinates of the plurality of points in the image GV32. The plurality of points in the image GV32 correspond one-to-one to the plurality of points in the projection image GP1-2. The plurality of points in the image GV32 correspond one-to-one to the plurality of points in the image GF1.

Figure 13:
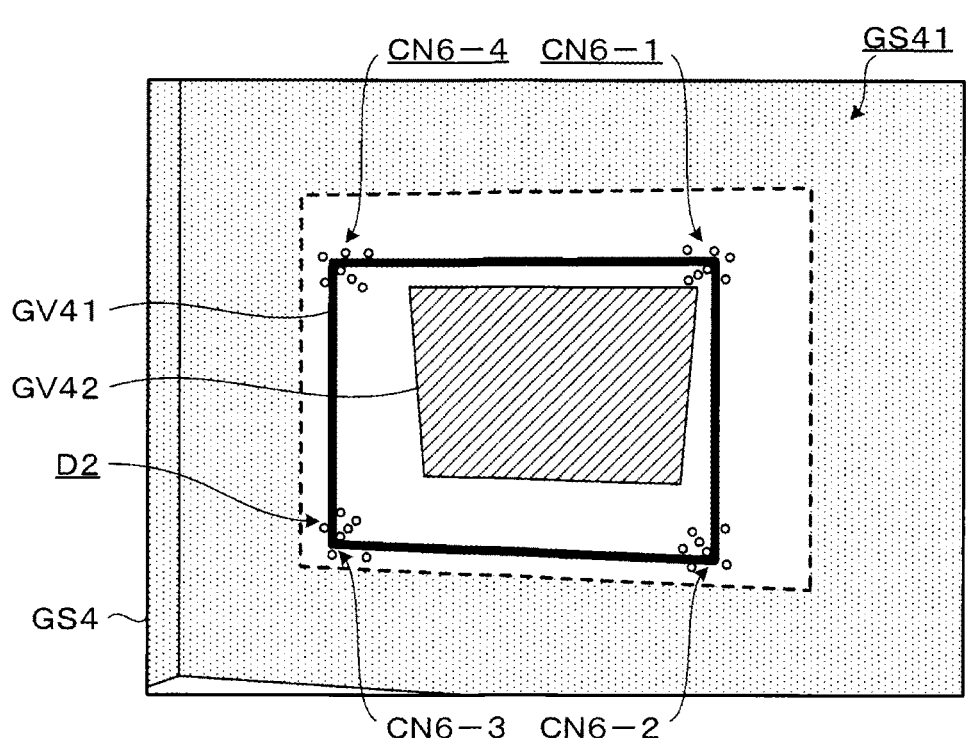
FIG. 13 is a schematic diagram showing an example of an image indicated by fourth captured image information 108.

FIG. 13 is a schematic diagram showing an example of the image indicated by the fourth captured image information 108. In the embodiment, the fourth captured image information 108 represents a captured image GS4.

The captured image GS4 includes an image GS41. The image GS41 is an image representing the wall surface W1. The image GS41 includes an image GV41 and an image GV42.

The image GV41 is an image representing the area R1. The image GV41 has a corner CN6-1, a corner CN6-2, a corner CN6-3, and a corner CN6-4. The corner CN6-1 corresponds to the corner CN1-1. The corner CN6-2 corresponds to the corner CN1-2. The corner CN6-3 corresponds to the corner CN1-3. The corner CN6-4 corresponds to the corner CN1-4. The image GV42 is an image representing the projection image GP2-3.

The captured image GS4 includes a plurality of points D2. The plurality of points D2 include one or more points D2 corresponding to the corner CN6-1, one or more points D2 corresponding to the corner CN6-2, one or more points D2 corresponding to the corner CN6-3, and one or more points D2 corresponding to the corner CN6-4. The fifth coordinate information 114 represents coordinates of the plurality of points D2.

Figure 14:
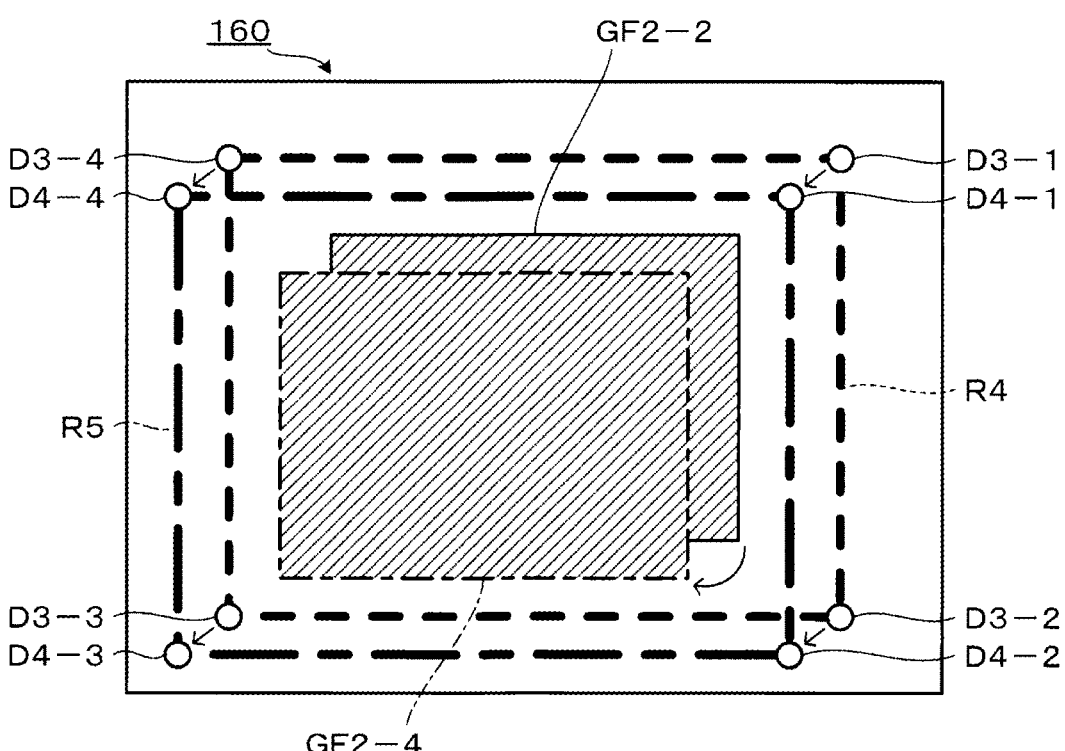
FIG. 14 is a schematic diagram showing a second correction.

FIG. 14 is a schematic diagram showing the second correction. FIG. 14 shows images displayed on the optical modulator 160 before and after the second correction. An image GF2-2 is an image displayed on the optical modulator 160 in the third period and the fifth period. That is, the image GF2-2 is an image indicated by the second projection image information 103 updated by the first correction. The image GF2-2 is an image before the second correction is performed. An image GF2-4 is an image displayed on the optical modulator 160 in the sixth period. That is, the image GF2-4 is an image indicated by the second projection image information 103 updated by the first correction and the second correction. The corrector 123 corrects the image GF2-2 to the image GF2-4 based on the third projective transformation matrix 118.

A point D3-1 is a point obtained by transforming coordinates of a point located at the corner CN4-1 of the image GV21 in the captured image GS2 by the first projective transformation matrix 116. Similarly, a point D3-2 is a point obtained by transforming coordinates of a point located at the corner CN4-2 of the image GV21 in the captured image GS2 by the first projective transformation matrix 116. A point D3-3 is a point obtained by transforming coordinates of a point located at the corner CN4-3 of the image GV21 in the captured image GS2 by the first projective transformation matrix 116. A point D3-4 is a point obtained by transforming coordinates of a point located at the corner CN4-4 of the image GV21 in the captured image GS2 by the first projective transformation matrix 116. An area R4 is an area surrounded by a quadrangle having the points D3-1, D3-2, D3-3, and D3-4 as vertices. That is, the area R4 is an area on the optical modulator 160 corresponding to the area R1 in the third period indicated by the image GV21. The image GF2-2 is displayed inside the area R4.

A point D4-1 is a point obtained by transforming coordinates of a point located at the corner CN6-1 of the image GV41 in the captured image GS4 by the second projective transformation matrix 117. Similarly, a point D4-2 is a point obtained by transforming coordinates of a point located at the corner CN6-2 of the image GV41 in the captured image GS4 by the second projective transformation matrix 117. A point D4-3 is a point obtained by transforming coordinates of a point located at the corner CN6-3 of the image GV41 in the captured image GS4 by the second projective transformation matrix 117. A point D4-4 is a point obtained by transforming coordinates of a point located at the corner CN6-4 of the image GV41 in the captured image GS4 by the second projective transformation matrix 117. An area R5 is an area surrounded by a quadrangle having the points D4-1, D4-2, D4-3, and D4-4 as vertices. That is, the area R5 is an area on the optical modulator 160 corresponding to the area R1 in the fifth period indicated by the image GV41.

The third projective transformation matrix 118 used for the second correction is a matrix for transforming coordinates of the point D3-1 to coordinates of the point D4-1, coordinates of the point D3-2 to coordinates of the point D4-2, coordinates of the point D3-3 to coordinates of the point D4-3, and coordinates of the point D3-4 to coordinates of the point D4-4. Therefore, when the image GF2-2 is corrected to the image GF2-4 based on the third projective transformation matrix 118, a positional relationship between four corners of the image GF2-2 and four corners of the area R4 is taken over as a positional relationship between four corners of the image GF2-4 and four corners of the area R5. As a result, in the sixth period, when the projection image GP2-4 is displayed on the wall surface W1 by displaying the image GF2-4 on the optical modulator 160, a positional relationship between the corners CN1-1 to CN1-4 of the area R1 and the corners CN2-1 to CN2-4 of the projection image GP2 is maintained as in the third period.

Referring back to FIG. 7, the imaging element 140 is an image sensor such as a CCD or a CMOS. Here, the CCD is an abbreviation for a charge coupled device, and the CMOS is an abbreviation for a complementary metal oxide semiconductor.

Under control of the imaging controller 121, the imaging apparatus 14 images a range including an area on the projection surface on which the projection image is displayed. The imaging apparatus 14 outputs, to the processing apparatus 12, the captured image information 104 representing a result of imaging the range including the area on the projection surface on which the projection image is displayed. In other words, the imaging apparatus 14 outputs the captured image indicated by the captured image information 104 to the processing apparatus 12.

The optical modulator 160 includes, for example, one or more liquid crystal panels. The optical modulator 160 may include a DMD instead of a liquid crystal panel. The optical modulator 160 modulates, based on a signal received from the processing apparatus 12, light emitted from the light source into the projection light for displaying the projection image on the projection surface. Examples of the light source include a halogen lamp, a xenon lamp, an ultra-high pressure mercury lamp, an LED, and a laser light source. Here, the LED is an abbreviation for a light emitting diode, and the DMD is an abbreviation for a digital mirror device.

Under control of the projection controller 120, the projection apparatus 16 projects the projection light for displaying the projection image onto the projection surface. In other words, the projection apparatus 16 projects an image received from the processing apparatus 12 onto the projection surface.

The operation apparatus 18 receives an input operation on the projector 1 from the user of the projector 1. The operation apparatus 18 includes, for example, a touch panel or an operation button provided on a housing of the projector 1. When the operation apparatus 18 includes the touch panel, the operation apparatus 18 outputs data indicating a detected touched position to the processing apparatus 12. When the operation apparatus 18 includes the operation button, the operation apparatus 18 outputs data for identifying a pressed button to the processing apparatus 12. The operation apparatus 18 may include a reception apparatus for receiving an operation signal output from a remote controller based on an operation of the user. When the operation apparatus 18 includes the reception apparatus, the operation apparatus 18 outputs, to the processing apparatus 12, data indicated by the operation signal received from the remote controller.

Accordingly, contents of the input operation on the projector 1 are transmitted to the processing apparatus 12.

1.3. Operation of Projector

Hereinafter, an operation of the projector 1 according to the first embodiment will be described with reference to FIGS. 15 and 16.

Figure 15:
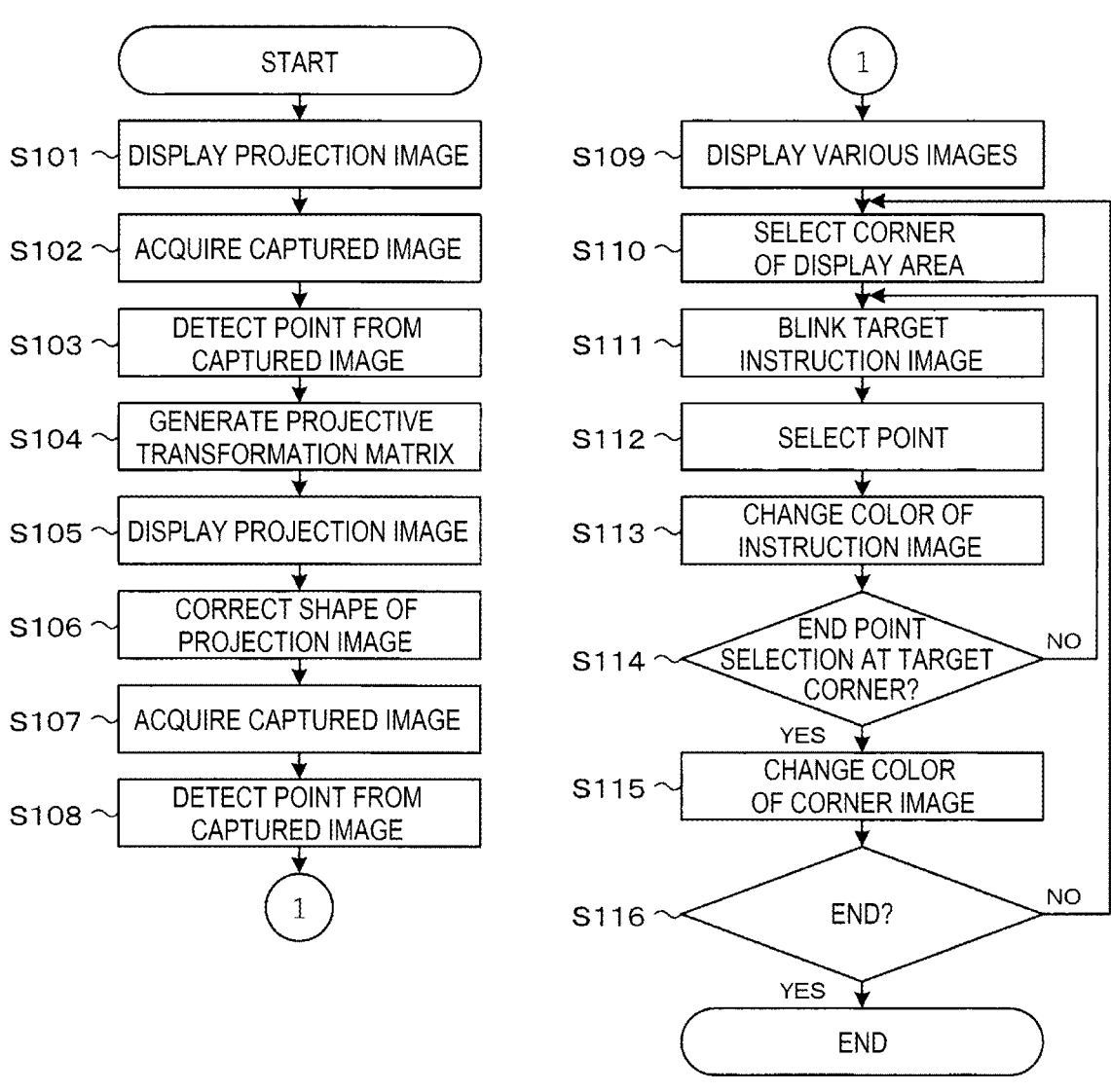
FIG. 15 is a flowchart showing an operation of the projector 1 in a time period including the first period to the third period.

FIG. 15 is a flowchart showing the operation of the projector 1 in a time period including the first period to the third period. A series of operations shown in the flowchart in FIG. 15 are operations for preparing for the second correction. The series of operations shown in the flowchart in FIG. 15 are started, for example, when the projector 1 is powered on and the operation apparatus 18 receives an input operation related to start of the operation from the user of the projector 1.

In step S101, the projection controller 120 displays the projection image GP1-1 in the area R2 on the wall surface W1 by causing the projection apparatus 16 to project the projection light based on the first projection image information 102.

In step S102, the imaging controller 121 controls the imaging apparatus 14 to image a range including the area R2 on the wall surface W1 on which the projection image GP1-1 is displayed. The imaging controller 121 acquires the captured image GS1 representing a result of the imaging from the imaging apparatus 14. In addition, the imaging controller 121 stores, in the storage apparatus 10, the first captured image information 105 representing the acquired captured image GS1.

In step S103, the detector 122 detects a plurality of points in the captured image GS1 by performing image processing on the captured image GS1 indicated by the first captured image information 105. That is, the detector 122 acquires the second coordinate information 111 representing coordinates of the plurality of points in the captured image GS1. The detector 122 stores the acquired second coordinate information 111 in the storage apparatus 10.

In step S104, the matrix generator 125 generates the first projective transformation matrix 116 based on the first coordinate information 110 and the second coordinate information 111. The matrix generator 125 stores the generated first projective transformation matrix 116 in the storage apparatus 10.

In step S105, the projection controller 120 displays the projection image GP2-1 in the area R1 on the wall surface W1 by causing the projection apparatus 16 to project the projection light based on the second projection image information 103. The projection controller 120 controls the projection apparatus 16 to display, on the wall surface W1, the pointer image GC1 located at the corner of the projection image GP2-1. That is, the projection controller 120 controls the projection apparatus 16 to display the pointer image GC1-1 indicating the position of the corner CN2-1, the pointer image GC1-2 indicating the position of the corner CN2-2, the pointer images GC1-3 indicating the position of the corner CN2-3, and the pointer images GC1-4 indicating the position of the corner CN2-4.

In step S106, the corrector 123 performs the first correction of correcting the shape of the projection image GP2 by changing the position of the corner of the projection image GP2-1 based on an operation from the user for moving the pointer image GC1. In other words, the corrector 123 updates the second projection image information 103 based on the operation from the user for moving the pointer image GC1. When the first correction is performed, the projection image GP2-2 is displayed on the wall surface W1.

In step S107, the imaging controller 121 controls the imaging apparatus 14 to image a range including the area R1 on the wall surface W1 on which the projection image GP2-2 is displayed. The imaging controller 121 acquires the captured image GS2 representing a result of the imaging from the imaging apparatus 14. In addition, the imaging controller 121 stores, in the storage apparatus 10, the second captured image information 106 representing the acquired captured image GS2.

In step S108, the detector 122 detects a plurality of points D1 in the captured image GS2 by performing image processing on the captured image GS2 indicated by the second captured image information 106. That is, the detector 122 acquires the third coordinate information 112 representing coordinates of the plurality of points D1 in the captured image GS2. The detector 122 stores the acquired third coordinate information 112 in the storage apparatus 10.

In step S109, the projection controller 120 controls the projection apparatus 16 to display, on the wall surface W1, the corner image GC2 located at the corner of the area R1 on the wall surface W1. That is, the projection controller 120 controls the projection apparatus 16 to display the corner image GC2-1 indicating the position of the corner CN1-1, the corner image GC2-2 indicating the position of the corner CN1-2, the corner image GC2-3 indicating the position of the corner CN1-3, and the corner image GC2-4 indicating the position of the corner CN1-4. The projection controller 120 controls the projection apparatus 16 to display, on the wall surface W1, the plurality of instruction images GD corresponding one-to-one to the plurality of points D1.

In step S110, the coordinate manager 124 selects one corner image GC2 among the corner images GC2-1 to GC2-4 based on the operation from the user. In other words, the coordinate manager 124 selects, based on the operation from the user, the corner of the area R1 indicated by one corner image GC2 among the corner images GC2-1 to GC2-4.

In step S111, the projection controller 120 controls the projection apparatus 16 to repeatedly blink one instruction image GD serving as the selection candidate determined from one or more instruction images GD corresponding to the corner of the area R1 indicated by the one corner image GC2 selected based on the operation from the user, thereby displaying the instruction image GD in a manner distinguishable from the other instruction images GD.

In step S112, the coordinate manager 124 selects the point D1 corresponding to the one instruction image GD based on an operation from the user for selecting the one instruction image displayed in a manner distinguishable from the other instruction images GD. The coordinate manager 124 updates the third coordinate information 112 based on the operation from the user.

In step S113, the projection controller 120 controls the projection apparatus 16 to change a color of the instruction image GD corresponding to the point D1 selected based on the operation from the user.

In step S114, the coordinate manager 124 determines whether an operation from the user for ending the selection of the one or more instruction images GD at the corner of the area R1 indicated by the one corner image GC2 selected based on the operation from the user is received. In other words, the coordinate manager 124 determines whether the operation from the user for ending the selection of one or more points D1 at the corner of the image GV21 corresponding to the one corner image GC2 selected based on the operation from the user is received. When the operation from the user for ending the selection of the one or more points D1 at the corner of the image GV21 corresponding to the one corner image GC2 selected based on the operation from the user is received, that is, when it is YES in step S114, the coordinate manager 124 advances the processing to step S115. When the operation from the user for ending the selection of the one or more points D1 at the corner of the image GV21 corresponding to the one corner image GC2 selected based on the operation from the user is not received, that is, when it is NO in step S114, the coordinate manager 124 advances the processing to step S111.

When the result of the determination in step S114 is NO, the processing apparatus 12 continues the selection of the point D1 based on the operation from the user by performing the processing in steps S111 to S113 again.

In step S115, the projection controller 120 controls the projection apparatus 16 to change a color of the one corner image GC2 selected based on the operation from the user.

In step S116, the coordinate manager 124 determines whether an operation from the user for ending the selection of the instruction image GD is received. That is, the coordinate manager 124 determines whether an operation from the user for ending the selection of the point D1 is received. When the operation from the user for ending the selection of the point D1 is received, that is, when it is YES in step S116, the processing apparatus 12 including the coordinate manager 124 ends the series of operations shown in the flowchart in FIG. 15. When the operation from the user for ending the selection of the point D1 is not received, that is, when it is NO in step S116, the coordinate manager 124 advances the processing to step S110.

The processing apparatus 12 selects four or more points D1 by repeatedly performing the processing in steps S110 to S115 until the result of the determination in step S116 becomes YES. That is, the processing apparatus 12 selects the four or more points D1 by selecting one or more points D1 from the one or more points D1 corresponding to the corner CN4-1 that has a correspondence relationship with the corner CN1-1 indicated by the corner image GC2-1, selecting one or more points D1 from the one or more points D1 corresponding to the corner CN4-2 that has a correspondence relationship with the corner CN1-2 indicated by the corner image GC2-2, selecting one or more points D1 from the one or more points D1 corresponding to the corner CN4-3 that has a correspondence relationship with the corner CN1-3 indicated by the corner image GC2-3, and selecting one or more points D1 from the one or more points D1 corresponding to the corner CN4-4 that has a correspondence relationship with the corner CN1-4 indicated by the corner image GC2-4.

The processing apparatus 12 may perform processing of thinning out the plurality of points D1, for example, at a stage after step S108 and before step S109. For example, the number of the plurality of points D1 corresponding to the corner CN1-1 is actually about several tens, but when all of the plurality of instruction images GD corresponding thereto are displayed, due to the large number, it is difficult for the user to grasp which point D1 is to be selected. Therefore, the processing apparatus 12 may perform the processing of thinning out the plurality of points D1 by using the fact that each of the plurality of points D1 has a value corresponding to a position in the captured image GS2, that is, feature quantity. The feature quantity is calculated as a result of performing image processing on the captured image GS2 in step S108 in FIG. 15. For example, the processing apparatus 12 does not display a plurality of instruction images GD corresponding to a plurality of points D1 each having feature quantity less than a predetermined threshold value. The plurality of points D1 each having the feature quantity less than the predetermined threshold value are components having a small contribution to control of a position and a shape of the projection image GP, such as points not corresponding to the corner of the area R1.

Figure 16:
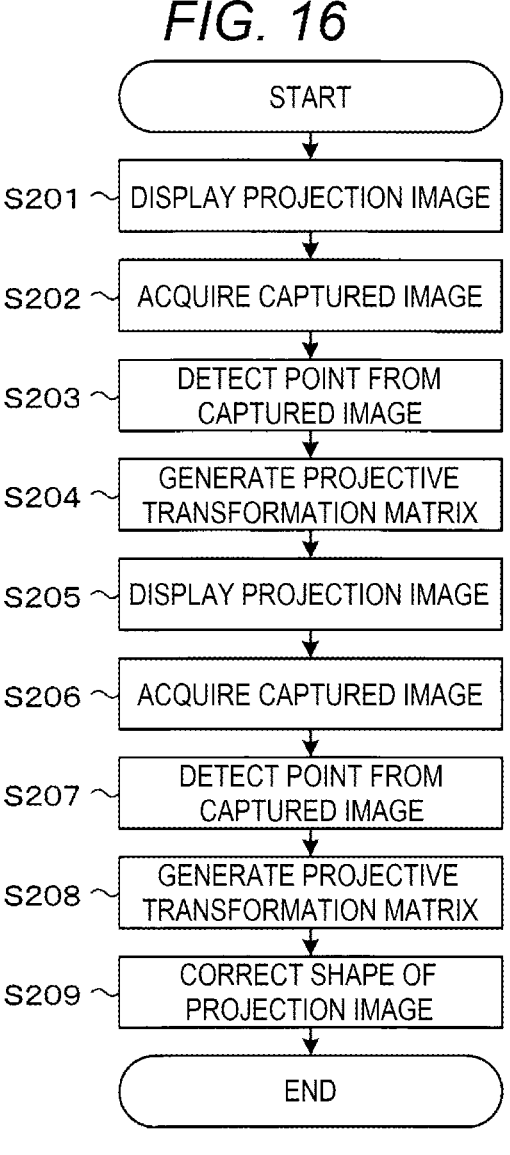
FIG. 16 is a flowchart showing an operation of the projector 1 in a time period including the fourth period to the sixth period.

FIG. 16 is a flowchart showing the operation of the projector 1 in a time period including the fourth period to the sixth period. A series of operations shown in the flowchart in FIG. 16 are operations for performing the second correction. The series of operations shown in the flowchart in FIG. 16 may be started, for example, at regular time intervals, or may be started when an input operation related to start of an operation start is received from the user.

In step S201, the projection controller 120 displays the projection image GP1-2 in the area R3 on the wall surface W1 by causing the projection apparatus 16 to project the projection light based on the first projection image information 102.

In step S202, the imaging controller 121 controls the imaging apparatus 14 to image a range including the area R3 on the wall surface W1 on which the projection image GP1-2 is displayed. The imaging controller 121 acquires the captured image GS3 representing a result of the imaging from the imaging apparatus 14. In addition, the imaging controller 121 stores, in the storage apparatus 10, the third captured image information 107 representing the acquired captured image GS3.

In step S203, the detector 122 detects a plurality of points in the captured image GS3 by performing image processing on the captured image GS3 indicated by the third captured image information 107. That is, the detector 122 acquires the fourth coordinate information 113 representing coordinates of the plurality of points in the captured image GS3. The detector 122 stores the acquired fourth coordinate information 113 in the storage apparatus 10.

In step S204, the matrix generator 125 generates the second projective transformation matrix 117 based on the first coordinate information 110 and the fourth coordinate information 113. The matrix generator 125 stores the generated second projective transformation matrix 117 in the storage apparatus 10.

In step S205, the projection controller 120 displays the projection image GP2-3 in the area R1 on the wall surface W1 by causing the projection apparatus 16 to project the projection light based on the second projection image information 103.

In step S206, the imaging controller 121 controls the imaging apparatus 14 to image a range including the area R1 on the wall surface W1 on which the projection image GP2-3 is displayed. The imaging controller 121 acquires the captured image GS4 representing a result of the imaging from the imaging apparatus 14. In addition, the imaging controller 121 stores, in the storage apparatus 10, the fourth captured image information 108 representing the acquired captured image GS4.

In step S207, the detector 122 detects a plurality of points D2 in the captured image GS4 by performing image processing on the captured image GS4 indicated by the fourth captured image information 108. That is, the detector 122 acquires the fifth coordinate information 114 representing coordinates of the plurality of points D2 in the captured image GS4. The detector 122 stores the acquired fifth coordinate information 114 in the storage apparatus 10.

In step S208, the matrix generator 125 generates the third projective transformation matrix 118 based on the third coordinate information 112, the first projective transformation matrix 116, the fifth coordinate information 114, and the second projective transformation matrix 117. The matrix generator 125 stores the generated third projective transformation matrix 118 in the storage apparatus 10.

After step S207 and before step S208, the processing apparatus 12 may perform a process of searching for points corresponding to the four or more points D1 selected by the user in the third period from the plurality of points D2 detected from the captured image GS4. Specifically, the processing apparatus 12 searches for a point having the same feature quantity as each of the four or more points D1 selected by the user among the plurality of points D2. This is because, when the processing apparatus 12 performs the second correction, it is necessary to accurately recognize where the four or more points D1 in the captured image GS2 are moved to in the captured image GS4. The processing apparatus 12 can accurately associate, that is, match, the plurality of points D2 in the fifth period with the four or more points D1 in the third period, by using the fact that the point D1 has the feature quantity. Accordingly, a matching error between the plurality of points D2 in the fifth period and the four or more points D1 in the third period is prevented, and generation accuracy of the third projective transformation matrix 118 is further improved.

In step S209, the corrector 123 performs the second correction of correcting the projection image GP2-3 based on the third projective transformation matrix 118. In other words, the corrector 123 updates the second projection image information 103 based on the third projective transformation matrix 118. When the second correction is performed, the projection image GP2-4 is displayed on the wall surface W1.

After the processing in step S209 is performed, the processing apparatus 12 ends the series of operations shown in the flowchart in FIG. 16.

As described above, according to the first embodiment, the projector 1 corrects the position and the shape of the projection image displayed in the display area by performing the second correction. That is, even when the position, the orientation, the angle, and the like of the projector 1 are changed, the projector 1 can maintain the position where the projection image is displayed and the shape of the projection image to be the same as before the position, the orientation, the angle, and the like of the projector 1 are changed. In other words, the projector 1 can maintain the positional relationship between the four corners of the display area and the four corners of the projection image.

According to the first embodiment, the projector 1 corrects the shape of the projection image displayed in the display area by performing the first correction based on the operation from the user. That is, the projector 1 can display the projection image in the shape desired by the user. The user can easily adjust the shape of the projection image without accurately adjusting the position, the orientation, the angle, and the like of the projector 1.

According to the first embodiment, the projector 1 displays, on the projection surface, the plurality of instruction images corresponding one-to-one to the plurality of points detected from the captured image obtained by imaging the range including the area where the projection image is displayed. In addition, the projector 1 selects the four or more points based on the operation from the user for selecting the instruction image and performs the second correction based on the coordinates of the selected four or more points. That is, the user can appropriately select a point necessary for generating the projective transformation matrix used for the second correction. In addition, the projector 1 can accurately generate the projective transformation matrix used for the second correction and can more accurately maintain the shape of the projection image in the shape desired by the user.

2. Second Embodiment

Hereinafter, a second embodiment of the disclosure will be described. In each embodiment shown below, reference numerals used in the description of the first embodiment are used for elements having the same actions and functions as those in the first embodiment, and detailed description thereof will be omitted as appropriate.

In the second embodiment, a program, a point selection method, and an information processing apparatus according to the disclosure will be described by showing a projection system that performs the first correction and the second correction. In the second embodiment, an information processing apparatus provided in the projection system generates a projective transformation matrix used for the second correction. In addition, the projection system according to the second embodiment displays, on a display apparatus, a plurality of images for the user to select a point necessary for generating the projective transformation matrix, the plurality of display images corresponding one-to-one to a plurality of points detected from a captured image obtained by imaging a range including an image displayed on a projection surface.

Figure 17:
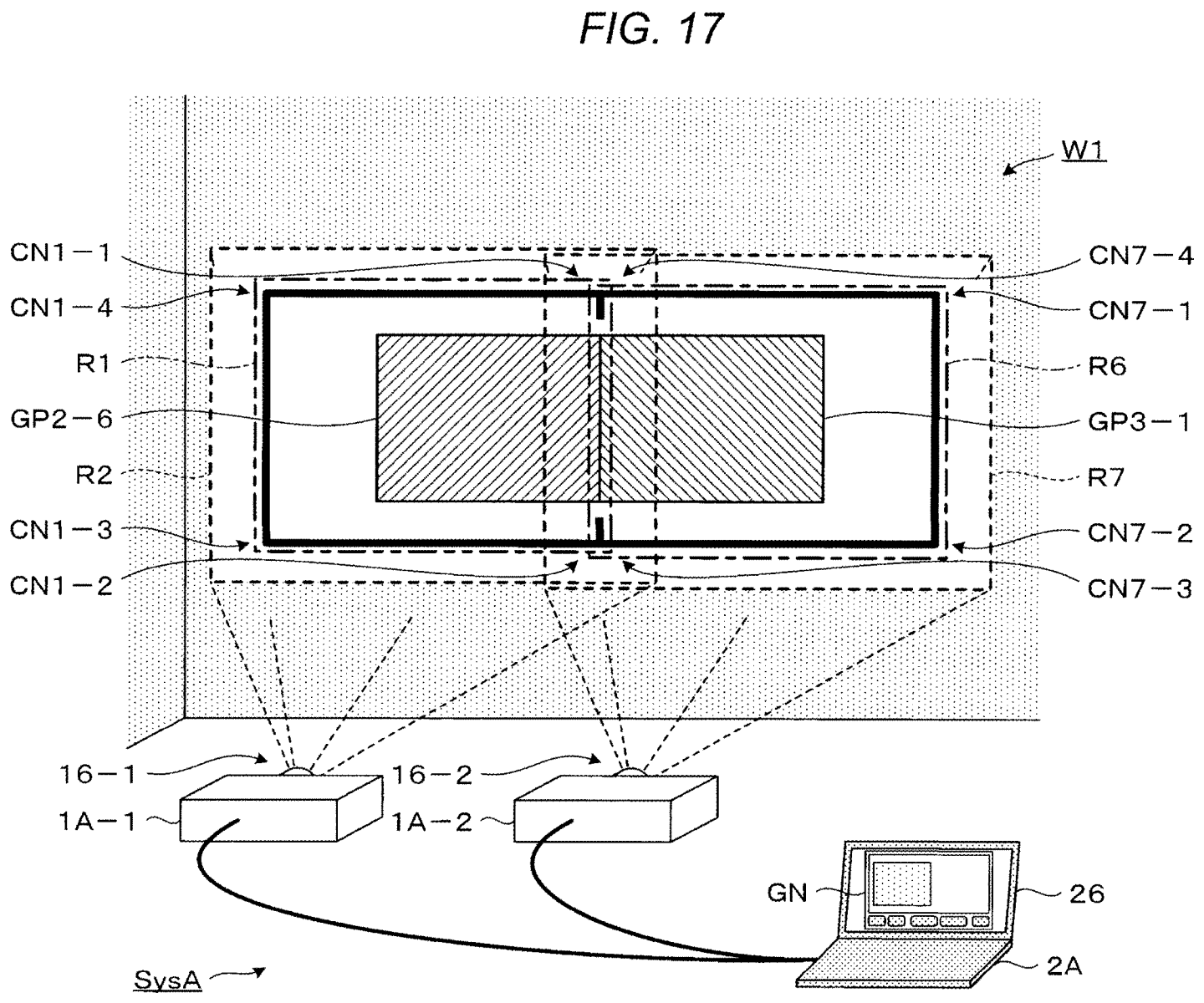

FIG. 17 is a schematic diagram showing an outline of a projection system SysA according to the second embodiment. The projection system SysA includes a projector 1A-1, a projector 1A-2, and a computer 2A.

Each of the projector 1A-1 and the projector 1A-2 includes the imaging apparatus 14 and the projection apparatus 16. For the sake of distinction, the imaging apparatus 14 provided in the projector 1A-1 may be referred to as an "imaging apparatus 14-1", the projection apparatus 16 provided in the projector 1A-1 may be referred to as a "projection apparatus 16-1", the imaging apparatus 14 provided in the projector 1A-2 may be referred to as an "imaging apparatus 14-2", and the projection apparatus 16 provided in the projector 1A-2 may be referred to as a "projection apparatus 16-2". When the projector 1A-1 and the projector 1A-2 are not distinguished from each other, the projector 1A-1 and the projector 1A-2 may each be referred to as a "projector 1A". In FIG. 17, illustration of the imaging apparatus 14-1 and the imaging apparatus 14-2 is omitted.

The computer 2A includes a display apparatus 26 on which various images are displayed. The computer 2A is communicably coupled to the projector 1A-1 and the projector 1A-2, and transmits and receives various types of information. For example, HDMI connection, wired or wireless LAN connection, USB connection, or Bluetooth connection may be used for communication between the computer 2A and the projector 1A. When data is transmitted and received through the HDMI connection, a protocol of DDC, CEC, or EDID may be used. The computer 2A and the projector 1A may perform transmission and reception using a standard protocol and data that can define various types of information, or may perform transmission and reception using a protocol and data defined by a vendor independently. Here, the HDMI is an abbreviation for a high-definition multimedia interface. The LAN is an abbreviation for a local area network. The USB is an abbreviation for a universal serial bus. The DDC is an abbreviation for a display data channel. The CEC is an abbreviation for consumer electronics control. The EDID is an abbreviation for extended display identification data. In addition, HDMI and Bluetooth are registered trademarks.

The computer 2A controls the projection apparatus 16-1 to display a projection image GP2-6 in the area R1 on the wall surface W1. Similarly to the projection image GP2-2, the projection image GP2-6 is the projection image GP2 corrected by the first correction.

The computer 2A controls the projection apparatus 16-2 to display a projection image GP3-1 in an area R6 on the wall surface W1. Similarly to the projection image GP2-6, the projection image GP3-1 is a projection image GP3 corrected by the first correction. The projection image GP3-1 is an example of the projection image GP3. The area R6 has a corner CN7-1, a corner CN7-2, a corner CN7-3, and a corner CN7-4. The area R6 is within an area R7. The area R7 is an area onto which projection light is projected from the projector 1A-2.

A position of the area R6, specifically, positions of four corners of the area R6 are explicitly shown on the wall surface W1. In FIG. 17, the position of the area R6 is shown by a thick straight line, but is not limited thereto. For example, the position of the area R6 may be indicated by attaching a marker indicating the position of the corner of the area R6 to each of the four corners of the area R6.

The computer 2A controls the imaging apparatus 14-1 to acquire a captured image representing a result of imaging a range including the area R1 where the projection image GP2-6 is displayed. The computer 2A performs image processing on the captured image representing the result of imaging the range including the area R1 where the projection image GP2-6 is displayed, and thus detects a plurality of points corresponding to four corners of an image indicating the area R1 in the captured image.

The computer 2A controls the imaging apparatus 14-2 to acquire a captured image representing a result of imaging a range including the area R6 where the projection image GP3-1 is displayed. The computer 2A performs image processing on the captured image representing the result of imaging the range including the area R6 where the projection image GP3-1 is displayed, and thus detects a plurality of points corresponding to four corners of an image indicating the area R6 in the captured image.

The computer 2A controls the display apparatus 26 to display a plurality of display images corresponding one-to-one to a plurality of points detected from the captured image representing the result of imaging the range including the area R1 where the projection image GP2-6 is displayed. The plurality of display images are images for indicating, to the user, a relative positional relationship between the plurality of points detected from the captured image and the image indicating the area R1 in the captured image. Specifically, the computer 2A controls the display apparatus 26 to display an image obtained by superimposing, on the captured image representing the result of imaging the range including the area R1 where the projection image GP2-6 is displayed, the plurality of display images corresponding one-to-one to the plurality of points detected from the captured image.

The computer 2A controls the display apparatus 26 to display a plurality of display images corresponding one-to-one to a plurality of points detected from the captured image representing the result of imaging the range including the area R6 where the projection image GP3-1 is displayed. The plurality of display images are images for indicating, to the user, a relative positional relationship between the plurality of points detected from the captured image and the image indicating the area R6 in the captured image. Specifically, the computer 2A controls the display apparatus 26 to display an image obtained by superimposing, on the captured image representing the result of imaging the range including the area R6 where the projection image GP3-1 is displayed, the plurality of display images corresponding one-to-one to the plurality of points detected from the captured image.

More specifically, the computer 2A controls the display apparatus 26 to display an operation image GN including the image obtained by superimposing the plurality of display images on the captured image representing the result of imaging the range including the area R1 where the projection image GP2-6 is displayed, and the image obtained by superimposing the plurality of display images on the captured image representing the result of imaging the range including the area R6 where the projection image GP3-1 is displayed.

The user performs an operation of selecting a display image from the image obtained by superimposing the plurality of display images on the captured image representing the result of imaging the range including the area R1 where the projection image GP2-6 is displayed. The computer 2A selects a point corresponding to the display image selected by the user, which is a point detected from the captured image representing the result of capturing the range including the area R1 where the projection image GP2-6 is displayed.

The user performs an operation of selecting a display image from the image obtained by superimposing the plurality of display images on the captured image representing the result of capturing the range including the area R6 where the projection image GP3-1 is displayed. The computer 2A selects a point corresponding to the display image selected by the user, which is a point detected from the captured image representing the result of capturing the range including the area R6 where the projection image GP3-1 is displayed.

The computer 2A generates, based on coordinates of the point selected based on the operation from the user among the plurality of points detected from the captured image representing the result of imaging the range including the area R1 where the projection image GP2-6 is displayed, a projective transformation matrix for correcting a position where the projection image GP2 is displayed and a shape of the projection image GP2. The computer 2A can maintain the position where the projection image GP2 is displayed and the shape of the projection image GP2 to be the same as the projection image GP2-6 by performing the second correction on the projection image GP2 using the projective transformation matrix.

The computer 2A generates, based on coordinates of the point selected based on the operation from the user among the plurality of points detected from the captured image representing the result of imaging the range including the area R6 where the projection image GP3-1 is displayed, a projective transformation matrix for correcting a position where the projection image GP3 is displayed and a shape of the projection image GP3. The computer 2A can maintain the position where the projection image GP3 is displayed and the shape of the projection image GP3 to be the same as the projection image GP3-1 by performing the second correction on the projection image GP3 using the projective transformation matrix.

The computer 2A controls the display apparatus 26 to display the plurality of display images corresponding one-to-one to the plurality of points detected from the captured image representing the result of imaging the range including the area where the projection image is displayed. The computer 2A selects a plurality of points based on the operation from the user for selecting the display image and performs the second correction based on coordinates of the selected plurality of points. That is, the user can appropriately select a point necessary for the projective transformation matrix used for the second correction. In addition, the computer 2A can accurately generate the projective transformation matrix used for the second correction and can more accurately maintain the shape of the projection image in the shape desired by the user.

Figure 18:
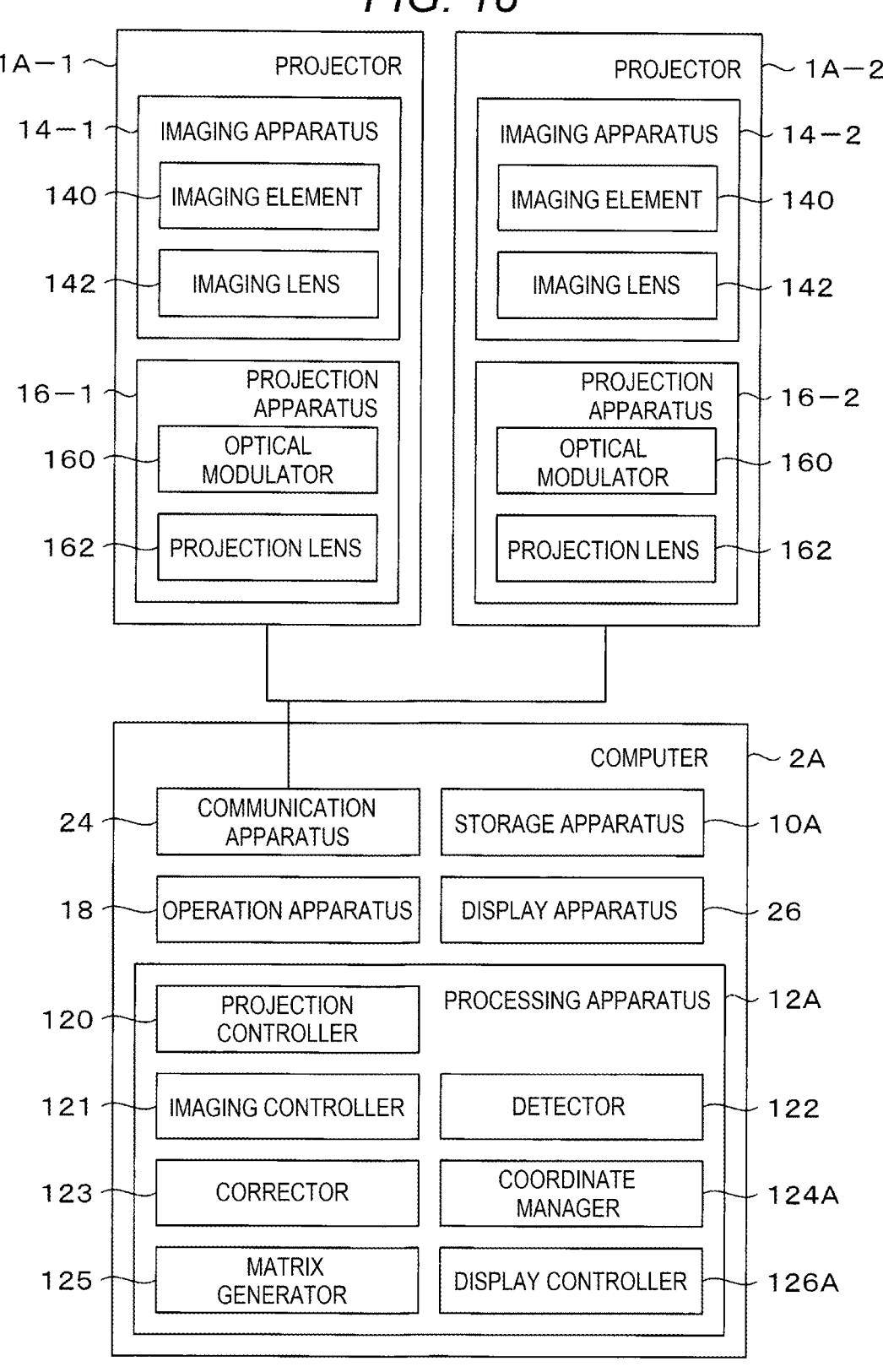
FIG. 18 is a block diagram showing a configuration of the projection system SysA according to the second embodiment.

FIG. 18 is a block diagram showing a configuration of the projection system SysA according to the second embodiment. As described above, the projection system SysA includes the projector 1A-1, the projector 1A-2, and computer 2A.

The projector 1A-1 includes the imaging apparatus 14-1 and the projection apparatus 16-1. The projector 1A-2 includes the imaging apparatus 14-2 and the projection apparatus 16-2.

The imaging apparatus 14-1 and the imaging apparatus 14-2 each include the imaging element 140 and the imaging lens 142. For the sake of distinction, the imaging element 140 provided in the imaging apparatus 14-1 may be referred to as an "imaging element 140-1", the imaging element 140 provided in the imaging apparatus 14-2 may be referred to as an "imaging element 140-2", the imaging lens 142 provided in the imaging apparatus 14-1 may be referred to as an "imaging lens 142-1", and the imaging lens 142 provided in the imaging apparatus 14-2 may be referred to as an "imaging lens 142-2".

The projection apparatus 16-1 and the projection apparatus 16-2 each include the optical modulator 160 and the projection lens 162. For the sake of distinction, the optical modulator 160 provided in the projection apparatus 16-1 may be referred to as an "optical modulator 160-1", the optical modulator 160 provided in the projection apparatus 16-2 may be referred to as an "optical modulator 160-2", the projection lens 162 provided in the projection apparatus 16-1 may be referred to as a "projection lens 162-1", and the projection lens 162 provided in the projection apparatus 16-2 may be referred to as a "projection lens 162-2".

The computer 2A includes a storage apparatus 10A that stores various types of information, a processing apparatus 12A that controls an operation of the projection system SysA, a communication apparatus 24 that performs communication with the projector 1A-1 and the projector 1A-2 as well as an external storage apparatus, an external server, and the like, the display apparatus 26 that displays various images, and the operation apparatus 18 that receives an input operation from the user. The processing apparatus 12A is different from the processing apparatus 12 in that the processing apparatus 12A has a function as a coordinate manager 124A instead of the coordinate manager 124 and a function as a display controller 126A.

The operation apparatus 18 in the embodiment may include a keyboard coupled to the computer 2A or a pointing device such as a mouse.

The communication apparatus 24 includes, for example, an interface board including a connector and an interface circuit, and has a function of receiving various types of information from a terminal apparatus, an external storage apparatus, an external server, and the like and a function of transmitting various types of information to the terminal apparatus, the external storage apparatus, the external server, and the like. The communication apparatus 24 may transmit and receive the various types of information using wired communication or may transmit and receive the various types of information using wireless communication. When the wireless communication is used, the communication apparatus 24 includes an antenna corresponding to wireless communication conforming to a predetermined communication standard.

The display apparatus 26 includes a display panel for displaying an image. The display apparatus 26 displays an image by the processing apparatus 12A controlling a plurality of pixel circuits provided in the display apparatus 26. For example, when the display apparatus 26 includes a liquid crystal panel, each of the plurality of pixel circuits includes a liquid crystal element and displays an image by adjusting, by the liquid crystal element, a transmittance of light emitted from a backlight. When the display apparatus 26 includes an organic EL panel, each of the plurality of pixel circuits includes a light emitting element and displays an image by adjusting an intensity of light emitted from the light emitting element. Here, the EL is an abbreviation for electro-luminescence.

Figure 19:
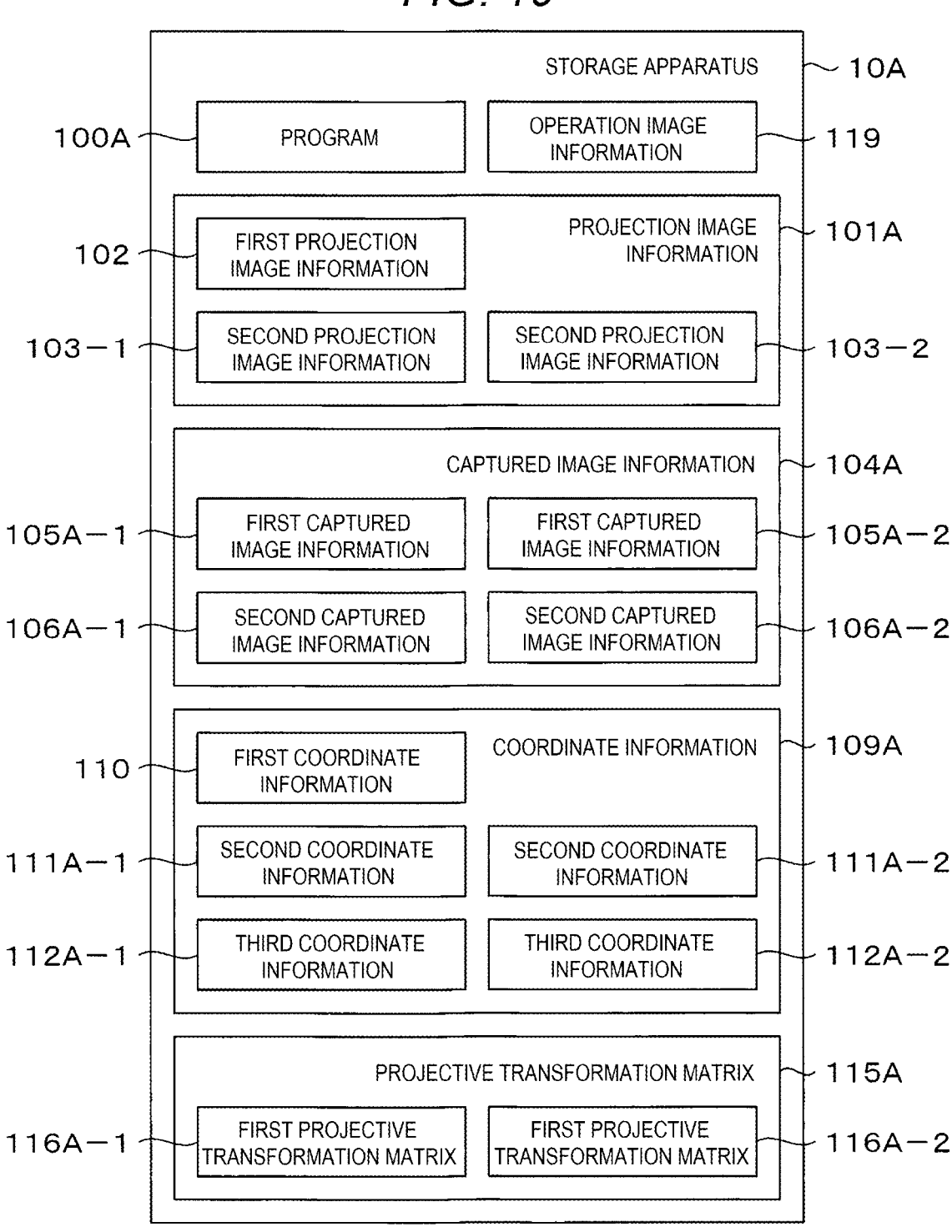
FIG. 19 is a block diagram showing a configuration of a storage apparatus 10A according to the second embodiment.

FIG. 19 is a block diagram showing a configuration of the storage apparatus 10A according to the second embodiment. The storage apparatus 10A is different from the storage apparatus 10 in that a program 100A is stored instead of the program 100, projection image information 101A is stored instead of the projection image information 101, captured image information 104A is stored instead of the captured image information 104, coordinate information 109A is stored instead of the coordinate information 109, a projective transformation matrix 115A is stored instead of the projective transformation matrix 115, and operation image information 119 representing the operation image GN is stored.

The projection image information 101A is different from the projection image information 101 in that the projection image information 101A includes second projection image information 103-1 and second projection image information 103-2 instead of the second projection image information 103.

The second projection image information 103-1 is the same as the second projection image information 103. That is, the second projection image information 103-1 is information representing the image projected when the projection image GP2 is displayed. The second projection image information 103-2 is information representing an image projected when the projection image GP3 is displayed.

The captured image information 104A is different from the captured image information 104 in that the captured image information 104A includes first captured image information 105A-1 and first captured image information 105A-2 instead of the first captured image information 105, and includes second captured image information 106A-1 and second captured image information 106A-2 instead of the second captured image information 106.

The first captured image information 105A-1 is information indicating a result of imaging, by the imaging apparatus 14-1, a range including the area R2 where the projection image GP1 is displayed by projecting the image GF1 indicated by the first projection image information 102 from the projection apparatus 16-1. The first captured image information 105A-2 is information indicating a result of imaging, by the imaging apparatus 14-2, a range including the area R7 where the projection image is displayed by projecting the image GF1 indicated by the first projection image information 102 from the projection apparatus 16-2.

The second captured image information 106A-1 is information representing a result of imaging, by the imaging apparatus 14-1, a range including the area R1 where the projection image GP2-6 is displayed. The second captured image information 106A-2 is information representing a result of imaging, by the imaging apparatus 14-2, a range including the area R6 where the projection image GP3-1 is displayed.

The coordinate information 109A is different from the coordinate information 109 in that the coordinate information 109A includes second coordinate information 111A-1 and second coordinate information 111A-2 instead of the second coordinate information 111, and includes third coordinate information 112A-1 and third coordinate information 112A-2 instead of the third coordinate information 112.

The second coordinate information 111A-1 is information representing coordinates of a plurality of points detected from an image indicated by the first captured image information 105A-1. The second coordinate information 111A-2 is information representing coordinates of a plurality of points detected from an image indicated by the first captured image information 105A-2.

The third coordinate information 112A-1 is information representing coordinates of a plurality of points detected from an image indicated by the second captured image information 106A-1. The third coordinate information 112A-2 is information representing coordinates of a plurality of points detected from an image indicated by the second captured image information 106A-2.

The projective transformation matrix 115A is different from the projective transformation matrix 115 in that the projective transformation matrix 115A includes a first projective transformation matrix 116A-1 and a first projective transformation matrix 116A-2 instead of the first projective transformation matrix 116.

The first projective transformation matrix 116A-1 is a projective transformation matrix generated based on the first coordinate information 110 and the second coordinate information 111A-1. The first projective transformation matrix 116A-1 is a projective transformation matrix for transforming coordinates of a plurality of pixels of the imaging element 140-1 before a position, an orientation, an angle, and the like of the projector 1A-1 are changed into coordinates of a plurality of pixels of the optical modulator 160-1 before the position, the orientation, the angle, and the like of the projector 1A-1 are changed.

The first projective transformation matrix 116A-2 is a projective transformation matrix generated based on the first coordinate information 110 and the second coordinate information 111A-2. The first projective transformation matrix 116A-2 is a projective transformation matrix for transforming coordinates of a plurality of pixels of the imaging element 140-2 before a position, an orientation, an angle, and the like of the projector 1A-2 are changed into coordinates of a plurality of pixels of the optical modulator 160-2 before the position, the orientation, the angle, and the like of the projector 1A-2 are changed.

Referring back to FIG. 18, the processing apparatus 12A function as the projection controller 120, the imaging controller 121, the detector 122, the corrector 123, the coordinate manager 124A, the matrix generator 125, and the display controller 126A shown in FIG. 18, by a CPU or the like provided in the processing apparatus 12A performing the program 100A.

The coordinate manager 124A manages the coordinates of the point detected from the captured image based on the operation from the user. In addition, the coordinate manager 124A performs various types of processing related to the management of the coordinates of the point detected from the captured image.

The coordinate manager 124A selects, based on an operation from the user for selecting the display image displayed on the display apparatus 26, a point that corresponds to the display image selected by the user and that is detected from the image indicated by the second captured image information 106A-1. The coordinate manager 124A updates the third coordinate information 112A-1 based on the operation from the user.

The coordinate manager 124A selects, based on an operation from the user for selecting the display image displayed on the display apparatus 26, a point that corresponds to the display image selected by the user and that is detected from the image indicated by the second captured image information 106A-2. The coordinate manager 124A updates the third coordinate information 112A-2 based on the operation from the user.

The coordinate manager 124A determines whether an operation related to the management of the coordinates of the point detected from the captured image is received from the user.

The display controller 126A controls the display apparatus 26 to display various images. The display controller 126A updates the images displayed on the display apparatus 26 based on an operation from the user.

In the embodiment, the display controller 126A controls the display apparatus 26 to display the operation image GN indicated by the operation image information 119. The display controller 126A updates the operation image GN based on the operation from the user.

Figure 20:
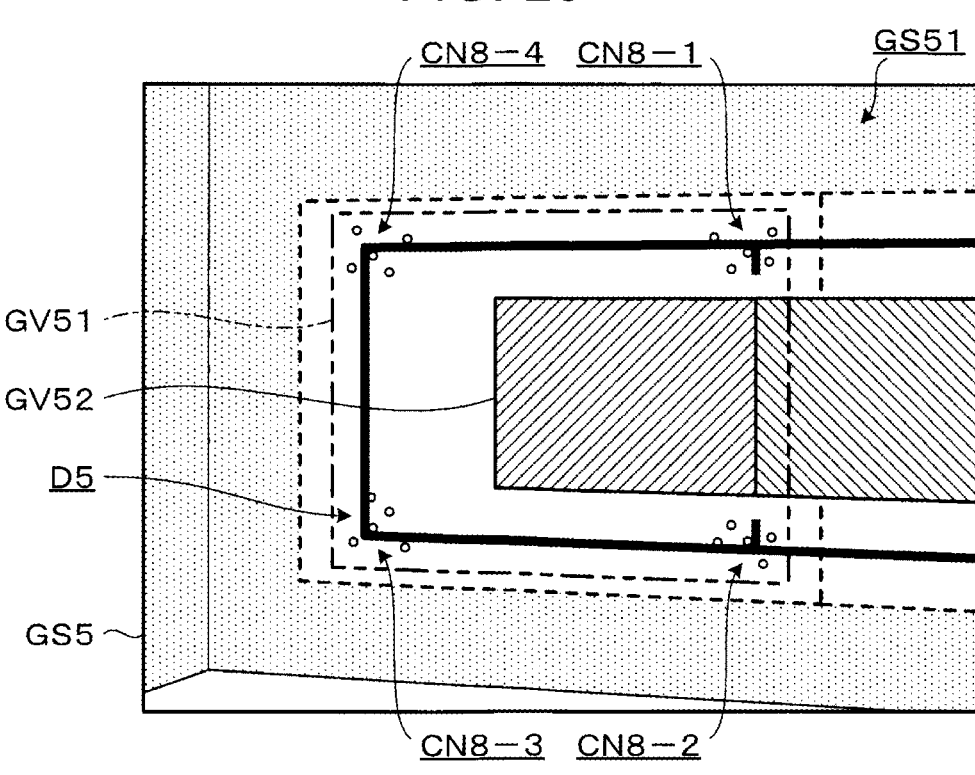
FIG. 20 is a schematic diagram showing an example of an image indicated by second captured image information 106A-1.

FIG. 20 is a schematic diagram showing an example of the image indicated by the second captured image information 106A-1. In the embodiment, the second captured image information 106A-1 represents a captured image GS5.

The captured image GS5 includes an image GS51. The image GS51 is an image representing the wall surface W1. The image GS51 includes an image GV51 and an image GV52.

The image GV51 is an image representing the area R1. The image GV51 has a corner CN8-1, a corner CN8-2, a corner CN8-3, and a corner CN8-4. The corner CN8-1 corresponds to the corner CN1-1. The corner CN8-2 corresponds to the corner CN1-2. The corner CN8-3 corresponds to the corner CN1-3. The corner CN8-4 corresponds to the corner CN1-4. The image GV52 is an image representing the projection image GP2-6.

The captured image GS5 includes a plurality of points D5. The plurality of points D5 include one or more points D5 corresponding to the corner CN8-1, one or more points D5 corresponding to the corner CN8-2, one or more points D5 corresponding to the corner CN8-3, and one or more points D5 corresponding to the corner CN8-4. The third coordinate information 112A-1 represents coordinates of the plurality of points D5.

Figure 21:
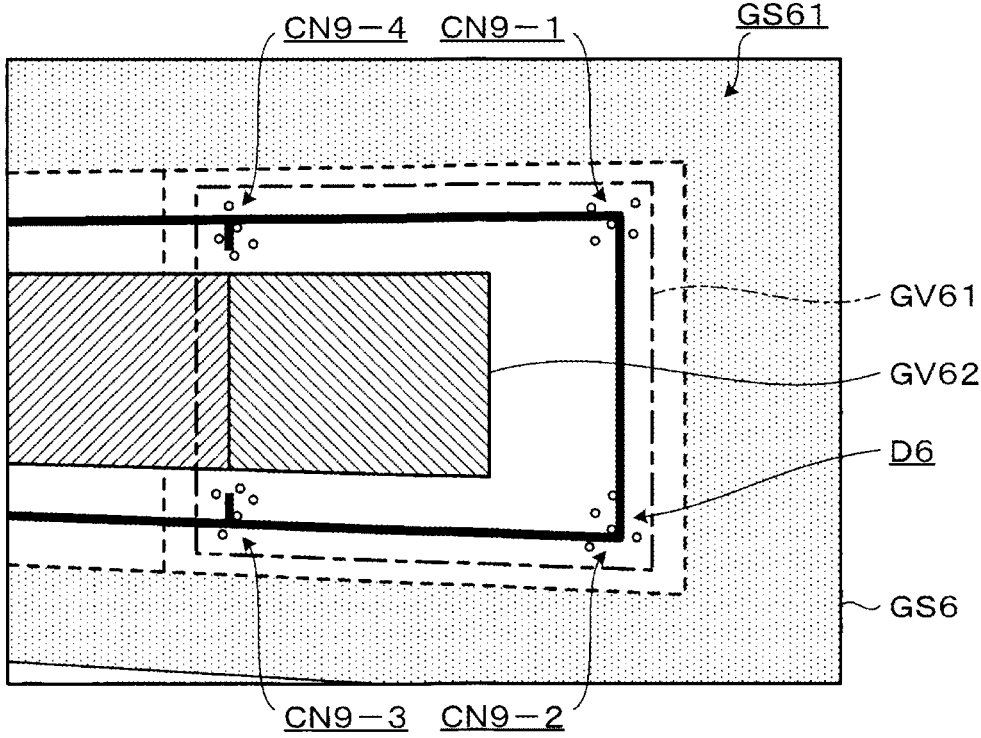
FIG. 21 is a schematic diagram showing an example of an image indicated by second captured image information 106A-2.

FIG. 21 is a schematic diagram showing an example of the image indicated by the second captured image information 106A-2. In the embodiment, the second captured image information 106A-2 represents a captured image GS6.

The captured image GS6 includes an image GS61. The image GS61 is an image representing the wall surface W1. The image GS61 includes an image GV61 and an image GV62.

The image GV61 is an image representing the area R6. The image GV61 has a corner CN9-1, a corner CN9-2, a corner CN9-3, and a corner CN9-4. The corner CN9-1 corresponds to the corner CN7-1. The corner CN9-2 corresponds to the corner CN7-2. The corner CN9-3 corresponds to the corner CN7-3. The corner CN9-4 corresponds to the corner CN7-4. The image GV62 is an image representing the projection image GP3-1.

The captured image GS6 includes a plurality of points D6. The plurality of points D6 include one or more points D6 corresponding to the corner CN9-1, one or more points D6 corresponding to the corner CN9-2, one or more points D6 corresponding to the corner CN9-3, and one or more points D6 corresponding to the corner CN9-4. The third coordinate information 112A-2 represents coordinates of the plurality of points D6.

Hereinafter, the operation image GN will be described with reference to FIGS. 22 to 26.

Figure 22:
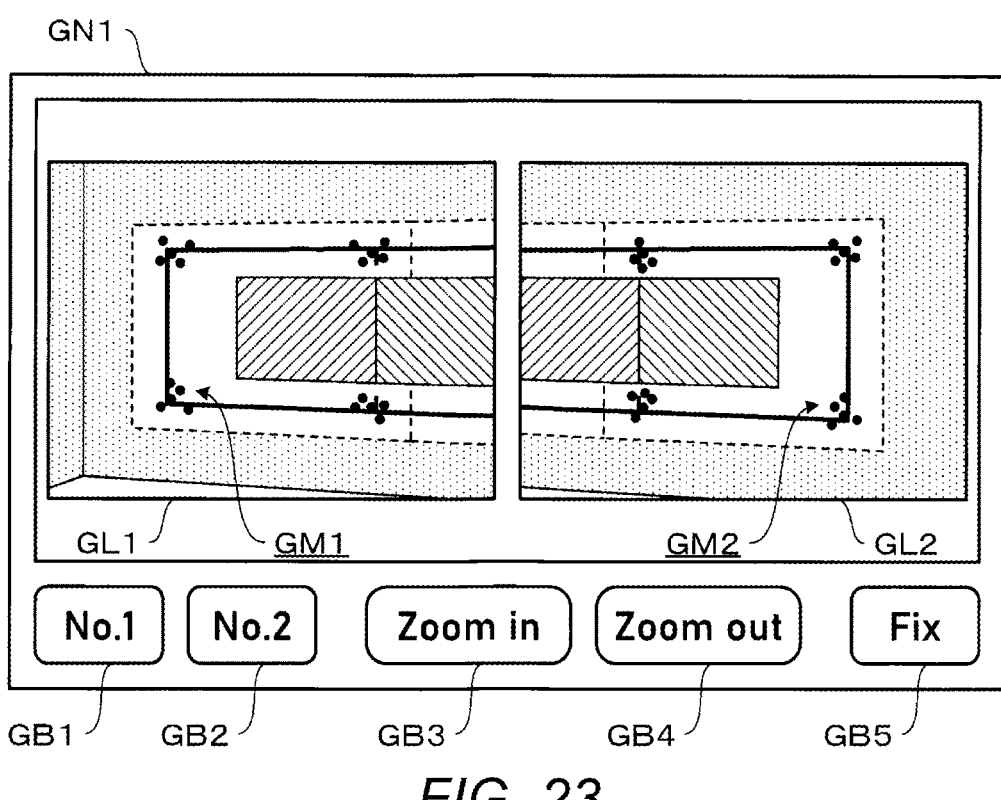
FIG. 22 is a schematic diagram showing an operation image GN1.

FIG. 22 is a schematic diagram showing an operation image GN1. The operation image GN1 is an example of the operation image GN. The display controller 126A controls the display apparatus 26 to display the operation image GN1.

The operation image GN1 includes a superimposed image GL1, a superimposed image GL2, a button image GB1, a button image GB2, a button image GB3, a button image GB4, and a button image GB5. The superimposed image GL1 includes a plurality of display images GM1. The plurality of display images GM1 correspond one-to-one to the plurality of points D5 detected from the captured image GS5. The superimposed image GL2 includes a plurality of display images GM2. The plurality of display images GM2 correspond one-to-one to the plurality of points D6 detected from the captured image GS6. When the button images GB1 to GB5 are not distinguished from one another, the button images GB1 to GB5 may each be referred to as a "button image GB".

The superimposed image GL1 is an image obtained by superimposing the plurality of display images GM1 on the captured image GS5. Each display image GM1 is located at a position of a point D5 corresponding to the display image GM1. That is, the user can grasp the position of the point D5 detected from the captured image GS5 by checking the superimposed image GL1.

The superimposed image GL2 is an image obtained by superimposing a plurality of display images GM2 on the captured image GS6. Each display image GM2 is located at a position of a point D6 corresponding to the display image GM2. That is, the user can grasp the position of the point D6 detected from the captured image GS6 by checking the superimposed image GL2.

The user performs an operation of pressing the button image GB, in other words, an operation of selecting the button image GB. The computer 2A performs processing corresponding to the button image GB selected by the user. In other words, the computer 2A performs various types of processing based on the operation from the user for selecting the button image GB.

The button image GB1 is an image corresponding to the superimposed image GL1. The user performs an operation of selecting the button image GB1. The computer 2A selects the superimposed image GL1 based on the operation from the user for selecting the button image GB1.

The button image GB2 is an image corresponding to the superimposed image GL2. The user performs an operation of selecting the button image GB2. The computer 2A selects the superimposed image GL2 based on the operation from the user for selecting the button image GB2.

The button image GB5 is an image for an operation of ending selection of the plurality of display images GM1 by the user. The user performs an operation of selecting the button image GB5. The computer 2A ends selection of the point D5 corresponding to the display image GM1 in response to the operation from the user for selecting the button image GB5. Hereinafter, the operation of ending the selection of the plurality of display images GM1 by the user may be referred to as a "selection end operation". The operation of selecting the button image GB5 is an example of the selection end operation.

The button image GB3 and the button image GB4 are images for an operation of changing a size of the displayed image. Specifically, the button image GB3 is an image for enlarging the displayed image. The button image GB4 is an image for reducing the displayed image. For example, the user performs an operation of selecting the button image GB3. The computer 2A enlarges the image displayed on the display apparatus 26 in response to the operation from the user for selecting the button image GB3. Hereinafter, the operation of changing the size of the image displayed on the display apparatus 26 may be referred to as a "magnification change operation". The operation of selecting the button image GB3 or the button image GB4 is an example of the magnification change operation.

Figure 23:
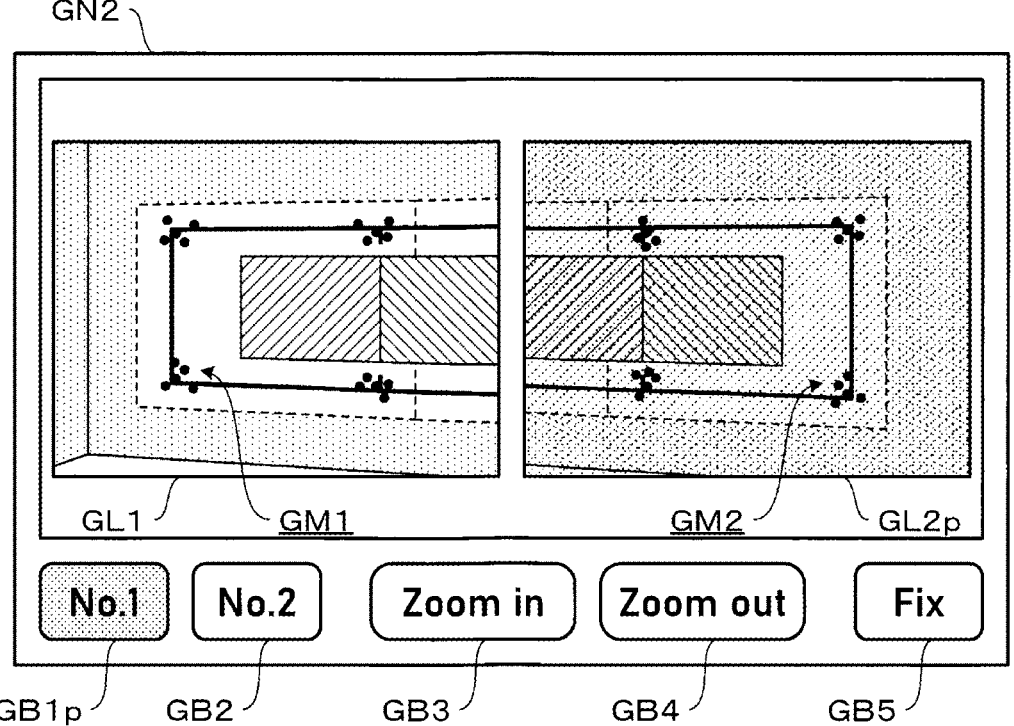
FIG. 23 is a schematic diagram showing an operation image GN2.

FIG. 23 is a schematic diagram showing an operation image GN2. The operation image GN2 is an example of the operation image GN. When the superimposed image GL1 is selected based on the operation from the user for selecting the button image GB1, the display controller 126A controls the display apparatus 26 to update the displayed image from the operation image GN1 to the operation image GN2. Hereinafter, the operation of selecting the button image GB1 may be referred to as a "button selection operation".

The operation image GN2 has the same configuration as the operation image GN1 except that the operation image GN2 includes a button image GB1$p$ instead of the button image GB1 and includes a superimposed image GL2$p$ instead of the superimposed image GL2.

A display mode of the button image GB1$p$ is different from a display mode of the button image GB1. For example, a color of the button image GB1$p$ is different from a color of the button image GB1. That is, the computer 2A changes the display mode of the button image GB1 based on the button selection operation from the user. Accordingly, by checking the button image GB1$p$, the user can grasp that the button image GB1 is selected.

A display mode of the superimposed image GL2$p$ is different from a display mode of the superimposed image GL2. For example, a color of the superimposed image GL2$p$ is different from a color of the superimposed image GL2. That is, the computer 2A changes the display mode of the superimposed image GL2 based on the button selection operation from the user. Accordingly, by checking the super-imposed image GL2$p$, the user can grasp that the superim-posed image GL1 is selected. It is preferable that the superimposed image GL1 is in a display mode more visible to the user than the superimposed image GL2$p$. For example, the superimposed image GL1 is preferably dis-played with higher contrast than the superimposed image GL2$p$. Accordingly, the user can more reliably grasp that superimposed image GL1 is selected.

When the superimposed image GL1 is selected based on the operation from the user for selecting the button image GB1, the user performs an operation of selecting the display image GM1 from the superimposed image GL1. Based on the operation from the user for selecting the display image GM1, the computer 2A selects the point D5 corresponding to the display image GM1 selected by the user. The com-puter 2A updates the third coordinate information 112A-1 based on the operation from the user. The third coordinate information 112A-1 updated based on the operation from the user represents coordinates of the point D5 selected based on the operation from the user.

When the selection of the plurality of display images GM1 by the user ends, the user performs the selection end operation.

Figure 24:
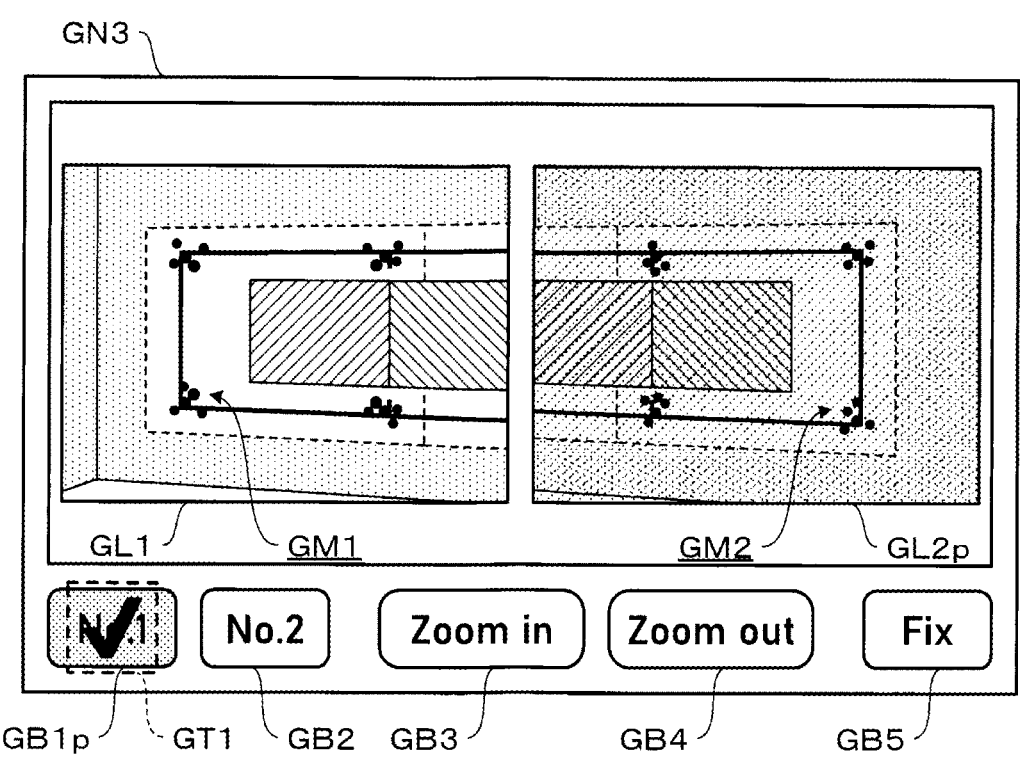
FIG. 24 is a schematic diagram showing an operation image GN3.

FIG. 24 is a schematic diagram showing an operation image GN3. The operation image GN3 is an example of the operation image GN. When the user performs the selection end operation, the display controller 126A controls the display apparatus 26 to update the displayed image from the operation image GN2 to the operation image GN3.

The operation image GN3 has the same configuration as the operation image GN2 except that the operation image GN3 includes a completion image GT1. The completion image GT1 is an image for indicating to the user that the computer 2A receives the selection end operation. That is, the computer 2A displays the completion image GT1 based on the selection end operation from the user. Accordingly, by checking the completion image GT1, the user can grasp that the selection end operation is appropriately performed.

The completion image GT1 is superimposed on the button image GB1. That is, by checking the completion image GT1 superimposed on the button image GB1, the user can grasp that the selection of the display image GM1 in the super-imposed image GL1 corresponding to the button image GB1 is completed.

When the superimposed image GL2 is selected based on the operation from the user for selecting the button image GB2, the computer 2A may change a display mode of the button image GB2 and the display mode of the superim-posed image GL1. The user performs an operation of selecting the display image GM2 from the superimposed image GL2. Based on the operation from the user for selecting the display image GM2, the computer 2A selects the point D6 corresponding to the display image GM2 selected by the user. The computer 2A updates the third coordinate information 112A-2 based on the operation from the user. The third coordinate information 112A-2 updated based on the operation from the user represents coordinates of the point D6 selected based on the operation from the user. When the selection of the plurality of display images GM2 by the user ends, the user performs an operation of ending the selection of the plurality of display images GM2. The computer 2A may display the completion image based on the operation for ending the selection of the plurality of display images GM2 by the user. The completion image may be superimposed on the button image GB2.

Figure 25:
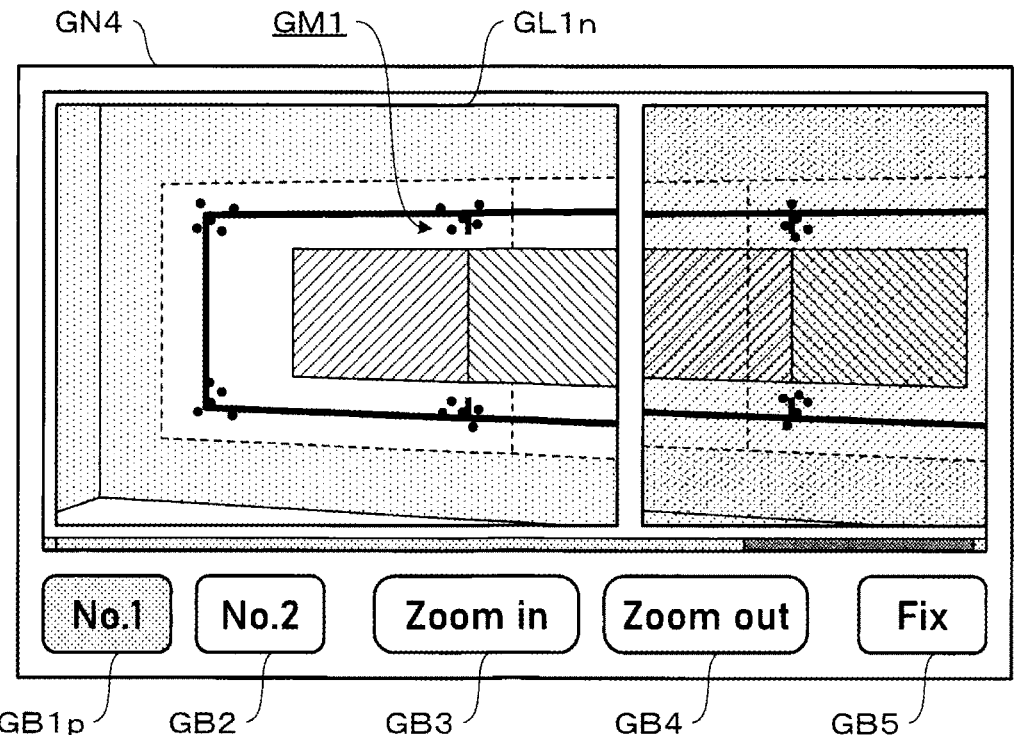
FIG. 25 is a schematic diagram showing an operation image GN4.

FIG. 25 is a schematic diagram showing an operation image GN4. The operation image GN4 is an example of the operation image GN. When the user performs the magnifi-cation change operation, specifically, the operation of select-ing the button image GB3, the display controller 126A controls the display apparatus 26 to update the displayed image from the operation image GN2 to the operation image GN4.

Figure 26:
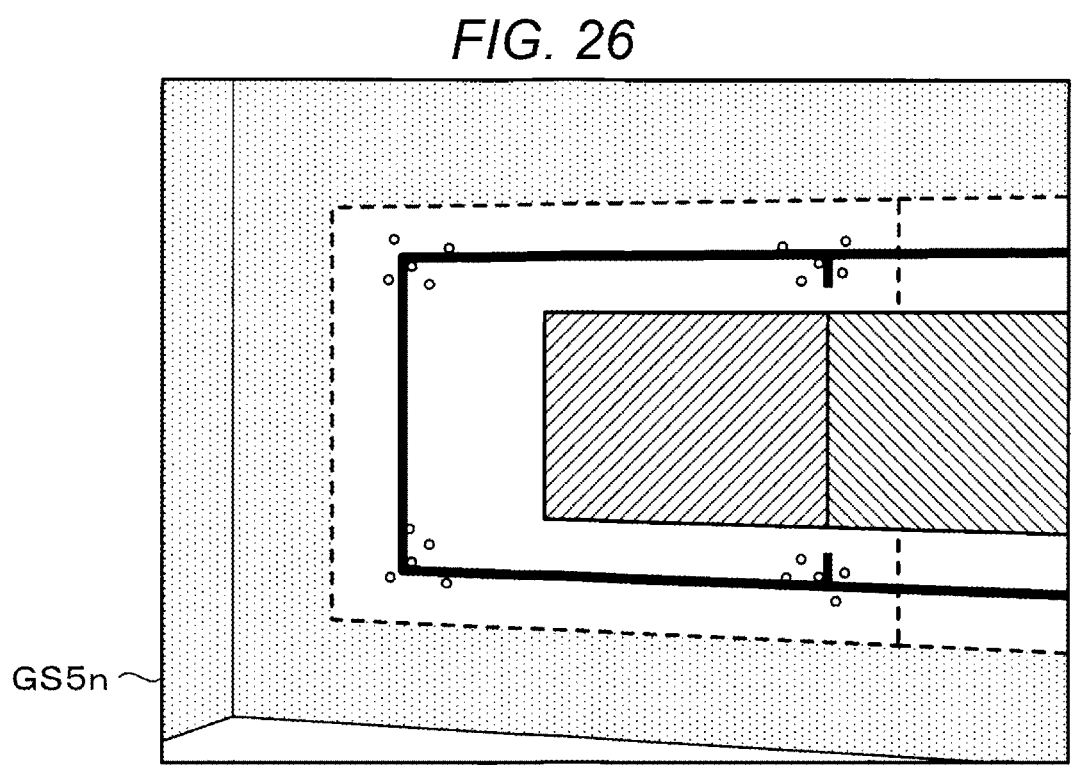

The operation image GN4 is different from the operation image GN2 in that the operation image GN4 includes a superimposed image GL1$n$ instead of the superimposed image GL1. The superimposed image GL1$n$ is an image obtained by superimposing the plurality of display images GM1 on a captured image GS5$n$ obtained by changing a size of the captured image GS5 based on the magnification change operation from the user. FIG. 26 is a schematic diagram showing the captured image GS5$n$ obtained by changing the size of the captured image GS5 based on the magnification change operation from the user.

When the display image GM1 is selected from the super-imposed image GL1, the user may change a size of the superimposed image GL1 by performing the magnification change operation. That is, the computer 2A updates the displayed image from the superimposed image GL1 to the superimposed image GL1n based on the magnification change operation from the user. Accordingly, the user can accurately check a position of the display image GM1 in the superimposed images.

FIG. 27 is a flowchart showing the operation of the projection system SysA. A series of operations shown in the flowchart in FIG. 27 are operations for preparing for the second correction, like the series of operations shown in the flowchart in FIG. 15. The series of operations shown in the flowchart in FIG. 27 are started, for example, when the projector 1A-1, the projector 1A-2, and the computer 2A are powered on and the operation apparatus 18 receives an input operation related to start of the operation from the user of the projection system SysA.

The flowchart shown in FIG. 27 is different from the flowchart shown in FIG. 15 in that the processing apparatus 12A performs processing of steps S301 to S309 instead of steps S109 to S116. In the embodiment, the projection system SysA performs the processing of steps S101 to S108 for the two projectors, that is, the projector 1A-1 and the projector 1A-2.

For example, in step S107, the imaging controller 121 controls the imaging apparatus 14-1 to image a range including the area R1 on the wall surface W1 on which the projection image GP2-6 is displayed. The imaging controller 121 acquires the captured image GS5 representing a result of the imaging from the imaging apparatus 14. In addition, the imaging controller 121 stores, in the storage apparatus 10, the second captured image information 106A-1 representing the acquired captured image GS5.

In step S107, the imaging controller 121 controls the imaging apparatus 14-2 to image a range including the area R6 on the wall surface W1 on which the projection image GP3-1 is displayed. The imaging controller 121 acquires the captured image GS6 representing a result of the imaging from the imaging apparatus 14. In addition, the imaging controller 121 stores, in the storage apparatus 10, the second captured image information 106A-2 representing the acquired captured image GS6.

In step S108, the detector 122 detects a plurality of points D5 in the captured image GS5 by performing image processing on the captured image GS5 indicated by the second captured image information 106A-1. That is, the detector 122 acquires the third coordinate information 112A-1 representing coordinates of the plurality of points D5 in the captured image GS5. The detector 122 stores the acquired third coordinate information 112A-1 in the storage apparatus 10.

In step S108, the detector 122 detects a plurality of points D6 in the captured image GS6 by performing image processing on the captured image GS6 indicated by the second captured image information 106A-2. That is, the detector 122 acquires the third coordinate information 112A-2 representing coordinates of the plurality of points D6 in the captured image GS6. The detector 122 stores the acquired third coordinate information 112A-2 in the storage apparatus 10.

In step S301, the display controller 126A controls the display apparatus 26 to display the operation image GN1. That is, in step S301, the display controller 126A controls the display apparatus 26 to display the superimposed image GL1. In step S301, the display controller 126A controls the display apparatus 26 to display the superimposed image GL2. In step S301, the display controller 126A controls the display apparatus 26 to display the button image GB1. In step S301, the display controller 126A controls the display apparatus 26 to display the button image GB2. In step S301, the display controller 126A controls the display apparatus 26 to display the button image GB3. In step S301, the display controller 126A controls the display apparatus 26 to display the button image GB4. In step S301, the display controller 126A controls the display apparatus 26 to display the button image GB5.

When the processing in step S301 is performed, the computer 2A receives an operation from the user for selecting the button image GB1 or the button image GB2. That is, in step S302, the coordinate manager 124A acquires, from the operation apparatus 18, data indicating contents of the operation from the user for selecting the button image GB1 or the button image GB2.

As an example, a case where the user performs an operation of selecting the button image GB1 will be described below. That is, in step S302, the coordinate manager 124A selects the superimposed image GL1 based on the operation from the user for selecting the button image GB1. When the user performs an operation of selecting the button image GB2, the coordinate manager 124A selects the superimposed image GL2 based on the operation from the user for selecting the button image GB2.

In step S303, the display controller 126A controls the display apparatus 26 to update the displayed image from the operation image GN1 to the operation image GN2.

That is, in step S303, the display controller 126A controls the display apparatus 26 to display the superimposed image GL2p. In step S303, the display controller 126A controls the display apparatus 26 to display the button image GB1p.

In step S304, the coordinate manager 124A determines whether the magnification change operation is received from the user. For example, the coordinate manager 124A determines whether an operation of selecting the button image GB3 is received from the user. When the magnification change operation is received from the user, that is, when it is YES in step S304, the coordinate manager 124A advances the processing to step S305. When no magnification change operation is received from the user, that is, when it is NO in step S304, the coordinate manager 124A advances the processing to step S306.

As an example, a case where the user performs the magnification change operation by selecting the button image GB3 will be described below. The user may also perform the magnification change operation by selecting the button image GB4.

In step S305, the display controller 126A updates the image displayed on the display apparatus 26 based on the magnification change operation from the user.

That is, in step S305, based on the magnification change operation from the user for selecting the button image GB3, the display controller 126A updates the image displayed on the display apparatus 26 from the superimposed image GL1 to the superimposed image GL1n.

In step S306, based on an operation from the user for selecting the display image GM1, the coordinate manager 124A selects the point D5 corresponding to the display image GM1 selected by the user. The coordinate manager 124A updates the third coordinate information 112A-1 based on the operation from the user.

When the superimposed image GL2 is selected in step S302, in step S306, based on an operation from the user for selecting the display image GM2, the coordinate manager 124A selects the point D6 corresponding to the display image GM2 selected by the user. The coordinate manager 124A updates the third coordinate information 112A-2 based on the operation from the user.

In step S307, the coordinate manager 124A determines whether the selection end operation is received from the user. In other words, the coordinate manager 124A determines whether to end the selection of the point D5. When the selection end operation is received from the user, that is, when it is YES in step S307, the coordinate manager 124A advances the processing to step S308. When no selection end operation is received from the user, that is, when it is NO in step S307, the coordinate manager 124A advances the processing to step S304.

When the result of the determination in step S307 is YES, the processing apparatus 12A ends the selection of the point D5. When the result of the determination in step S307 is NO, the processing apparatus 12A continues the selection of the point D5 based on the operation from the user by performing the processing in steps S304 to S306 again. Specifically, the processing apparatus 12A selects four or more points D5 by repeatedly performing the processing in steps S304 to S306 until the result of the determination in step S307 becomes YES.

In step S308, the display controller 126A controls the display apparatus 26 to display the completion image GT1.

In step S309, the coordinate manager 124A determines whether an operation of ending the series of operations shown in the flowchart in FIG. 27 is received from the user. When the operation of ending the series of operations shown in the flowchart in FIG. 27 is received from the user, that is, when it is YES in step S309, the processing apparatus 12A including the coordinate manager 124A ends the series of operations shown in the flowchart in FIG. 27. When the operation of ending the series of operations shown in the flowchart in FIG. 27 is not received from the user, that is, when it is NO in step S309, the coordinate manager 124A advances the processing to step S302.

When the selection of the display image GM1 is ended and the result of the determination in step S309 is NO, the user performs an operation of selecting the button image GB2. The computer 2A selects the superimposed image GL2 based on the operation from the user for selecting the button image GB2. That is, as in the case where the superimposed image GL1 is selected, the processing apparatus 12A selects four or more points D6 by repeatedly performing the processing in steps S304 to S306 based on the operation from the user until the result of the determination in step S307 becomes YES. The processing apparatus 12A updates the third coordinate information 112A-2 based on the operation from the user.

The third coordinate information 112A-1 updated based on the operation of the user and the third coordinate information 112A-2 updated based on the operation of the user are used to generate the projective transformation matrix used for the second correction. That is, the computer 2A can accurately generate the projective transformation matrix used for the second correction.

As described above, according to the second embodiment, the projection system SysA displays, on the display apparatus, the plurality of display images corresponding one-to-one to the plurality of points detected from the captured image obtained by imaging the range including the area where the projection image is displayed. The projection system SysA selects the four or more points based on the operation from the user for selecting the display image. That is, the user can appropriately select a point necessary for generating the projective transformation matrix used for the second correction. In addition, the projection system SysA can accurately generate the projective transformation matrix used for the second correction and can more accurately maintain the shape of the projection image.

As described above, the program 100A according to the second embodiment causes the processing apparatus 12A to acquire the captured image GS5 representing the result of imaging the range including the area R1 that has a corner, the area R1 being located on the wall surface W1 on which the projection image GP2-6 is displayed by the projection apparatus 16-1, detect, by performing image processing on the captured image GS5, the plurality of points D5 corresponding to the corner of the image GV51 indicating the area R1 in the captured image GS5, and display, by controlling the display apparatus 26, the superimposed image GL1 obtained by superimposing at least a part of the plurality of display images GM1 selected by the user on the captured image GS5, the plurality of display images GM1 corresponding one-to-one to the plurality of points D5.

The point selection method according to the second embodiment includes: acquiring the captured image GS5 representing the result of imaging the range including the area R1 that has a corner, the area R1 being located on the wall surface W1 on which the projection image GP2-6 is displayed by the projection apparatus 16-1; detecting, by performing image processing on the captured image GS5, the plurality of points D5 corresponding to the corner of the image GV51 indicating the area R1 in the captured image GS5; and displaying, by controlling the display apparatus 26, the superimposed image GL1 obtained by superimposing at least a part of the plurality of display images GM1 selected by the user on the captured image GS5, the plurality of display images GM1 corresponding one-to-one to the plurality of points D5.

The computer 2A according to the second embodiment includes the processing apparatus 12A. The processing apparatus 12A acquires the captured image GS5 representing the result of imaging the range including the area R1 that has a corner, the area R1 being located on the wall surface W1 on which the projection image GP2-6 is displayed by the projection apparatus 16-1, detects, by performing image processing on the captured image GS5, the plurality of points D5 corresponding to the corner of the image GV51 indicating the area R1 in the captured image GS5, and displays, by controlling the display apparatus 26, the superimposed image GL1 obtained by superimposing at least a part of the plurality of display images GM1 selected by the user on the captured image GS5, the plurality of display images GM1 corresponding one-to-one to the plurality of points D5.

That is, the projection system SysA displays, on the display apparatus 26, the superimposed image GL1 including the plurality of display images GM1 corresponding one-to-one to the plurality of points D5 detected from the captured image GS5 obtained by imaging the range including the area R1 where the projection image GP2-6 is displayed. Accordingly, by selecting the display image GM1 from the superimposed image GL1, the user can appropriately select the point D5 necessary for generating the projective transformation matrix used for the second correction. Accordingly, the projection system SysA can accurately generate the projective transformation matrix used for the second correction and can more accurately maintain the shape of the projection image.

In the second embodiment, the program 100A is an example of a "program", the processing apparatus 12A is an example of a "processing apparatus", the projection apparatus 16-1 is an example of a "first projection apparatus", the projection image GP2-6 is an example of a "first projection image", the wall surface W1 is an example of a "projection surface", the area R1 is an example of a "first display area", the captured image GS5 is an example of a "first captured image", the GV51 is an example of a "first image", the plurality of points D5 are an example of "a plurality of first feature points", the display apparatus 26 is an example of a "display apparatus", the display image GM1 is an example of a "first display image", the plurality of display images GM1 are an example of a "plurality of first display images", the superimposed image GL1 is an example of a "first superimposed image", and the computer 2A is an example of an "information processing apparatus". Any one corner among the corners CN1-1 to CN1-4 is an example of a "corner of the first display area". In addition, one of the corners CN8-1 to CN8-4 is an example of a "corner of the first image".

The program 100A according to the second embodiment further causes the processing apparatus 12A to receive, from the user, the magnification change operation of changing the size of the image displayed on the display apparatus 26 and display, by controlling the display apparatus 26, the superimposed image GL1$n$ obtained by superimposing at least a part of the plurality of display images GM1 on the captured image GS5$n$ obtained by changing the size of the captured image GS5 based on the magnification change operation.

That is, the projection system SysA enlarges or reduces the superimposed image including the plurality of display images GM1 based on the magnification change operation from the user. Accordingly, the user can accurately check a position of the display image GM1 in the superimposed images.

In the second embodiment, the captured image GS5$n$ is an example of a "second captured image", and the superimposed image GL1$n$ is an example of a "third superimposed image".

The program 100A according to the second embodiment further causes the processing apparatus 12A to acquire the captured image GS6 representing the result of imaging the range including the area R6 that has a corner, the area R6 being located on the wall surface W1 on which the projection image GP3-1 is displayed by the projection apparatus 16-2, detect, by performing image processing on the captured image GS6, the plurality of points D6 corresponding to the corner of the image GV61 indicating the area R6 in the captured image GS6, display, by controlling the display apparatus 26, the superimposed image GL2 obtained by superimposing at least a part of the plurality of display images GM2 selected by the user on the captured image GS6, the plurality of display images GM2 corresponding one-to-one to the plurality of points D6, and make the display mode of the superimposed image GL1 different from the display mode of the superimposed image GL2 when at least one display image GM1 among the plurality of display images GM1 is selected by the user.

For example, the projection system SysA makes the display mode of the superimposed image GL1 different from the display mode of the superimposed image GL2 by updating the superimposed image GL2 to the superimposed image GL2$p$. That is, the projection system SysA can display the superimposed image GL1 in a display mode more visible to the user than the superimposed image GL2$p$. Accordingly, when selecting the display image GM1, the user can easily grasp that the display image GM1 may be selected from the superimposed image GL1.

In the second embodiment, the projection apparatus 16-2 is an example of a "second projection apparatus", the projection image GP3-1 is an example of a "second projection image", the area R6 is an example of a "second display area", the captured image GS6 is an example of a "third captured image", the image GV61 is an example of a "second image", the plurality of points D6 are an example of a "plurality of second feature points", the plurality of display images GM2 are an example of a "plurality of second display images", and the superimposed image GL2 is an example of a "fourth superimposed image". Any one of the corners CN7-1 to CN4-4 is an example of "four corners of the second display area". In addition, any one of the corners CN9-1 to CN9-4 is an example of "four corners of the second image".

The program 100A according to the second embodiment further causes the processing apparatus 12A to display, by controlling the display apparatus 26, the button image GB1 that is an image to be selected by the user and that corresponds to the superimposed image GL1, and the button image GB2 that is an image to be selected by the user and that corresponds to the superimposed image GL2. Making the display mode of the superimposed image GL1 different from the display mode of the superimposed image GL2 includes receiving the button selection operation of selecting the button image GB1 from the user and changing the display mode of the button image GB1.

That is, by changing the display mode of the button image GB1 based on the button selection operation, the projection system SysA can indicate to the user that the superimposed image GL1 corresponding to the button image GB1 is selected. Accordingly, by checking the button image GB1$p$ obtained by changing the display mode of the button image GB1, the user can grasp that the superimposed image GL1 is selected.

In the second embodiment, the button image GB1 is an example of a "first button image", and the button image GB2 is an example of a "second button image".

The program 100A according to the second embodiment further causes the processing apparatus 12A to receive, from the user, the selection end operation of ending the selection of the plurality of display images GM1 by the user and display, by controlling the display apparatus 26, the completion image GT1 indicating that the selection end operation is received.

Accordingly, by checking the completion image GT1, the user can grasp that the selection end operation is appropriately performed.

In the second embodiment, the completion image GT1 is an example of a "completion image".

The program 100A according to the second embodiment further causes the processing apparatus 12A to display, by controlling the display apparatus 26, the button image GB1 that is an image to be selected by the user and that corresponds to the superimposed image GL1, and the button image GB2 that is an image to be selected by the user and that corresponds to the superimposed image GL2. The completion image GT1 is superimposed on the button image GB1.

Accordingly, by checking the completion image GT1 superimposed on the button image GB1, the user can grasp that the selection of the display image GM1 in the superimposed image GL1 corresponding to the button image GB1 is completed.

3. Modification

The above embodiments can be variously modified. Specific modifications are shown below. Two or more aspects optionally selected from the following examples may be combined as appropriate within a range in which the aspects do not contradict each other. In each modification shown below, reference numerals used in the description above are used for elements having actions and functions equivalent to those in the above-described embodiments, and detailed description thereof will be omitted as appropriate.

3.1. Modification 1

In the above-described embodiment, the case where the superimposed image GL1 is updated to the superimposed image GL1$n$ in response to the magnification change operation from the user is shown as an example, but the disclosure is not limited to such an aspect. For example, a size of the display image GM1 in the superimposed image GL1 may also be changed in response to the magnification change operation from the user.

Figure 28:
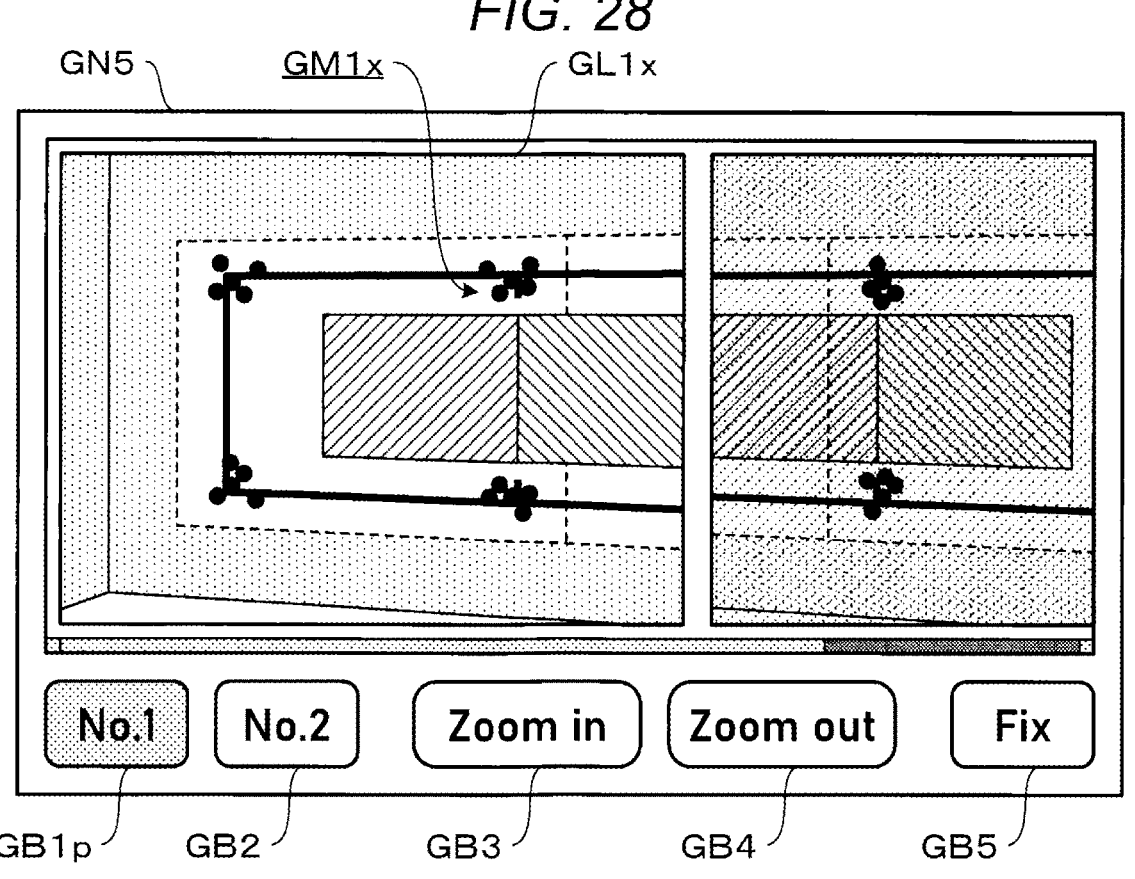
FIG. 28 is a schematic diagram showing an operation image GN5.

FIG. 28 is a schematic diagram showing an operation image GN5. The operation image GN5 is an example of the operation image GN. In the present modification, when the user performs the magnification change operation, specifically, the operation of selecting the button image GB3, the display controller 126A controls the display apparatus 26 to update the displayed image from the operation image GN2 to the operation image GN5.

The operation image GN5 is different from the operation image GN4 in that the operation image GN5 includes a superimposed image GL1$x$ instead of the superimposed image GL1$n$. The superimposed image GL1$x$ is an image obtained by changing the size of the superimposed image GL1 based on the magnification change operation from the user. The superimposed image GL1$x$ includes a plurality of display images GM1$x$. The display image GM1$x$ is an image obtained by changing the size of the display image GM1 based on the magnification change operation from the user. The plurality of display images GM1$x$ correspond one-to-one to the plurality of display images GM1. That is, an operation of selecting the display image GM1$x$ is the same as the operation of selecting the display image GM1.

That is, a program according to Modification 1 further causes a processing apparatus according to Modification 1 to receive, from the user, the magnification change operation of changing the size of the image displayed on the display apparatus 26, and display, by controlling the display apparatus 26, the superimposed image GL1$x$ obtained by changing the size of the superimposed image GL1 based on the magnification change operation.

That is, a projection system according to Modification 1 enlarges or reduces the superimposed image GL1 based on the magnification change operation from the user. Accordingly, the user can change the size of the superimposed image GL1 according to preference of the user.

In Modification 1, the display apparatus 26 is an example of the "display apparatus", the superimposed image GL1 is an example of the "first superimposed image", and the superimposed image GL1$x$ is an example of a "second superimposed image".

3.2. Modification 2

In the above-described embodiments and modifications, the case where all of the plurality of display images corresponding one-to-one to the plurality of points detected from the captured image are displayed is shown as an example, but the disclosure is not limited to such an aspect. For example, a part of the plurality of display images corresponding one-to-one to the plurality of points detected from the captured image may be displayed. Specifically, when the number of points detected from the captured image is larger than a predetermined number, the predetermined number of display images may be displayed. When a part of the plurality of display images corresponding one-to-one to the plurality of points detected from the captured image are displayed, each display image to be displayed may be, for example, a display image corresponding to a point satisfying a predetermined condition among the plurality of points detected from the captured image. That is, by limiting the number of display images to be displayed, the user can easily select the display image.

3.3. Modification 3

In the above-described embodiments and modifications, the case where the magnification change operation is the operation of selecting the button image GB3 or the button image GB4 is shown as an example, but the disclosure is not limited to such an aspect. For example, when the operation apparatus 18 includes a mouse, the magnification change operation may be an operation of scrolling a mouse wheel. In addition to the magnification change operation, the processing performed based on the operation from the user for selecting the button image GB may be implemented by another method.

3.4. Modification 4

In the above-described embodiments and modifications, the area R1 has four corners, but the disclosure is not limited thereto, and the number of corners of the area R1 may be one or more. For example, an outer edge of the area R1 may have one corner and a curve. Although the image GV51 has four corners, the disclosure is not limited thereto, and the number of corners of the image GV51 may be one or more. For example, an outer edge of the image GV51 may have one corner and a curve. Although the area R6 has four corners, the disclosure is not limited thereto, and the number of corners of the area R6 may be one or more. For example, an outer edge of the area R6 may have one corner and a curve. Although the image GV61 has four corners, the disclosure is not limited thereto, and the number of corners of the image GV61 may be one or more. For example, an outer edge of the image GV61 may have one corner and a curve.

4. Appendix

Hereinafter, a summary of the disclosure will be described as appendices.

4.1. Appendix 1

A program including: causing a processing apparatus to acquire a first captured image representing a result of imaging a range including a first display area that has a corner, the first display area being located on a projection surface on which a first projection image is displayed by a first projection apparatus, detect, by performing image processing on the first captured image, a plurality of first feature points corresponding to a corner of a first image indicating the first display area in the first captured image, and display, by controlling a display apparatus, a first superimposed image obtained by superimposing at least a part of a plurality of first display images selected by a user on the first captured image, the plurality of first display images corresponding one-to-one to the plurality of first feature points.

That is, a projection system operating according to the program described in Appendix 1 causes the display apparatus to display the first superimposed image including the plurality of first display images corresponding one-to-one to the plurality of first feature points detected from the first captured image obtained by imaging the range including the first display area where the first projection image is displayed. Accordingly, by selecting the first display image from the first superimposed image, the user can appropriately select the first feature point necessary for generating a projective transformation matrix used for a second correction. Accordingly, the projection system operating according to the program described in Appendix 1 can accurately generate the projective transformation matrix used for the second correction and can more accurately maintain a shape of the projection image.

4.2. Appendix 2

The program according to Appendix 1, further including: causing the processing apparatus to receive, from the user, a magnification change operation of changing a size of an image displayed on the display apparatus; and display, by controlling the display apparatus, a second superimposed image obtained by changing a size of the first superimposed image based on the magnification change operation.

That is, the projection system operating according to the program described in Appendix 2 enlarges or reduces the first superimposed image based on the magnification change operation from the user. Accordingly, the user can change the size of the first superimposed image according to preference of the user.

4.3. Appendix 3

The program according to Appendix 1, further including: causing the processing apparatus to receive, from the user, a magnification change operation of changing a size of an image displayed on the display apparatus, and display, by controlling the display apparatus, a third superimposed image obtained by superimposing at least a part of the plurality of first display images on a second captured image obtained by changing a size of the first captured image based on the magnification change operation.

That is, the projection system operating according to the program described in Appendix 3 enlarges or reduces the superimposed image including the plurality of first display images based on the magnification change operation from the user. Accordingly, the user can accurately check a position of the first display image in the superimposed images.

4.4. Appendix 4

The program according to Appendix 1, further including: causing the processing apparatus to acquire a third captured image representing a result of imaging a range including a second display area that has a corner, the second display area being located on the projection surface on which a second projection image is displayed by a second projection apparatus, detect, by performing image processing on the third captured image, a plurality of second feature points corresponding to a corner of a second image indicating the second display area in the third captured image, display, by controlling the display apparatus, a fourth superimposed image obtained by superimposing at least a part of a plurality of second display images selected by the user on the third captured image, the plurality of second display images corresponding one-to-one to the plurality of second feature points, and make a display mode of the first superimposed image different from a display mode of the fourth superimposed image when at least one of the plurality of first display images is selected by the user.

That is, the projection system operating according to the program described in Appendix 4 can display the first superimposed image in a display mode more visible to the user than the fourth superimposed image. Accordingly, when selecting the first display image, the user can easily grasp that the first display image may be selected from the first superimposed image.

4.5. Appendix 5

The program according to Appendix 4, further including: causing the processing apparatus to display, by controlling the display apparatus, a first button image that is an image to be selected by the user and that corresponds to the first superimposed image, and a second button image that is an image to be selected by the user and that corresponds to the fourth superimposed image, in which the making the display mode of the first superimposed image different from the display mode of the fourth superimposed image includes: receiving a button selection operation of selecting the first button image from the user; and changing a display mode of the first button image.

That is, by changing the display mode of the first button image based on the button selection operation, the projection system operating according to the program described in Appendix 5 can indicate to the user that the first superimposed image corresponding to the first button image is selected. Accordingly, by checking the first button image whose display mode is changed, the user can grasp that the first superimposed image is selected.

4.6. Appendix 6

The program according to Appendix 4 or 5, further including: causing the processing apparatus to receive, from the user, a selection end operation of ending the selection of the plurality of first display images by the user, and display, by controlling the display apparatus, a completion image indicating that the selection end operation is received.

Accordingly, by checking the completion image, the user can grasp that the selection end operation is appropriately performed.

4.7. Appendix 7

The program according to Appendix 6, further including: causing the processing apparatus to display, by controlling the display apparatus, the first button image that is an image to be selected by the user and that corresponds to the first superimposed image, and the second button image that is an image to be selected by the user and that corresponds to the fourth superimposed image, in which the completion image is superimposed on the first button image.

Accordingly, by checking the completion image superimposed on the first button image, the user can grasp that the selection of the first display image in the first superimposed image corresponding to the first button image is completed.

4.8. Appendix 8

A point selection method including: acquiring a first captured image representing a result of imaging a range including a first display area that has a corner, the first display area being located on a projection surface on which a first projection image is displayed by a first projection apparatus; detecting, by performing image processing on the first captured image, a plurality of first feature points corresponding to a corner of a first image indicating the first display area in the first captured image; and displaying, by controlling a display apparatus, a first superimposed image obtained by superimposing at least a part of a plurality of first display images selected by a user on the first captured image, the plurality of first display images corresponding one-to-one to the plurality of first feature points.

That is, a projection system that implements the point selection method described in Appendix 8 causes the display apparatus to display the first superimposed image including the plurality of first display images corresponding one-to-one to the plurality of first feature points detected from the first captured image obtained by imaging the range including the first display area where the first projection image is displayed. Accordingly, by selecting the first display image from the first superimposed image, the user can appropriately select the first feature point necessary for generating a projective transformation matrix used for a second correction. Accordingly, the projection system that implements the point selection method described in Appendix 8 can accurately generate the projective transformation matrix used for the second correction and can more accurately maintain a shape of the projection image.

4.9. Appendix 9

An information processing apparatus including: a processing apparatus, in which the processing apparatus is configured to acquire a first captured image representing a result of imaging a range including a first display area that has a corner, the first display area being located on a projection surface on which a first projection image is displayed by a first projection apparatus, detect, by performing image processing on the first captured image, a plurality of first feature points corresponding to a corner of a first image indicating the first display area in the first captured image, and display, by controlling a display apparatus, a first superimposed image obtained by superimposing at least a part of a plurality of first display images selected by a user on the first captured image, the plurality of first display images corresponding one-to-one to the plurality of first feature points.

That is, the projection system including the information processing apparatus described in Appendix 9 causes the display apparatus to display the first superimposed image including the plurality of first display images corresponding one-to-one to the plurality of first feature points detected from the first captured image obtained by imaging the range including the first display area where the first projection image is displayed. Accordingly, by selecting the first display image from the first superimposed image, the user can appropriately select the first feature point necessary for generating a projective transformation matrix used for a second correction. Accordingly, the projection system including the information processing apparatus described in Appendix 9 can accurately generate the projective transformation matrix used for the second correction and can more accurately maintain a shape of the projection image.

What is claimed is:

1. A non-transitory computer-readable storage medium storing a program, the program comprising:

causing a processing apparatus to
    acquire a first captured image representing a result of imaging a range including a first display area that has a corner, the first display area being located on a projection surface on which a first projection image is displayed by a first projection apparatus,
    detect, by performing image processing on the first captured image, a plurality of first feature points each of which indicating a feature of a corner of a first image indicating the first display area in the first captured image, and
    display, by controlling a display apparatus, a first superimposed image obtained by superimposing at least a part of a plurality of first display images on the first captured image, each of the plurality of first display images corresponding to each of the plurality of first feature points in a one-to-one manner, and each of the plurality of first display images being selection targeted to be selected by a user.

2. The non-transitory computer-readable storage medium storing the program according to claim 1, the program further comprising:
    causing the processing apparatus to
        receive, from the user, a magnification change operation of changing a size of an image displayed on the display apparatus, and
        display, by controlling the display apparatus, a second superimposed image obtained by changing a size of the first superimposed image based on the magnification change operation.

3. The non-transitory computer-readable storage medium storing the program according to claim 1, the program further comprising:
    causing the processing apparatus to
        receive, from the user, a magnification change operation of changing a size of an image displayed on the display apparatus, and
        display, by controlling the display apparatus, a third superimposed image obtained by superimposing at least a part of the plurality of first display images on a second captured image obtained by changing a size of the first captured image based on the magnification change operation.

4. The non-transitory computer-readable storage medium storing the program according to claim 1, the program further comprising:
    causing the processing apparatus to
        acquire a third captured image representing a result of imaging a range including a second display area that has a corner, the second display area being located on the projection surface on which a second projection image is displayed by a second projection apparatus,
        detect, by performing image processing on the third captured image, a plurality of second feature points corresponding to a corner of a second image indicating the second display area in the third captured image,
        display, by controlling the display apparatus, a fourth superimposed image obtained by superimposing at least a part of a plurality of second display images selected by the user on the third captured image, the plurality of second display images corresponding one-to-one to the plurality of second feature points, and
        make a display mode of the first superimposed image different from a display mode of the fourth superimposed image when at least one of the plurality of first display images is selected by the user.

5. The non-transitory computer-readable storage medium storing the program according to claim 4, the program further comprising:

causing the processing apparatus to display, by controlling the display apparatus, a first button image that is an image to be selected by the user and that corresponds to the first superimposed image, and a second button image that is an image to be selected by the user and that corresponds to the fourth superimposed image, wherein the making the display mode of the first superimposed image different from the display mode of the fourth superimposed image includes:

receiving a button selection operation of selecting the first button image from the user; and changing a display mode of the first button image.

6. The non-transitory computer-readable storage medium storing the program according to claim 4, the program further comprising:

causing the processing apparatus to receive, from the user, a selection end operation of ending the selection of the plurality of first display images by the user, and display, by controlling the display apparatus, a completion image indicating that the selection end operation is received.

7. The non-transitory computer-readable storage medium storing the program according to claim 6, the program further comprising:

causing the processing apparatus to display, by controlling the display apparatus, the first button image that is an image to be selected by the user and that corresponds to the first superimposed image, and the second button image that is an image to be selected by the user and that corresponds to the fourth superimposed image, wherein the completion image is superimposed on the first button image.

8. A point selection method comprising:

acquiring a first captured image representing a result of imaging a range including a first display area that has a corner, the first display area being located on a projection surface on which a first projection image is displayed by a first projection apparatus;

detecting, by performing image processing on the first captured image, a plurality of first feature points each of which indicating a feature of a corner of a first image indicating the first display area in the first captured image; and displaying, by controlling a display apparatus, a first superimposed image obtained by superimposing at least a part of a plurality of first display images on the first captured image, the plurality of first display images corresponding to each of the plurality of first feature points in a one-to-one manner, and each of the plurality of first display images being selection targeted to be selected by a use.

9. An information processing apparatus comprising:

a processing apparatus, wherein the processing apparatus is programmed to acquire a first captured image representing a result of imaging a range including a first display area that has a corner, the first display area being located on a projection surface on which a first projection image is displayed by a first projection apparatus, detect, by performing image processing on the first captured image, a plurality of first feature points each of which indicating a feature of a corner of a first image indicating the first display area in the first captured image, and display, by controlling a display apparatus, a first superimposed image obtained by superimposing at least a part of a plurality of first display images on the first captured image, the plurality of first display images corresponding to each of the plurality of first feature points in a one-to-one manner, and each of the plurality of first display images being selection targeted to be selected by a use.

* * * * *